(12) United States Patent
Nagai et al.

(10) Patent No.: US 6,950,086 B2
(45) Date of Patent: Sep. 27, 2005

(54) DRIVING METHOD FOR A CHOLESTERIC LIQUID CRYSTAL DISPLAY DEVICE HAVING A MEMORY MODE OF OPERATION AND A DRIVING APPARATUS

(75) Inventors: Makoto Nagai, Kanagawa (JP); Shinya Tahara, Kanagawa (JP); Tomohiro Takano, Kanagawa (JP); Noriko Suehiro, Kanagawa (JP); Satoshi Niiyama, Kanagawa (JP)

(73) Assignee: OPTREX Corporation, Tokyo (JP)

( * ) Notice: Subject to any disclaimer, the term of this patent is extended or adjusted under 35 U.S.C. 154(b) by 587 days.

(21) Appl. No.: 09/822,344

(22) Filed: Apr. 2, 2001

(65) Prior Publication Data

US 2002/0036614 A1 Mar. 28, 2002

(30) Foreign Application Priority Data

| Apr. 3, 2000 | (JP) | 2000-101579 |
| Apr. 3, 2000 | (JP) | 2000-101580 |
| Apr. 20, 2000 | (JP) | 2000-118942 |
| Apr. 21, 2000 | (JP) | 2000-121391 |
| Apr. 21, 2000 | (JP) | 2000-121392 |
| Apr. 26, 2000 | (JP) | 2000-126639 |

(51) Int. Cl.[7] ............... G09G 3/36; G02F 1/137; C09K 19/02
(52) U.S. Cl. ............... 345/95; 345/94; 349/35; 349/169; 349/176
(58) Field of Search ............... 345/87, 89, 94–97, 345/92, 690; 349/35, 76, 115, 130, 133, 136, 169, 171–174, 94

(56) References Cited

U.S. PATENT DOCUMENTS

| 3,936,815 A | | 2/1976 | Kogure et al. | |
| 4,097,127 A | | 6/1978 | Haas et al. | |
| 4,139,273 A | * | 2/1979 | Crossland et al. | ............ 349/35 |
| 4,278,328 A | * | 7/1981 | Mukoh et al. | ............... 349/130 |
| 4,380,372 A | * | 4/1983 | Taguchi | ....................... 349/188 |
| 5,453,863 A | * | 9/1995 | West et al. | .................... 349/35 |
| 5,625,477 A | * | 4/1997 | Wu et al. | ...................... 349/35 |
| 5,748,277 A | * | 5/1998 | Huang et al. | ............... 349/169 |
| 5,889,566 A | * | 3/1999 | Wu et al. | ...................... 349/35 |
| 5,933,203 A | * | 8/1999 | Wu et al. | ...................... 349/35 |
| 6,154,190 A | * | 11/2000 | Yang et al. | ................... 345/94 |
| 6,268,840 B1 | * | 7/2001 | Huang | .......................... 345/94 |
| 6,532,052 B1 | * | 3/2003 | Khan et al. | ................. 349/115 |

FOREIGN PATENT DOCUMENTS

EP     0 957 394 A1     11/1999

OTHER PUBLICATIONS

D. K. Yang, et al., "40.1: Invited Address: Cholesteric Liquid–Crystal/Polymer–Gel Dispersions: Reflective Display Applications," 1992 SID, SID 92 Digest, pp. 759–761.

P. Watson, et al., "31.3: A Study of the Dynamics of Reflection Color, Helical Axis Orientation, and Domain Size in Cholesteric LDCs," 1198 SID, SID 98 Digest, pp. 905–908.

M. Nagai, et al., IDW '00, Proceedings of the Seventh International Display Workshops, "A Study of the Relaxation process in a Chiral Nematic Liquid Crystal," Nov. 29–Dec. 1, 2000, 2 cover pages with pp. 285–288.

* cited by examiner

*Primary Examiner*—Bipin Shalwala
*Assistant Examiner*—David L. Lewis
(74) *Attorney, Agent, or Firm*—Oblon, Spivak, McCelland, Maier & Neustadt, P.C.

(57) ABSTRACT

A driving method for a liquid crystal display device with a cholesteric liquid crystal having a memory mode of operation including a first stage of applying a first voltage to change the state of the cholesteric liquid crystal to a homeotropic state, a second stage of applying a second voltage to change the state of the cholesteric liquid crystal to a homogeneous state or a homogeneous/planar-mixed state, and a third stage of applying a third voltage to change the state of the cholesteric liquid crystal from the homogeneous state or the homogeneous/planar-mixed state to a focalconic state.

26 Claims, 27 Drawing Sheets

* "0 ms" : At Power Off State

Fig. 8
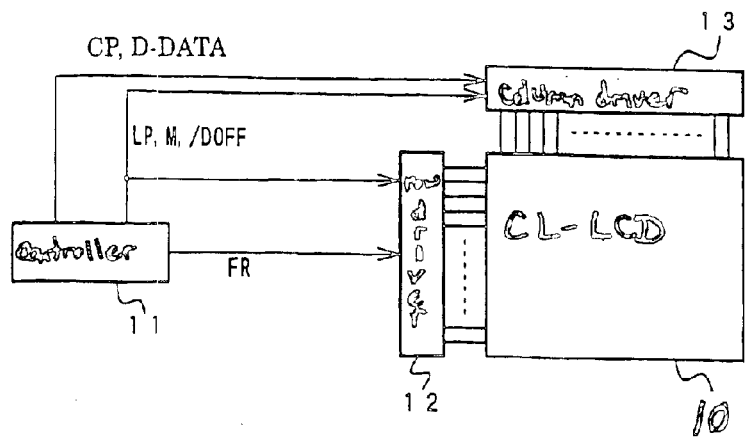
Fig. 9(A)
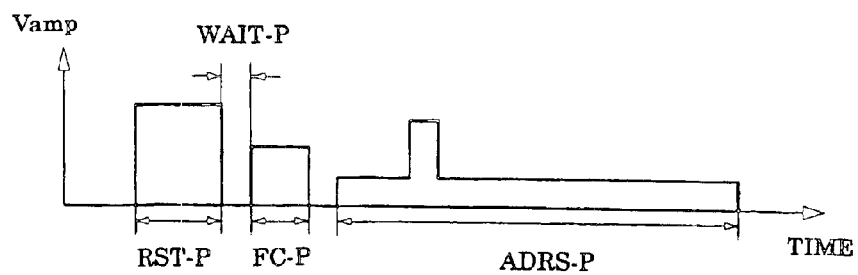
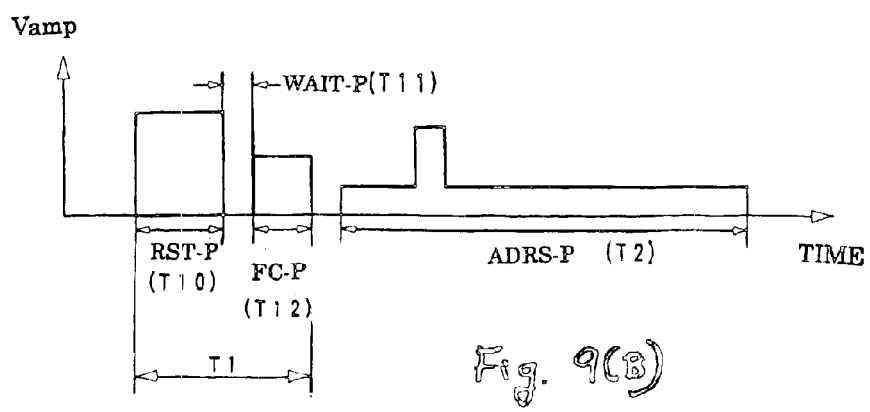
Fig. 9(B)

ROW-DRV

| /DOFF | M | SEL/NON-SEL | V-OUT |
|---|---|---|---|
| H | L | SEL | $V_5$ |
| H | H | SEL | $V_0$ |
| H | L | NON-SEL | $V_1$ |
| H | H | NON-SEL | $V_4$ |
| L | X | X | $V_0$ |

COL-DRV

| /DOFF | M | DATA | V-OUT |
|---|---|---|---|
| H | L | H | $V_0$ |
| H | H | H | $V_5$ |
| H | L | L | $V_2$ |
| H | H | L | $V_3$ |
| L | X | X | $V_0$ |

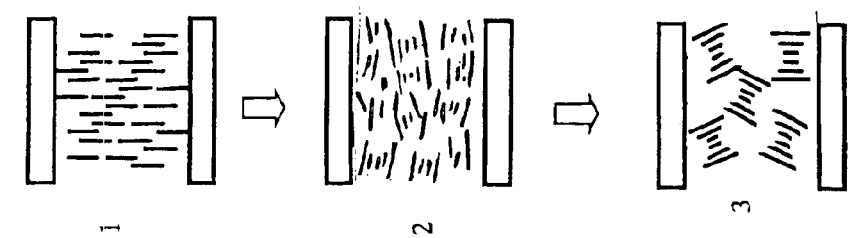
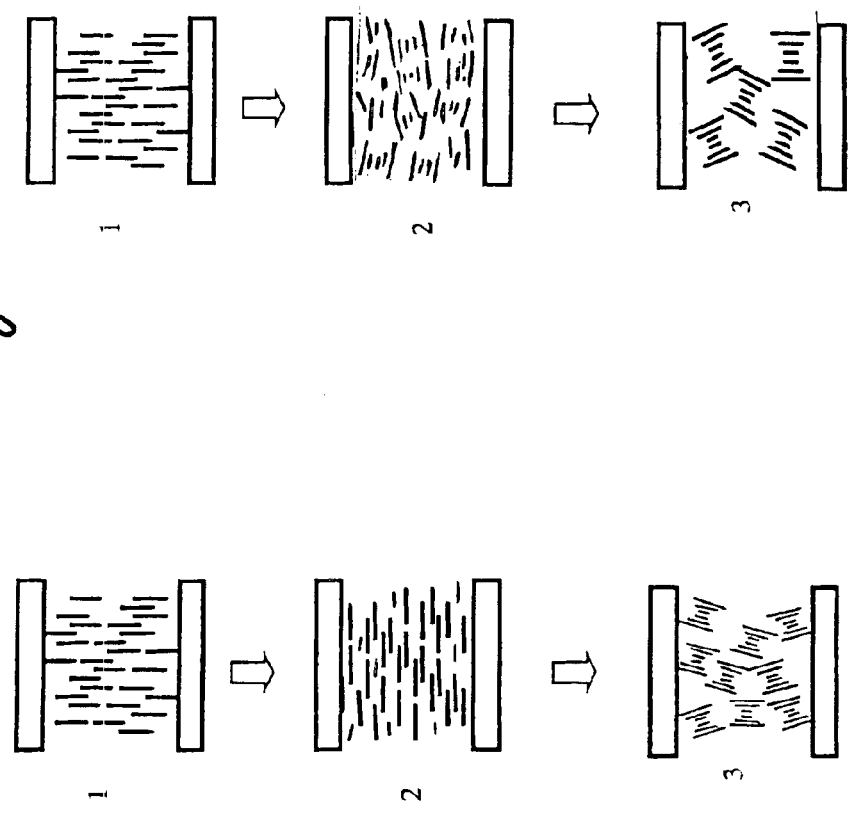

DRIVING METHOD FOR A CHOLESTERIC LIQUID CRYSTAL DISPLAY DEVICE HAVING A MEMORY MODE OF OPERATION AND A DRIVING APPARATUS

CROSS-REFERENCE TO RELATED APPLICATIONS

The entire disclosure of Japanese Patent Application No. 2000-101580 filed on Apr. 3, 2000, No. 2000-118942 filed on Apr. 20, 2000, No. 2000-101579 filed on Apr. 3, 2000, No. 2000-121392 filed on Apr. 21, 2000, No. 2000-126639 filed on Apr. 26, 2000 and No. 2000-121391 filed on Apr. 21, 2000, including the specification, claims, drawings and summary are incorporated herein by reference in their entirety.

BACKGROUND OF THE INVENTION

1. Field of the Invention

The present invention relates to a driving method for a liquid crystal display device with a liquid crystal layer having a memory mode of operation and a driving apparatus.

2. Discussion of Background

At present, TN, STN, TFT liquid crystal display elements are widely used. In these liquid crystal display elements, a display is effected by conducting usually a predetermined driving. On the other hand, a cholesteric or a chiral nematic liquid crystal having a memory mode of operation (hereinbelow, referred to as CL-LC) is noted, and liquid crystal display devices provided with such liquid crystal (hereinbelow, referred to as CL-LCD) are studied for practical use.

CL-LC held between a pair of parallel substrates has a "twist structure" wherein the direction of the liquid crystal is twisted at a constant period. There is an alignment that the center axis of twist (hereinbelow, referred to as a helical axis) is in a perpendicular direction in average to the substrates.

There is a complete planar state (hereinbelow, referred to as a PP state) wherein each helical axis of a plurality of liquid crystal domains is substantially completely perpendicular to the substrate surfaces and an incomplete planar state (hereinbelow, referred to as PL state) wherein the direction in average of each helical axis of a plurality of liquid crystal domains is substantially perpendicular to the substrate surfaces. Then, an incident circularly polarized light, which corresponds to the direction of twist of the liquid crystal layer, is selectively reflected. The wavelength $\lambda$ of the selectively reflected light is substantially equal to the product of an average refractive index $n_{AVG}$ of a liquid crystal composition and a pitch p of the liquid crystal composition ($\lambda = n_{AVG} \cdot p$).

The pitch p is determined according to $p = 1/(c \cdot HTP)$ where c is the amount of an optically active substance such as a chiral agent or the like and HTP (Helical Twisting Power) is a constant of the optically active substance. Accordingly, the selective reflection wavelength can be adjusted by the type and amount of the optically active substance. By determining the pitch so that the selective reflection wavelength of CL-LC is outside a visible region, a display becomes transparent in visual observation at the time of selective reflection and provides an operational mode of transmission and scatter.

A PP state produces a large regular reflection for incident light and extremely high reflection characteristics at a specified viewing angle. On the other hand, a PL state produces a relatively small regular reflection and high reflection characteristics at a relatively wide viewing angle.

Further, CL-LC can exhibit a focalconic state (hereinbelow, referred to as a FC state) wherein helical axes of liquid crystal domains are directed in a random direction or are aligned in a non-perpendicular direction to the substrate surfaces. Generally, the liquid crystal layer in a FC state shows a weak scattering state as a whole. There is no reflection of light having a specified wavelength as at the time of selective reflection. Further, the FC state, the PL state and the PP state exist stably even when an electric field is not applied.

FIG. 18(a) is a diagram showing a PL state and FIG. 18(b) is a diagram showing a FC state, which indicate aligning states of liquid crystal domains in a shape of gourd-shaped drum. The selective reflection wavelength in a PP state is generally given by $\lambda = n_{AVG} \cdot p$. The selective reflection wavelength in a PL state tends to shift to a short wavelength side in comparison with a case of the PP state because there is a distribution in the direction of the helical axis.

By providing an absorbing layer at a rear surface side in the FC state shown in FIG. 18(b), a display in a color of the absorbing layer can be obtained. Accordingly, a display having a memory mode of operation can be realized by utilizing two states: the PL state as a clear state and the FC state as a dark state (when the absorbing layer is black).

The basic construction of CL-LCD is disclosed in George H. Heilmeier, Joel E. Goldmacher et al, Appln. Phys. Lett., 13 (1968), 132 and U.S. Pat. No. 3,936,815. Further, U.S. Pat. No. 4,097,127 discloses that an intermediate state wherein a PL state and a FC state are mixed, exists stably, which can be utilized for a display.

Next, a driving method for CL-LCD will be described. In U.S. Pat. No. 3,936,815, a PL state is changed to a FC state or a FC state is changed to a PL state respectively depending on magnitudes of the amplitude of a driving voltage. In the latter case, the change is caused via a homeotropic state (hereinbelow, referred to as a HO state) in which the liquid crystal molecules are directed substantially in parallel to a voltage application direction, and accordingly, the highest voltage is required.

In CL-LC, an effective value of the waveforms of a series of applied voltages does not directly determine the state of the liquid crystal after the removal of the voltages, but the display after the removal of the voltages relies on an application time and an amplitude of a voltage pulse applied just before.

Next, a description will be given as to a matrix display in CL-LCD. It is assumed a voltage to change the liquid crystal into a FC state is VF, a lower limit voltage to change it into a PL state is $V_p$ and an upper limit voltage which does not cause a change of the display state even by applying a voltage is $V_S$.

In conducting a a-line-at-a-time driving, a voltage pulse having a voltage amplitude of $V_r$ is applied to a row electrode, and in synchronism with this, a voltage pulse having a voltage amplitude of $V_C$ is applied to a column electrode. A selection pulse is applied once to each row electrode to complete a display sequence.

In the display sequence, when an ON display is selected, a voltage amplitude of $(V_r + V_C)$ is applied once to a display pixel, and in a non-selection period in the ON display, a voltage $V_C$ is applied to the display pixel. Further, when an OFF-display is selected, a voltage amplitude of $(V_r - V_C)$ is once applied to a display pixel, and in a non-selection period in an OFF-display, a voltage $V_C$ is applied to the display pixel. When a PL state is selected in an ON time, and a FC state is selected in an OFF time, the conditions of the respective voltages are as follows.

$$V_r + V_C > V_P, V_r - V_C = V_F$$

Further, it is necessary that $V_C < V_S$, so that the written state does not change. Thus, a matrix display can be effected by controlling the applied voltages as described above.

In CL-LCD, even when the number of scanning electrodes is increased, the quality of the display when display data are written is not deteriorated. Further, a driving voltage does not increase even when the number of electrodes is increased. However, the quality of the display when writing image data is poor as the number of scanning electrodes increases. Namely, when writing a state of display, selection pulses are applied to each scanning electrode in a predetermined application time. In this case, if the number of scanning electrodes is increased, a state that the scanning lines flow on the display surface is observed. Accordingly, it is necessary to shorten an application time of selection pulses depending on an increase in the number of scanning electrodes to shorten the display sequence.

When the application time of selection pulses is shortened, preferred display characteristics can be maintained by adjusting the amplitude of applied voltages in writing to change the state from an OFF-display (FC state) to an ON display (PL state). On the other hand, there is a problem in writing to change the state from an ON display (PL state) to an OFF-display (FC state). In this case, a slightly scattering state is not sometimes sufficiently obtained in the FC state, and the alignment of the liquid crystal which shows selective reflection may partly remain. Then, the written OFF-display (FC state) does not show a sufficient darkness, when a black absorbing layer is provided at a rear surface side of CL-LCD as described above.

Namely, the contrast ratio of a display is reduced. Further, a difference of light and dark occurs in a region where the previous display was in an ON display (PL state), and thereafter, an OFF-display (FC state) was written, and also in a region where the previous display was in an OFF-display, and then, an OFF-display was written plural times in series, and therefore, an uneven display is produced.

The above-mentioned problem results from an application time of a selective pulse. When the application time is shortened, it is impossible to change the state into a slightly scattering FC state in a complete sense by writing an OFF-display one time. Further, the problem is also because the optical characteristics of the written OFF-display, namely, a degree of slight scattering in an FC state or a degree of remaining liquid crystal alignment exhibiting selective reflection, change relying on the previous state.

As a result, a previously written image is often observed as a residual image. Accordingly, it is difficult to shorten the application time of the selection pulse, i.e., to increase the number of scanning electrodes while an excellent display quality is maintained.

As described above, in CL-LCD, problems occur when the volume of the display is large by increasing the number of scanning electrodes, the contrast ratio is decreased or an uneven display is produced.

In other words, it is necessary to extend a writing time to maintain the display quality when a highly precise display is to be provided. However, when the writing time is extended, scanning lines appear to flow on the display surface. Further, the following driving method is known other than the driving method as in U.S. Pat. No. 3,936,815.

SID92, Digest, P. 759–761 (1992) discloses that a pulse-like voltage is applied to CL-LC to reset the state of liquid crystal alignment before the application of voltage into PL state or a FC state. Such a driving waveform is shown in FIG. 6.

Further, U.S. Pat. No. 5,933,203 discloses a technique of applying a voltage pulse having a larger amplitude to present a HO state, and then, successively applying a voltage pulse having a smaller amplitude.

The patent publication document of EP0957394A1 discloses a resetting method for CL-LCD. After the application of a voltage pulse to render the liquid crystal to be a HO state, a voltage pulse is applied to change the liquid crystal layer into a PL state, and thereafter, a voltage pulse is further applied to change it into a FC state. In this case, a resetting time is long as a whole because there is a phase change from the HO state to the PL state which is low in changing speed. Further, flickering is produced during the resetting time because all of the pixels are once turned to a reflective display state in the PL state.

In CL-LC after erasing the previous display, either a PL state indicating a selective reflection or a FC state indicating no reflection may be chosen when the display is rewritten. However, since a HO state at an erasing time does not show reflection, a FC state which also does not show reflection after erasing can provide a natural impression, in particular in a case of using a negative display which makes the background non-reflective.

Further, "a residual image" is one problem caused by shortening the application time of a selection pulse. Such phenomenon occurs because the optical characteristics of a written OFF-state remain. Namely, the liquid crystal alignment in a FC state is influenced by the liquid crystal alignment before the phase change, and the liquid crystal alignment during selective reflection slightly remains.

Thus, in the conventional technique, it is very difficult to obtain a FC state providing the lowest reflectance when an absorbing layer is formed on a rear surface, without the remaining of selective reflection, by applying a short voltage pulse once.

Accordingly, the present invention provides a driving method capable of resetting a display in a shorter time. Namely, it is an object of the present invention to provide a driving method and a driving apparatus which suppresses the occurrence of a residual image even during high-speed writing, prevents the reduction of the contrast ratio of a display, and can provide a highly precise display of high quality.

SUMMARY OF THE INVENTION

Namely, in accordance with a first aspect of the present invention, there is provided a driving method for driving a liquid crystal display device with a cholesteric liquid crystal having a memory mode of operation, the driving method including a first stage of applying a voltage so that the alignment of the cholesteric liquid crystal is substantially in parallel to a voltage application direction; a second stage of applying a voltage to change the state of the cholesteric liquid crystal to a homogeneous state or a homogeneous/planar-mixed state; and a third stage of applying a voltage to change the state of the cholesteric liquid crystal from the homogeneous state or the homogeneous/planar-mixed state to a focalconic state.

Further, in a second aspect, there is provided a driving method for driving a liquid crystal display device with a cholesteric liquid crystal having a memory mode of operation, the driving method including a first stage of applying a voltage so that the alignment of the cholesteric liquid crystal is substantially in parallel to a voltage application direction; a second stage of applying a voltage to change the state of the cholesteric liquid crystal to a homogeneous state or a homogeneous/planar-mixed state; and a third stage of applying a voltage to change the state of the cholesteric liquid crystal from the homogeneous state or the homogeneous/planar-mixed state to a focalconic/planar-mixed state.

Further, in a third aspect, the driving method according to the first aspect or the second aspect is provided wherein $0.8 \times \tau_H \leq \tau_2 \leq 8 \times \tau_H$ is satisfied where $\tau_2$ is a period of the second stage and $\tau_H$ is a time spent until the cholesteric liquid crystal in a homeotropic state by the application of a voltage indicates the lowest dielectric constant after the application of the voltage is stopped.

Further, according to a fourth aspect, there is provided the driving method according to the third aspect wherein $\tau_H \leq \tau_2 \leq 5 \times \tau_H$ is satisfied.

Further, in a fifth aspect, there is provided the driving method according to any one of the first aspect to the fourth aspect wherein the voltage value applied in the second stage is 0 V.

Further, in a sixth aspect, there is provided the driving method according to any one of the first aspect to the fifth aspect wherein a voltage waveform applied in the first stage is constituted by a pulse-like voltage having a voltage amplitude of $V_1$; a voltage waveform applied in the third stage is constituted by a pulse-like voltage having a voltage amplitude of $V_3$; and $V_1$ is larger than $V_3$ and $\tau_3$ is smaller than $\tau_1$ where $\tau_1$ and $\tau_3$ are respectively voltage application times in these stages.

Further, in a seventh aspect, there is provided the driving method according to any one of the first aspect to the sixth aspect wherein when a-line-at-a-time operation is carried out to apply a voltage waveform based on display data of each display pixel after the first stage to the third stage, and conditions of applying voltages are determined so as to write a planar state in an ON display and to write a focalconic state in an OFF state, a pulse width modulation system is used for a gray scale display.

Further, in a eighth aspect, there is provided a driving apparatus for driving a liquid crystal display device with a cholesteric liquid crystal having a memory mode of operation, the driving apparatus including a first period determining means for determining a period of a first stage; a second period determining means for determining a second period in succession to the first stage; a third period determining means for determining a third period in succession to the second stage; and a voltage application means wherein a voltage is applied to the cholesteric liquid crystal so that its alignment is substantially in parallel to a voltage application direction in the first period produced by the first period determining means; a voltage is applied to the cholesteric liquid crystal to change the state of the liquid crystal to a homogeneous state or a homogenous/planar-mixed state in the second period produced by the second period determining means, and a voltage is applied to the cholesteric liquid crystal to change the state from the homogeneous state or the homogenous/planar-mixed state to a focalconic state or a planar/focalconic-mixed state in the third period produced by the third period determining means.

Further, in a ninth aspect, there is provided a driving method for driving a liquid crystal display device with a cholesteric liquid crystal having a memory mode of operation, the driving method including a first stage of applying a voltage so that the orientation of the cholesteric liquid crystal is substantially in parallel to a voltage application direction before a voltage is applied to each pixel based on conditions of voltage corresponding to display data; a second stage of applying a voltage to change the state of the cholesteric liquid crystal to a homogeneous state or a homogeneous/planar-mixed state; and a third stage of applying a voltage to accelerate the change of the cholesteric liquid crystal from the homogeneous state or the homogeneous/planar-mixed state to a focalconic state or a focalconic/planar-mixed state, wherein the second stage and the third stage are repeated after the first stage.

Further, in a tenth aspect, there is provided the driving method according to the ninth aspect wherein the voltage value applied in the second stage is 0 V.

Further, in an eleventh aspect, there is provided the driving method according to the ninth aspect or the tenth aspect wherein the number of times of repeating the second stage and third stage is 2 to 10.

Further, in a twelfth aspect, there is provided the driving method according to the ninth aspect, the tenth aspect or the eleventh aspect wherein a voltage waveform applied in the first stage is constituted by a pulse-like voltage having a voltage amplitude of $V_1$; a voltage waveform applied in the third stage is constituted by a pulse-like voltage having a voltage amplitude of $V_3$; and $V_1$ is larger than $V_3$ and $\tau_3$ is smaller than $\tau_1$ where $\tau_1$ and $\tau_3$ are respectively voltage application times in these stages.

Further, in a thirteenth aspect, there is provided the driving method according to the ninth aspect, the tenth aspect or the eleventh aspect wherein a voltage waveform applied in the first stage is constituted by a pulse-like voltage having a voltage amplitude of $V_1$; a voltage waveform applied in the third stage is constituted by a pulse-like voltage having a voltage amplitude of $V_3$; and $V_1$ is equal to $V_3$ and $\tau_3$ is smaller than $\tau_1$ where $\tau_1$ and $\tau_3$ are respectively voltage application times in these stages.

Further, in a fourteenth aspect, there is provided the driving method according to any one of the ninth to the thirteenth aspect wherein when a-line-at-a-time operation is carried out to apply a voltage waveform based on display data of each display pixel after the completion of the first stage to the third stage, and conditions of applying voltages are determined so as to write a planar state in an ON display and to write a focalconic state in an OFF state, and a pulse width modulation system is used for a gray scale display.

Further, in a fifteenth aspect, there is provided a driving apparatus for driving a liquid crystal display device with a cholesteric liquid crystal having a memory mode of operation, the driving apparatus including a first period determining means for determining a period of a first stage; a second period determining means for determining a second period in succession to the first stage; a third period determining means for determining a third period in succession to the second stage; and a voltage application means. A voltage is applied to the cholesteric liquid crystal so that its alignment is substantially in parallel to a voltage application direction in the first period produced by the first period determining means, a voltage is applied to the cholesteric liquid crystal to change the state of the liquid crystal to a homogeneous state or a homogenous/planar-mixed state in the second period produced by the second period determining means, and a voltage is applied to the cholesteric liquid crystal to accelerate a change of the state from the homogeneous state or the homogenous/planar-mixed state to a focalconic state or a planar/focalconic-mixed state in the third period produced by the third period determining means. Also included is a frequency controlling means for operating repeatedly the second period determining means and the third period determining means after the operation of the first period determining means.

Further, in a sixteenth aspect, there is provided a driving method for driving a liquid crystal display device with a cholesteric liquid crystal having a memory mode of operation, the driving method including initializing a display state by applying a predetermined voltage to each pixel and applying a voltage to each pixel based on conditions of voltage corresponding to display data. Further, when the temperature of the cholesteric liquid crystal is lower than a predetermined temperature, a voltage application time is extended from the voltage application time corresponding to the predetermined temperature, and when the temperature of the cholesteric liquid crystal is higher than the predetermined temperature, a voltage application time is shortened from the voltage application time corresponding to the predetermined temperature.

Further, in a seventeenth aspect, there is provided the driving method according to the sixteenth aspect wherein in driving according to a passive addressing system, when a period for initializing is represented by $T_1$ and a period for applying a voltage to each pixel based on conditions of voltage corresponding to display data is represented by $T_2$, the lengths of $T_1$ and $T_2$ are extended from the lengths of $T_1$ and $T_2$ determined with respect to the predetermined temperature when the temperature of the cholesteric liquid crystal is lower than the predetermined temperature.

Further, in an eighteenth aspect, there is provided the driving method according to the seventeenth aspect wherein the period $T_1$ for initializing includes a first stage of applying a voltage so that the alignment of the cholesteric liquid crystal is substantially in parallel to a voltage application direction; a second stage of applying a voltage to change the state of the cholesteric liquid crystal to a homogeneous state or a homogeneous/planar-mixed state; and a third stage of applying a voltage to change the state of the cholesteric liquid crystal from the homogeneous state or the homogeneous/planar-mixed state to a focalconic state or a focalconic/planar-mixed state. Further, when periods of the first stage, the second stage and the third stage are respectively represented by $T_{10}$, $T_{11}$ and $T_{12}$, and when the temperature of the cholesteric liquid crystal is lower than a predetermined temperature, the lengths of $T_{10}$, $T_{11}$ and $T_{12}$ are extended from the lengths of $T_{10}$, $T_{11}$ and $T_{12}$ determined with respect to the predetermined temperature.

Further, in a nineteenth aspect, there is provided the driving method according to the eighteenth aspect wherein when $T_{10}$, $T_{11}$, $T_{12}$ and $T_2$ at a predetermined temperature are represented by $T_{10r}$, $T_{11r}$, $T_{12r}$ and $T_{2r}$, and when the temperature of CL-LC is lower than the predetermined temperature, $T_{10}$, $T_{11}$, $T_{12}$ and $T_2$ are made respectively to be $n_1 \times T_{10r}$, $n_2 \times T_{11r}$, $n_1 \times T_{12r}$ and $m \times T_{2r}$, where $n_2 \geq n_1$ and $n_2 \geq m$.

In a twentieth aspect, there is provided the driving method according to the sixteenth aspect wherein when the predetermined temperature is 25° C., a period for applying a voltage to each pixel based on conditions of voltage corresponding to display data at an optional temperature $t_p$ is $T_2(t_p)$ and $K_A$ is a constant relying on 5 to 50 liquid crystal materials, the relation of the following Formula 1 is satisfied:

$$T_2(t_p) = T_2(25) \times 2\hat{}((25-t_p)/K_A) \qquad (1)$$

Further, in a twenty-first aspect, there is provided the driving method according to the nineteenth aspect wherein when the predetermined temperature is 25° C., and $K_B$ is a constant relying on 5 to 50 liquid crystal materials, the magnification $n(t_p)$ relating to $T_{10}$, $T_{11}$, $T_{12}$ and $T_2$ at an optional temperature $t_p$ satisfies the relation of the following Formula 2 (^ indicates an index):

$$n(t_p) = n(25) \times 2\hat{}((25-t_p)/K_B) \qquad (2)$$

Further, in a twenty-second aspect, there is provided a driving method for driving a liquid crystal display device with a cholesteric liquid crystal having a memory mode of operation, the driving method including a first stage of applying a voltage so that the alignment of the cholesteric liquid crystal is substantially in parallel to a voltage application direction and a second stage of applying a voltage to change the state of the cholesteric liquid crystal to a homogenous state or a planar state.

Further, in a twenty-third aspect, there is provided the driving method according to the twenty-second aspect wherein the voltage value applied in the second stage is 0 V.

Further, in a twenty-fourth aspect, there is provided the driving method according to the twenty-third aspect wherein the period of the second stage is 0.3–100 ms.

Further, in a twenty-fifth aspect, there is provided a driving apparatus for driving a liquid crystal display device with a cholesteric liquid crystal having a memory mode of operation, the driving apparatus including a first period determining circuit for determining a period of a first stage; a second period determining circuit for determining a second period in succession to the first stage; and a voltage application circuit wherein a voltage is applied to the cholesteric liquid crystal so that its alignment is substantially in parallel to a voltage application direction in the first period produced by the first period determining circuit, and a voltage is applied to the cholesteric liquid crystal to change the state of the liquid crystal to a homogeneous state or a planar state in the second period produced by the second period determining circuit.

Further, in a twenty-sixth aspect, there is provided the driving apparatus according to the twenty-fifth aspect wherein the liquid crystal display device is provided with row electrodes and column electrodes; a passive addressing type driving is conducted; the voltage application circuit comprises a row driver for driving the row electrodes and a column driver for driving the column electrodes; and a controlling circuit is provided to instruct the row driver to apply a voltage of a non-display state to all the row electrodes and to instruct the column driver to apply a voltage of an ON display to all the column electrodes in the first period.

Further, in a twenty-seventh aspect, there is provided a driving method for driving a liquid crystal display device with a cholesteric liquid crystal having a memory mode of operation, in which when a time spent until the cholesteric liquid crystal in a homeotropic state by the application of a voltage indicates the lowest dielectric constant after the application of the voltage is stopped, is represented by 8 multipled time of $\tau_H$, a voltage pulse is applied to the cholesteric liquid crystal so that the liquid crystal alignment is substantially in parallel to a voltage application direction; the state of the cholesteric liquid crystal is changed by applying a voltage pulse of lower than $\tau_H$, and a voltage pulse is applied to effect a display.

In addition, the inventors of the present invention have studied in detail a re-arrangement state of liquid crystal molecules in CL-LCD immediately after the application of a pulse of high voltage which renders CL-LCD to be in a HO state. First, a description will be given as to the relation of the optical characteristics when a voltage is applied and after erasing the voltage. It is assumed that the dielectric anisotropy of CL-LCD used is positive and a phase state in a display is changed by applying a voltage pulse.

First, CL-LCD is made to be a PL state providing selective reflection. Further, an application time of a voltage pulse is fixed and the voltage amplitude is increased. When the voltage amplitude is small, the PL state initially does not change after the application of the voltage is stopped, and the reflectance does not change. When the voltage amplitude is further increased, CL-LCD becomes a FC state after the application of the voltage is stopped, and shows a slightly scattering state. A color display is obtainable by an absorbing layer provided at a rear side (a black display when the absorbing layer is black).

When the voltage amplitude is further increased, the same PL state as in the initial state is obtained as a state after the application of the voltage is stopped. Further, a voltage pulse is applied to CL-LCD in a FC state providing a slightly scattering state as the initial state, and a change of the display-state is examined. Examination was conducted repeatedly by changing conditions.

When the initial state is a FC state, the application time of a voltage pulse is fixed and the voltage amplitude is increased. When the voltage amplitude is small, the initial FC state does not change and the reflectance does not substantially change after the application of the voltage is stopped. When the voltage amplitude is further increased, a weak selective reflection state in which slightly scattering and selective reflection are mixed can be obtained as the state after the application of the voltage is stopped. When the voltage is further increased, a PL state which provides selective reflection can be obtained as the state after the application of the voltage is stopped.

Namely, a voltage pulse having a larger voltage amplitude than a predetermined voltage amplitude is applied to CL-LCD in a PL state, and then the voltage is stopped. Then, the PL state is changed to a FC state. In the FC state, when a voltage pulse having a large voltage amplitude is applied, the state after the stopping of the application of voltage is turned to a PL state. In the initial state in either a PL state or a FC state, the state is changed to a PL state by applying a high voltage via a HO state in which a long axis direction of each liquid crystal molecule aligns in a voltage application direction when a voltage is applied to the liquid crystal.

When CL-LCD in a HO state is re-arranged into a PL state after stopping the application of voltage, it transits several kinds of alignment of liquid crystal. Therefore, a time from several 100 ms to several seconds is sometimes required depending on a viscosity of the liquid crystal.

FIG. 1 shows a change of the relative dielectric constant of CL-LCD after it is changed to a HO state by applying a voltage pulse. It is assumed on average a change of the dielectric constant corresponds to a change of the alignment direction of the liquid crystal molecules. The dielectric constant indicates the smallest value at about 0.5 ms after the application of voltage is stopped and indicates a stable value at about 1.5 ms. Namely, the direction of alignment on average of the liquid crystal molecules is nearly in parallel to the substrate surface at about 0.5 ms after the application of voltage is stopped.

In addition, FIG. 2 shows a change of reflection spectra of CL-LCD after the application of voltage is stopped. In the Figure, a time of "0.4 to 100 ms" indicates a time elapsed after the application of voltage is stopped. It is understood that selective reflection is not found up to about 1 ms after the application of voltage is stopped, and then the intensity of reflection gradually increases. Further, a time of several 100 ms or more is required to obtain complete a re-alignment from a HO state to a PL state.

The present inventors also determined that from the state of changing the dielectric constant and the reflection characteristics, CL-LC has a special molecular alignment immediately after the application of a high voltage pulse to change the liquid crystal into a HO state. Namely, there is a homogeneous liquid crystal alignment (hereinbelow, referred to as a HG state) as a transit state in which the dielectric constant is smallest, the liquid crystal molecules are substantially in parallel to the substrates, and the liquid crystal does not have a helical structure with a predetermined pitch. Further, a time from stopping the application of voltage to the presentation of a HG state is represented by $\tau_H$.

Further, CL-LC, after it has exhibited a HG state, gradually exhibits a helical structure with a predetermined pitch. The liquid crystal alignment in this stage is referred to as a medium-like state between a HG state and a PL state. In order to obtain an excellent FC state in a shortest time as possible, a first voltage pulse (a high voltage pulse) which makes the liquid crystal a HO state, is applied, then, a second voltage pulse is applied, and thereafter, a third pulse is applied to make the liquid crystal into a FC state.

Further, the amplitude of the second voltage pulse was 0V and an application time of the third voltage pulse was 3.3 msec in order to achieve the resetting operation in the shortest time as possible. FIG. 3 shows the relation between the reflectance after the resetting operation and the amplitude of the third voltage pulse.

Numerical values in FIG. 3 (○: 0 sec, Δ: 0.3 msec, □: 1 msec, ×: 3.3 msec) indicate widths of the second voltage pulse. The width of the second voltage pulse being 0 sec corresponds to the conventional technique. Namely, the third voltage pulse is applied immediately after the first voltage pulse without applying the second voltage pulse.

As is clear from FIG. 3, the reflectance in an obtainable FC state is high when the width of the second voltage pulse is $\tau_H$ or less. Further, the margin of the optimum voltage of the third pulse is small. In particular, when the second voltage pulse is not used, a FC state can not be formed by the third voltage pulse having a shorter width. Here, the FC state includes a FC/PL-mixed state. Such a mixed state is called a semi-FC state. FIG. 31(A) shows diagrammatically the basic change of phase in the present invention, which shows a change from a HO state through a HG state to a semi-FC state. FIG. 31(B) concerns the conventional technique, which shows diagrammatically a change from a HO state through a PL state to a FC state.

Further, to form a FC state in a shorter period, it is preferable that the width of the second voltage pulse, which changes the state from a HO state to a HG state or a HG/PL-mixed state, is as small as possible. Specifically, it is preferable to satisfy the following formula 3 where the width of the second voltage pulse is represented by $\tau_2$:

$$0.8 \circ \tau_H \leq \tau_2 \leq 8 \circ \tau_H \quad (3)$$

Further, it is preferable to satisfy the following formula (4):

$$\tau_H \leq \tau_2 \leq 5 \circ \tau_H \quad (4)$$

Also, in order to further reduce $\tau_2$, it is possible to apply the third voltage pulse in a HG state which does not indicate a predetermined selective reflection in a PL state.

From the above-mentioned, when the application time of the second voltage pulse is gradually reduced, a FC state is formed until the vicinity of $\tau_H$. However, when the application time is smaller than $\tau_H$, the voltage margin becomes small, and the FC state can not sufficiently be formed. The value $\tau_H$ is obtained by the measuring technique of the dielectric constant in FIG. 1. In FIG. 2, a region in the vicinity of $\tau_H$ to a value slightly exceeding it does not exhibit selective reflection.

Namely, there is no selective reflection or a low degree of selective reflection in the region from the vicinity of $\tau_H$ to a value slightly exceeding it. Therefore, it is considered that there is no possibility of giving a strange feeling to a viewer each time display data are rewritten even when the width $\tau_2$ of the second voltage pulse is determined in such region. In the present invention, in the characteristic curves shown in FIG. 2, a region within about 30% of the maximum reflectance in the PL state can be used for a resetting operation. By adjusting an applicable voltage pulse in that range, a change to a desired state of phase can be controlled.

When the conventional display driving method is conducted, a flash phenomenon may occur. Namely, a dark state (a state that a black color on a rear surface is observed) is provided first in a HO state; a clear state is provided in an PL state by applying the second voltage pulse; and the state is again turned to a dark state by applying the third voltage pulse. Accordingly, a viewer feels a strange feeling because the display apparatus shows changes from a dark state to a clear state, and then from the clear state to a dark state each time display data are rewritten.

In the present invention, there is an advantage that a strange feeling is not given to a viewer each time the display data is rewritten in addition to an advantage that an initializing process for rewriting display data at a high speed can be conducted in the shortest time as possible.

The basic structure of an embodiment of the present invention based on the above-mentioned study, includes a first stage of applying a voltage so that the alignment of CL-LC is substantially in parallel to a voltage application direction; a second stage of applying a voltage to change the state of CL-LC into a HG state or a HG/PL-mixed state; and a third stage of applying a voltage to change the CL-LC from the HG state or the HG/PL-mixed state to a FC state, before applying a voltage to each pixel according to conditions of voltage corresponding to display data.

Further, in the second stage, CL-LC may be rendered to be a HG stage in which a predetermined selective reflection is not exhibited in a PL state, and the third voltage pulse may be applied to the liquid crystal in such state. Further, a preferred voltage value applied in the second stage is 0V.

In the driving method for CL-LCD, it is preferred to determine that a voltage waveform applied in the first stage is constituted by a pulse-like voltage having a voltage amplitude of $V_1$; a voltage waveform applied in the third stage is constituted by a pulse-like voltage having a voltage amplitude of $V_3$; and $V_1$ is larger than $V_3$ and $\tau_3$ is smaller than $\tau_1$ where $\tau_1$ and $\tau_3$ are respectively voltage application periods in these stages.

Further, when a-line-at-a-time operation is conducted to apply a voltage waveform based on display data of each display pixel after the first stage to the third stage and conditions of applying voltages are determined so as to write a PL state in an ON display and to write a FC state in an OFF state, a pulse width modulation system may be used for effecting a gray scale display.

BRIEF DESCRIPTION OF THE DRAWINGS

FIG. 8 is a block diagram showing a structural example of a driving apparatus for driving a liquid crystal panel.

FIG. 9(A) and FIG. 9(B) are diagrams showing driving waveforms diagrammatically.

FIG. 31(A) is a diagram showing changes of a phase state in CL-LCD in the present invention, and FIG. 31(B) is a diagram showing changes of phase in the conventional technique.

DESCRIPTION OF THE PREFERRED EMBODIMENTS

Figure 1:
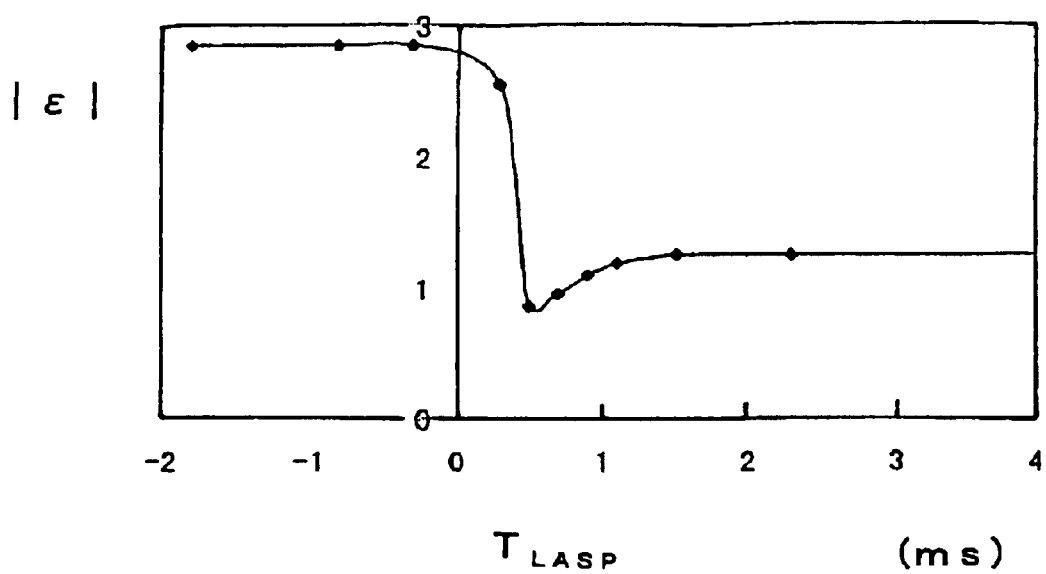
FIG. 1 is a graph showing a change of the relative dielectric constant of CL-LCD in a HO state at the application of a voltage pulse and after the application of voltage is stopped.
Figure 2:
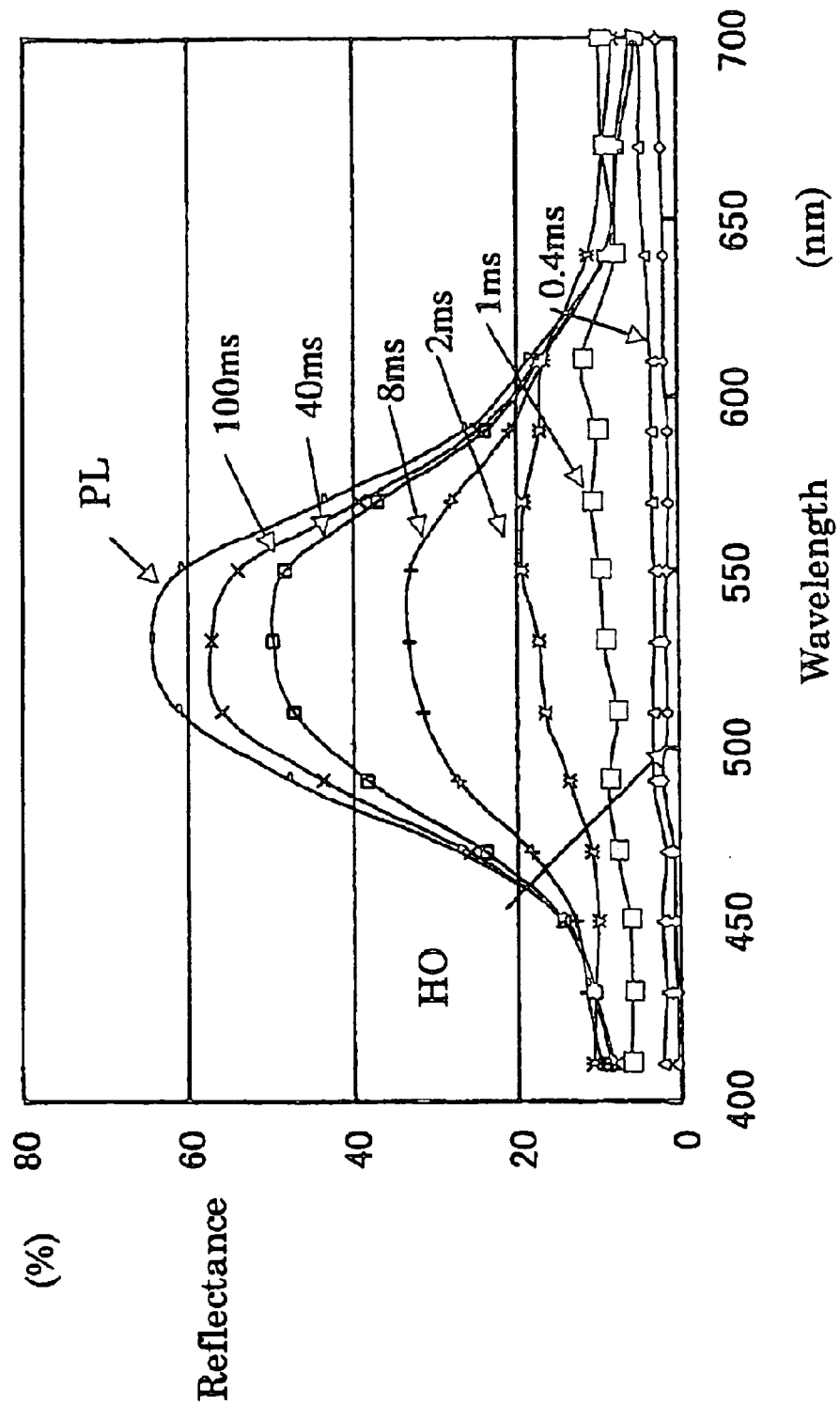
FIG. 2 is a graph showing the reflectance spectra of CL-LCD after the application of voltage is stopped.
Figure 3:
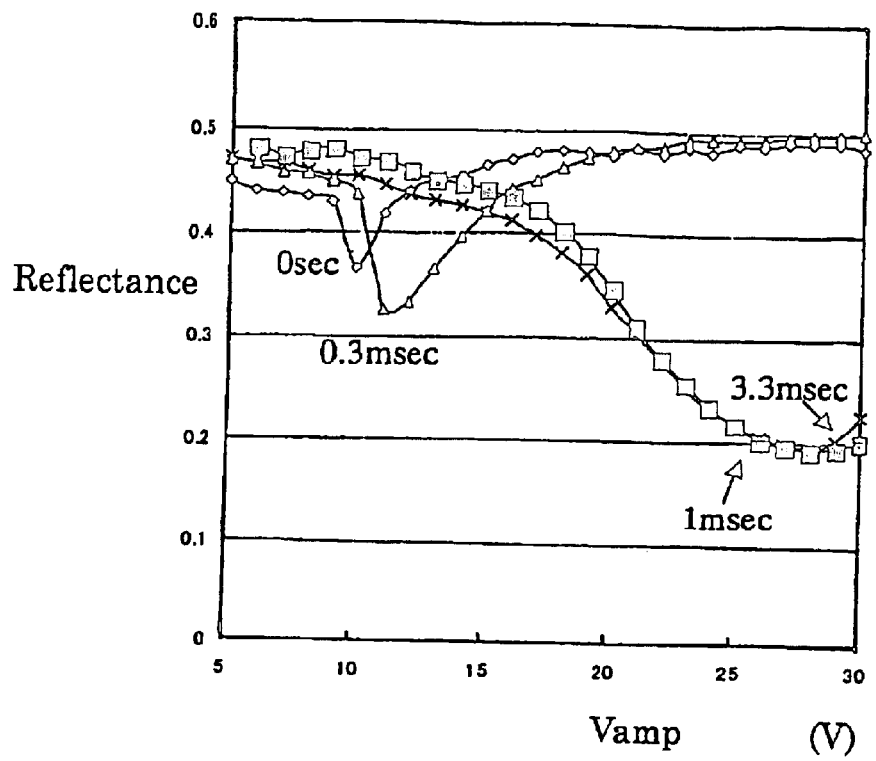
FIG. 3 is a graph showing the relation of the reflectance after a resetting operation when the application time of the third voltage pulse is 3.3 ms to the voltage amplitude of the third voltage pulse.
Figure 4:
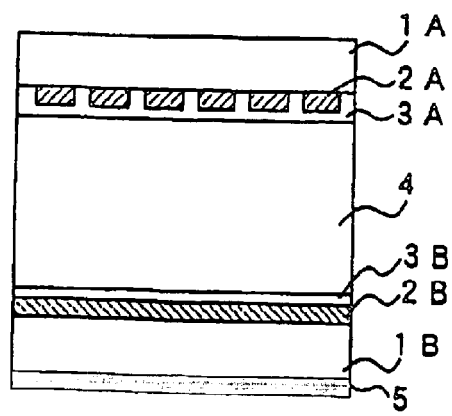
FIG. 4 is a diagram showing CL-LCD in cross section.

Turning first to FIG. 4, which is a cross-sectional view showing diagrammatically the CL-LCD according to the present invention. CL-LCD includes glass substrates 1A and 1B, electrodes 2A and 2B, thin films of polymer 3A and 3B, a liquid crystal composition 4 and a light absorber 5 of black color disposed at a rear surface side to display a FC state and a PL state stably.

Thin films of inorganic material such as silica may also be formed instead of the thin films of polymer 3A and 3B. However, when a rubbing treatment is conducted to a surface of a thin film adjacent to CL-LC, stability in a FC state of CL-LC may be lost depending on the type of thin film. Accordingly, thin films without rubbing is provided or the electrode and the liquid crystal composition are directly in contact with each other.

Additionally, an electrode gap is maintained by spacers or the like. The gap is preferably 2–15 µm, and more preferably 3–6 µm. When the electrode gap is too small, the contrast ratio of a display decreases. When it is too large, the driving voltage increases.

The display may be either by a non-full dot matrix display such as a segment display or a dot matrix display. For the substrate, a glass substrate or a resinous substrate may be used, or a combination of a glass substrate and a resinous substrate may be used. When it is used as a reflective display element, a light absorber may be disposed on an inner surface or an outer surface of either one of the substrates or a substrate having a light absorbing function may be used.

In addition, a cell is formed by scattering a slight amount of spacers on electrode surfaces; sealing four sides of opposed substrates excluding an injection port with a sealing material such as an epoxy resin; and filling a liquid crystal composition by vacuum injection.

Figure 5:
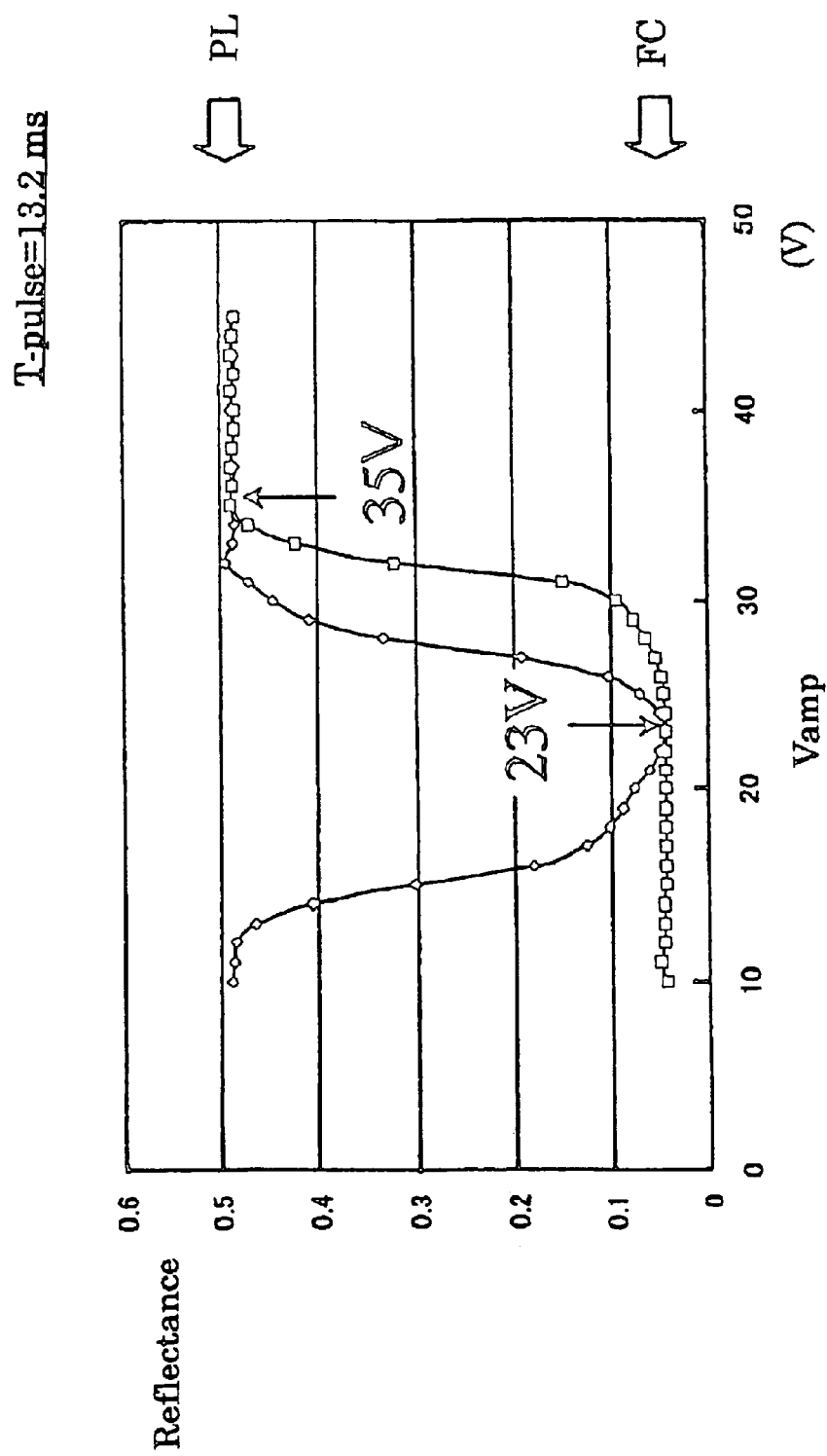
FIG. 5 is a state diagram showing a change of a display state in the application and the erasing of a voltage pulse (13.3 ms).
Figure 6:
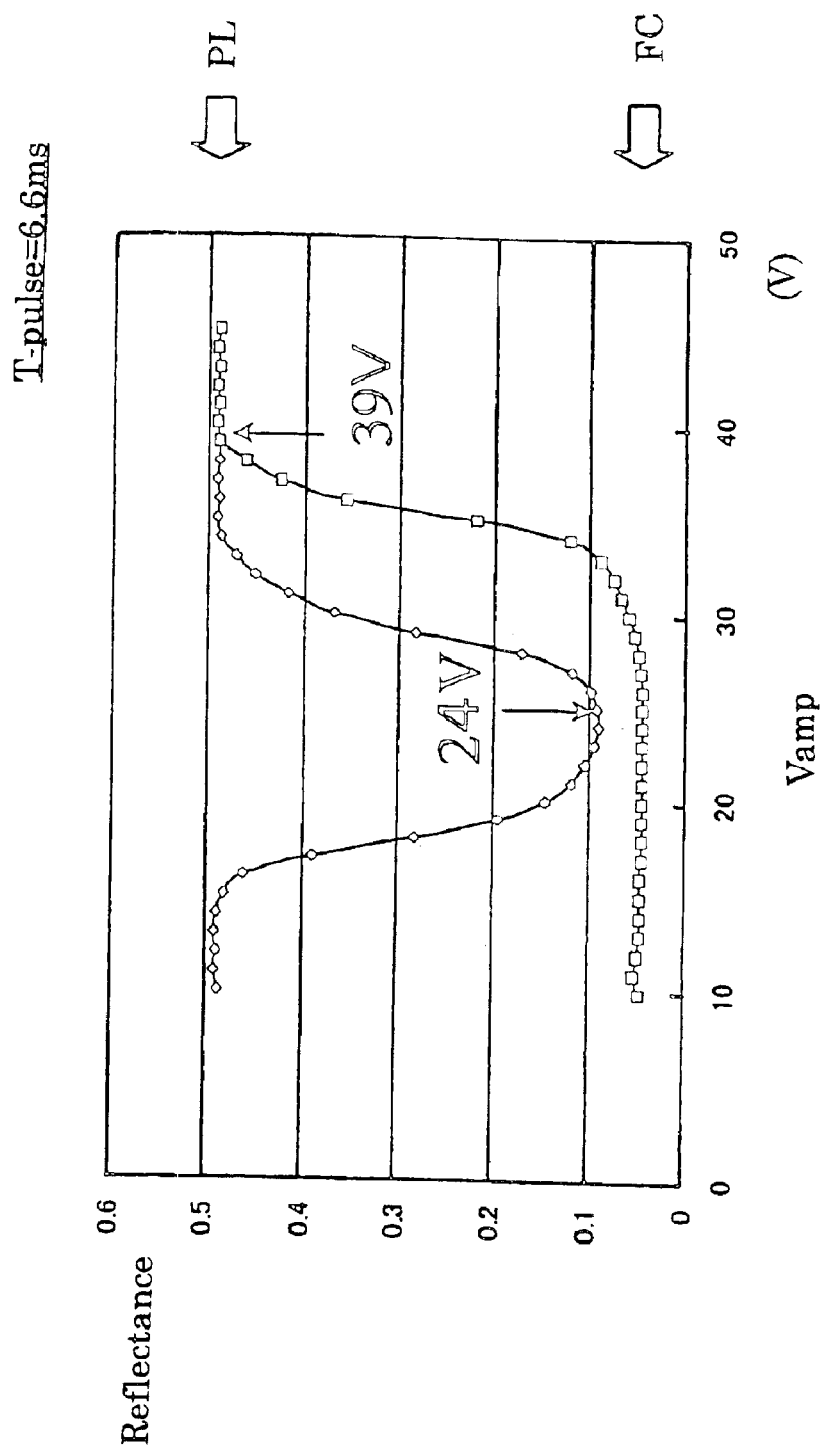
FIG. 6 is a state diagram when the width of a voltage pulse is shortened (6.6 ms).
Figure 7:
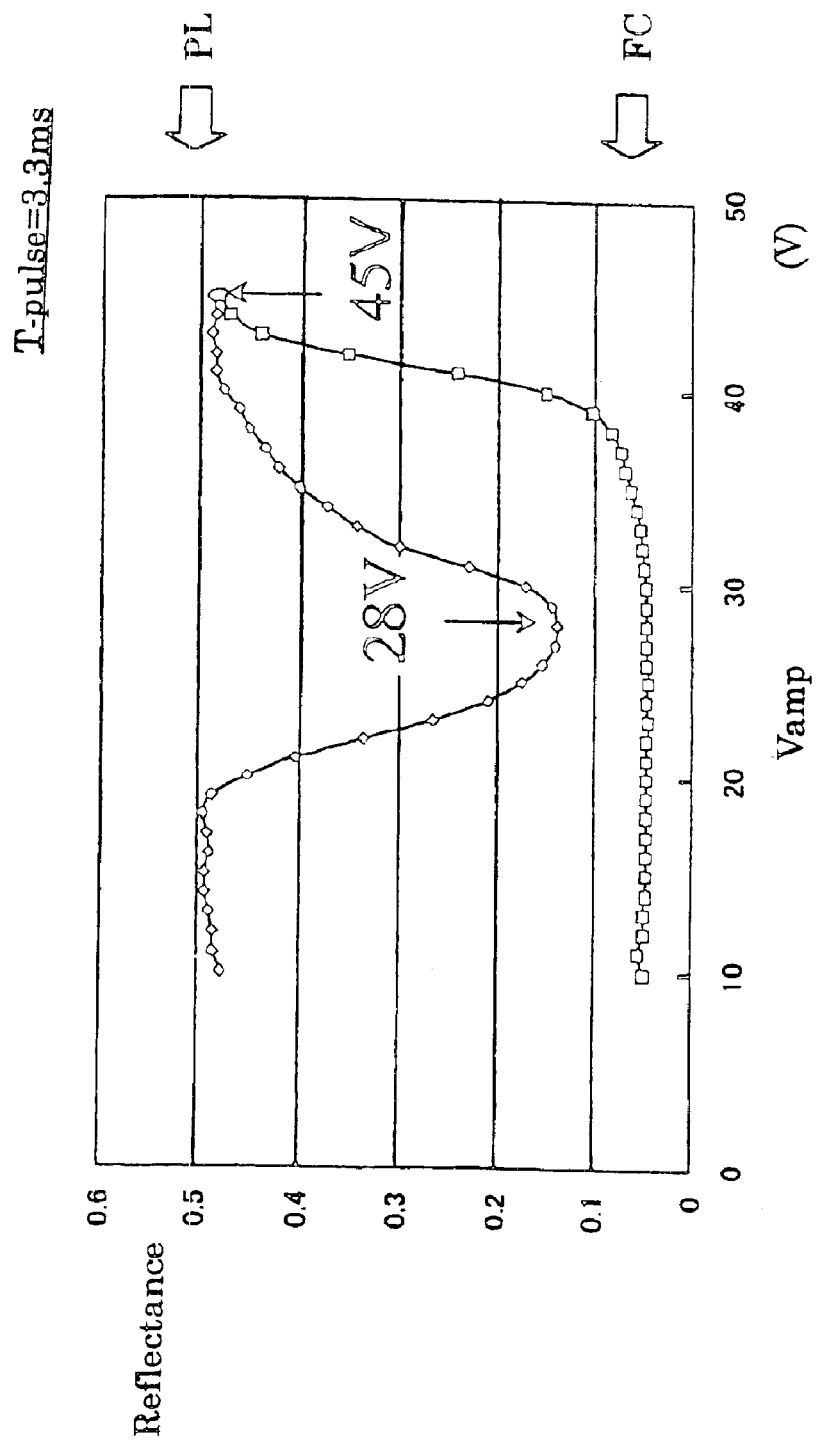
FIG. 7 is another state diagram when the width of a voltage pulse is shortened (3.3 ms).

In order to examine the optical characteristics of CL-LCD at the time of applying a voltage and after the erasing the voltage, examination was repeated to determine the display states by applying a voltage pulse to the liquid crystal panel, and then erasing the voltage pulse. For the states of the panel before conducting a voltage applying treatment, a PL state and a FC state are used. FIGS. 5, 6 and 7 are explanatory drawings showing a summary of experimental results. In more detail, FIG. 5 shows an example of the relation between the voltage amplitude and the reflectance wherein a voltage pulse of 13.2 ms is applied, and the reflectance 10 sec after the erasing of the voltage is measured. In FIG. 5, a diamond-like mark (◇) shows that an initial state is a PL state, and a square mark (■) shows that an initial state is a FC state. FIG. 6 and FIG. 7 show experimental results when the width of the voltage pulse is further shortened.

It is determined from the experimental results that a PL state in which the reflectance is high and the state is stable can be obtained by applying a voltage having an amplitude of 35V or more irrespective of the previous state. In other words, this means that when a pulse-like voltage treatment is conducted so that the liquid crystal is sufficiently homeotropic-aligned at the time of applying a voltage, the state can be changed to a PL state by erasing the voltage. Further, a FC state in which the reflectance is low and the state is stable can be formed by applying a voltage having an amplitude of 23V.

Namely, in CL-LC used for the experiments, the state of CL-LCD can be turned to a PL state by applying a voltage having an amplitude of 35V or more for 13.2 ms even though the initial state is any state. Further, a FC state in which the reflectance is low and the state is stable can be formed by applying a voltage having an amplitude of 23V. This makes it possible to perform the resetting operation in a shorter time, which is difficult in the conventional technique.

Here, when a voltage treatment corresponding to a HO state is conducted according to conditions obtained by experimental results as shown in FIG. 5 to FIG. 7, and a voltage treatment corresponding to a FC state is conducted successively, the liquid crystal assumes a homeotropic-aligned state at the first voltage treatment, however, a predetermined FC state is not always provided after conducting the next voltage treatment.

In an embodiment of the present invention, accordingly, after conducting a treatment of applying a relatively high voltage in a first stage, a second stage is provided wherein there is a stage of applying no voltage, i.e., a state of 0V in potential. Thereafter, a voltage treatment corresponding to a FC state (a third stage) is carried out so that writing is conducted according to individual display data The state in which no voltage is applied, i.e., a period of the state that a voltage difference is 0V (a period of the second stage) is a time spent from a HO state to a HG state or a HG/PL-mixed state. Here, the voltage difference of 0V may be produced by a voltage pulse having a small voltage value which functions substantially as 0V.

With such voltage treatments, the previously written state can completely be erased by the first voltage treatment. Namely, CL-LCD becomes a homeotropic aligned state. Then, in the period of a voltage difference of 0V in the first voltage treatment, the alignment state of CL-LCD is changed to a HG state or a HG/PL-mixed state. Further, by the next voltage treatment, a FC state or a FC/PL-mixed state is written.

In addition; when the application time of voltage is reduced in the next voltage treatment (the third stage) which corresponds to the writing into a FC state, a FC/PL-mixed state can be obtained. Then, by writing individual display data, a display in a PL state can be obtained from the mixed state in an ON time, and a display in a complete FC state can be obtained from the mixed state in an OFF time. Accordingly, even in such a case, a display having a high contrast ratio can be realized at a high speed.

Namely, it is unnecessary to apply in the third stage a voltage having an amplitude such that the state of CL-LCD is rendered sufficiently to be a FC state (i.e., a state that the liquid crystal alignment indicating selective reflection does not substantially remain) is provided. That is, a voltage having an amplitude that CL-LCD is rendered to be a PL/FC-mixing state may be applied. In other words, a lower voltage can be applied or a voltage application period can be shortened in comparison with a case of forming a FC state in which the selective reflection does not substantially remain.

Thus, when an OFF-display is effected in a selection time in a a-line-at-a-time driving period in succession to the first to third stage as described above (namely, if a FC state substantially free from the remaining of selective reflection can be provided after a voltage for forming the FC state has been applied), a display having a good contrast ratio can be obtained.

In the following description, Embodiment A of the present invention will be described with reference to FIG. 8. In the driving circuit, a controller 11 supplies to a row driver 12 a frame signal (FR) as a control signal, a latch pulse signal (LP) for switching rows, an alternating signal or an output reversing signal (M) and a /DOFF signal (/DOFF) as non-display signal. To a column driver 13, a LP signal as a control signal, a clock pulse signal (CP), an M signal, a /DOFF signal and display data are inputted from the controller 11.

The row driver 12 selects the first row when the FR signal becomes a high level, the LP signal corresponds to a signal which shifts rows to be selected by one, and the M signal is a signal for alternating. Further, the CP signal is used as a clock for transferring display data form the controller 11 to the column driver 13 set voltage levels to be applied to the CL-LCD 10 to predetermined levels (a level $V_0$ at an erasing time) respectively. When the /DOFF signal is at a high level, a state of general writing is presented.

EXAMPLE A-1

A thin film of polyimide was formed by spin coating on each surface, which contacts a liquid crystal layer, of the glass substrates with stripe-like transparent electrodes. Then, resinous spacers having a diameter of 4 μm were scattered on the surfaces of the vertically opposing substrates. An empty cell was formed by overlapping the glass substrates by interposing an epoxy resin printed with a width of about 0.4 mm at four sides excluding an injection port so that the strip-like electrodes were crossed.

A chiral nematic liquid crystal (hereinbelow, referred to as liquid crystal A) having a helical pitch of about 0.34 μm was prepared by dissolving and mixing 84.7 parts of a nematic liquid crystal of $T_c 87°$ C. η=0.231, ε=16.5, viscosity η=mPa○s, and specific resistance=$2×10^{11}$ Ω○cm, 5.1 parts of a chiral agent shown in a chemical formula 1, 5.1 parts of a chiral agent shown in chemical formula 2 and 5.1 parts of a chiral agent shown in chemical formula 3.

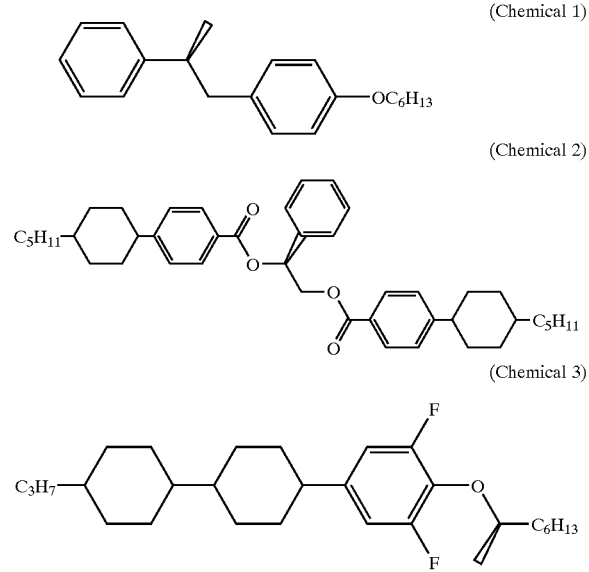

(Chemical 1)

(Chemical 2)

(Chemical 3)

A liquid crystal panel was prepared by injecting the liquid crystal A into the empty cell by a vacuum injection method and by sealing the injection port with a UV ray curing material. The numbers of electrodes are 240 lines with respect to row electrodes, 320 lines with respect to column electrodes and the resolution is about 100 dpi. A lusterless black paint was uniformly coated by spraying a substrate of the liquid crystal panel.

Next, a row electrode and a column electrode in the liquid crystal panel were selected, and a voltage of 40V was applied for 20 msec to the crossing portion of these electrodes. When the crossing portion was observed from a side of the substrate on which the black coating was not formed, after the application of the voltage, the crossing portion indicated a green reflection color. Then, a voltage of 20V was applied for 20 ms. When the crossing portion was observed from a side of the substrate on which the black coating was not formed, the crossing portion indicated substantially a black color.

When a display sequence was started, a voltage of 40V was applied for 13.2 ms to the entirety of the panel to initialize the entire display surface of the liquid crystal panel 10. Subsequently, a non-voltage application time of 1 ms was provided, in which the voltage to be applied to the liquid crystal panel 10 was 0 volts. Then, as a condition of a voltage to change the state to a FC state, a voltage of 23V was applied to all pixels for 3.3 ms. Next, a a-line-at-a-time selection driving was carried out.

A more specific driving sequence will be described with reference to a timing chart in FIG. 9(A). A state that the row driver 12 applies $V_r$ to all row electrodes and the column driver 13 applies $V_C$ to all column electrodes wherein $V_r$ is 35V and $V_C$ is -5V is assumed, for example. Then, a voltage of 40V is applied to all pixels in the liquid crystal panel 10. In FIG. 9(A), a period in which a voltage of 40V is applied is shown as a reset portion (RST-P). Further, the reset portion corresponds to the first period.

Then, after the state that the non-voltage application time in which the applied voltage is 0V is continued for 1 ms, a voltage of 23V is applied to all the pixels for 3.3 msec. Specifically, a voltage of $V_r-V_C$ is applied by the row driver 12 and the column driver 13. In FIG. 9(A), these periods are shown as a non-voltage application portion (WAIT-P) and a focalconic portion (FC-P). The non-voltage application portion corresponds to the second period and the focalconic portion corresponds to the third period.

Then, writing of display data, i.e., a a-line-at-a-time driving is started. In the a-line-at-a-time driving, rows to be selected are changed orderly, and in synchronism with this, column voltages according to display data are outputted to column electrodes. Polarities of a driving voltage waveform are reversed at an appropriate frequency so as to be alternated. In a a-line-at-a-time driving period, when row electrodes are selected, a voltage of $V_r+V_C$ is applied in an ON display (PL state), and a voltage having an amplitude of $V_r-V_C$ is applied in an OFF-display (FC state).

In this Example, $V_r$ was 35V and $V_C$ was 5V. Further, a period for selecting row electrodes once was 3.3 ms. In FIG. 9(A), the a-line-at-a-time driving period is shown as an addressing portion (ADRS-P). A non-voltage application portion may be or may not be provided between the focalconic portion and the addressing portion. FIG. 9(A) exemplifies a case that the non-voltage application portion is provided.

It was confirmed that by conducting a series of voltage treatments before writing the display data, CL-LCD 10 was in a FC state in which a slight residual reflection remained. Further, when writing the display data was performed by the a-line-at-a-time driving and a test pattern was displayed under the above-mentioned conditions, a display having a high contrast ratio was obtained without resulting in a residual image.

EXAMPLE A-2

In the driving conditions in Example A-1, a voltage of 40V was applied for 13.2 ms to the entirety of CL-LCD 10, and then a non-voltage application time of 1 ms in which the voltage to be applied was 0V was provided. In the next voltage treatment period, i.e., the focalconic portion, a voltage of 24V was applied for 2.0 ms, and a a-line-at-a-time driving was started to display a test pattern.

Then, although the state of alignment before starting the a-line-at-a-time driving was a FC/PL-mixed state, the state of display by the a-line-at-a-time driving was one having a high contrast ratio and one free from any residual image wherein the quality was slightly inferior to Example A-1. Further, a time for the display sequence could be reduced in comparison with Example A-1.

As described above, to completely erase the previously written display state, all of the pixels have to be oriented once perpendicularly. For this, a voltage of 40V, for instance, is applied to all of the pixels of CL-LCD 10 in a predetermined period (the reset portion in FIG. 9(A)). However, there is a possibility that the voltage application time is determined to be longer to reduce an applicable voltage in practical use.

It is determined from a result of this Example that a display having a relatively high contrast ratio can be obtained even by shortening the focalconic portion as the third stage. When the focalconic portion is shortened, the alignment state before starting the a-line-at-a-time driving indicates an insufficient FC state in which selective reflection remains in a PL state, i.e., a FC/PL-mixed state. However, since a FC state is written as an OFF-display at the time of the a-line-at-a-time driving, a relatively high contrast ratio can be obtained.

Accordingly, when the voltage conditions to obtain a HO state are represented by $V_1$ (a voltage value of the reset portion) and $\tau_1$ (a period of the reset portion), and the voltage conditions to obtain a FC state by writing are represented by $V_3$ (a voltage value of the focalconic portion) and $\tau_3$ (a period of the focalconic portion), it is possible that $V_1 > V_3$ and $\tau_1 > \tau_3$.

COMPARATIVE EXAMPLE A-1

In the driving conditions of Example A-1, the time of the non-voltage application portion was changed in a range from 0 to 0.3 ms. A display having the same contrast ratio as Example A-1 could not be obtained even when the driving conditions for the a-line-at-a-time driving were changed.

COMPARATIVE EXAMPLE A-2

In a case of $\tau_2$ being 20 ms which was 40 times of $\tau_H$, flickering occurred when the resetting operation was performed. Further, the time spent for the initialization (reset) process is relatively long. The time spent in this case influences largely the structure of one display sequence.

EXAMPLE A-3

In the driving conditions in Example A-1, when display data were written according to the a-line-at-a-time driving, an application time to the column electrodes was divided uniformly into 10 portions in a selection period, and voltages corresponding to ON and OFF according to gradation data were applied to the column electrodes in each divided period. Then, when a test pattern was displayed according to such a voltage application method, a uniform gradation display according to display data could be obtained.

COMPARATIVE EXAMPLE A-3

In the driving conditions of Example A-1, voltages applied to the column electrodes were $V_C$ in ON and $-V_C$ in OFF, and voltage values of $n \circ V_C (-1 < n < 1)$ were applied to the column electrodes in response to the gradation data. A 10 gradation display was presented by changing the voltage values. When various test patterns were displayed, an uneven parallel display produced on the column electrodes and a non-uniform gradation display was provided.

Accordingly, it was determined a good gradation display could not be obtained when amplitude modulation was used although a good gradation display could be obtained by using a pulse width modulation when effecting a gray scale display.

In the following description, a driving circuit for driving a CL-LCD will be described. A driving driver which can realize a a-line-at-a-time selection method (for example, APT: Alto Pleshko Technique or IAPT by improving this technique: improved APT) as the basic driving system for a passive matrix type STN liquid crystal display device, is widely used as IC of a specialized use.

In an IAPT driving driver for driving the passive matrix type STN liquid crystal display device, a selection voltage can be applied only to each row electrode. Accordingly, to change the initial state of CL-LCD in its entire display surface to a FC state, at least 1 frame period is needed to change the state into a HO state. In addition, at least 1 frame period is needed to change the state to a FC state. Further, to effect the change to a HO state in 1 frame period, the change has to be done in 1 selection time in an addressing time. Accordingly, it is necessary to apply a higher voltage than an ON voltage.

A driver having a high voltage endurance is required to realize it, which is difficult. On the contrary, when a sufficient homeotropic alignment is to be obtained with a voltage equal to an ON voltage, it is necessary to extend 1 selection time, with the result that the time required for initialization is longer than a writing time.

Namely, when the IAPT driving driver is applied to CL-LCD without modification, the above-mentioned voltage application treatments (the first stage to the third stage) can not be realized, and the time required for initialization becomes about several times longer than the time of selecting 1 picture. Namely, the time required for rewriting 1 picture including the initialization becomes long. Therefore, the driving apparatus according to the present invention in which an easily usable IAPT driving driver is used, is proposed.

Figures 10, 11:
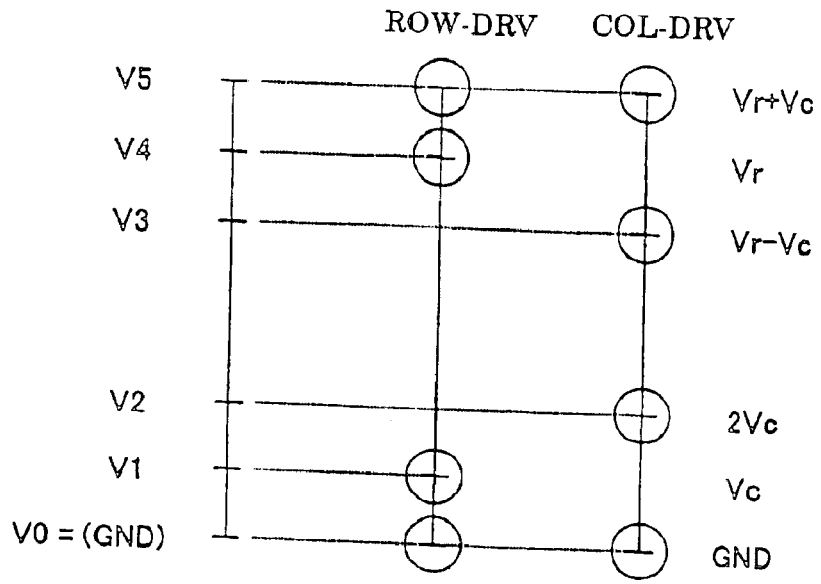
FIG. 10 is an explanatory drawing for explaining the function of an IAPT driving driver.
FIG. 11 is an explanatory drawing showing the relation between a control signal and an applied voltage.

FIG. 10 and FIG. 11 are explanatory drawings for explaining the function of the IAPT driving driver. As shown in FIG. 10, in a column driver (COL-DRV) and a row driver (ROW-DRV), liquid crystal driving voltages having 4 levels are required respectively. However, voltages having 6 levels are required in the entire system. Here, $V_r$ is a voltage applied to the row electrodes in a selection time and $V_C$ is a voltage having a value of ½ of a difference between an ON voltage and an OFF voltage applied to the row electrodes.

As shown in FIG. 11, an output voltage is determined in the row driver and the column driver respectively depending on a polarity reversing signal (M signal) as a level signal and a non-display instruction signal (/DOFF signal). However, when the /DOFF signal is at a low level, all outputs from the row driver and the column driver have a $V_0$ level irrespective of another input signal.

Figure 12:
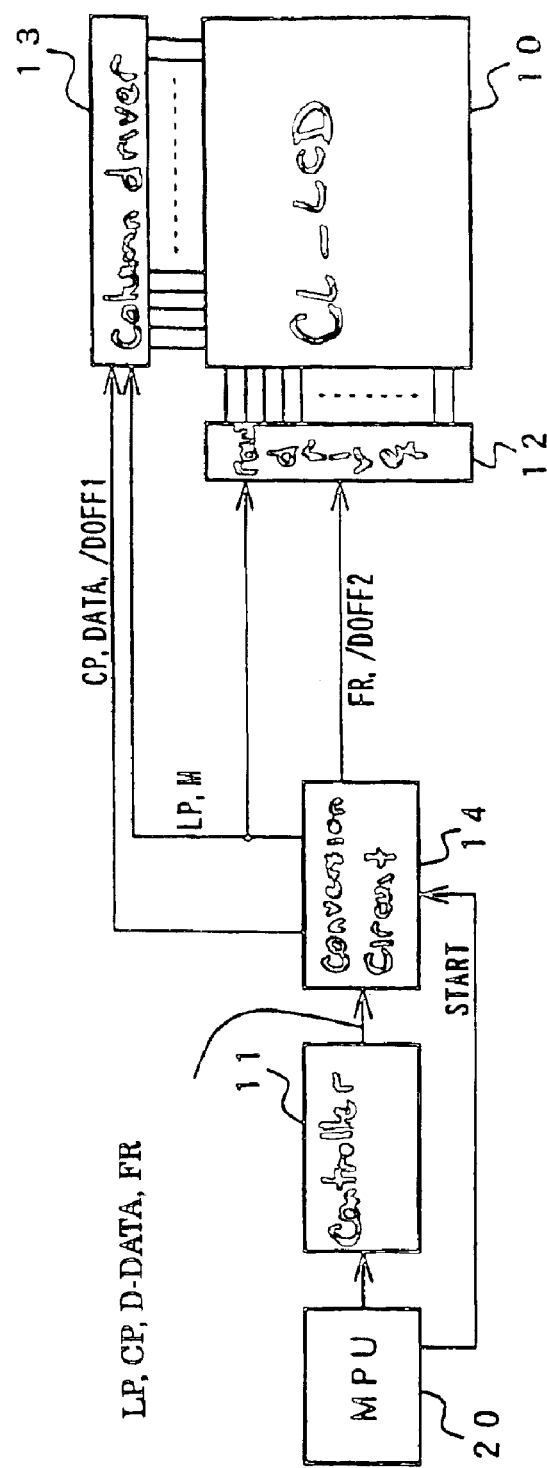
FIG. 12 is a block diagram showing the structure of a driving apparatus (Embodiment A-1).

FIG. 12 is a block diagram showing Embodiment A-1 of the driving apparatus. In this embodiment, a signal conversion circuit 14 is added in the general driving circuit shown in FIG. 8. The signal conversion circuit 14 is disposed between the controller 11 and the row driver 12 and the column driver 13 to produce signals for forming the first stage (reset portion), the second stage (non-voltage application portion) and the third stage (focalconic portion), as described above, based on each signal from the controller 11, and supplies the signals to the row driver 12 and the column driver 13.

Here, a description will be given on the premise that the signal conversion circuit 14 is independent from the signal controlling circuit 11. However, they may be unified together. When they are unified, the timing of signals can be optimized whereby a time for the initialization can be reduced.

Further, an M signal is a polarity reversing signal produced by the signal conversion circuit 14, and DATA indicates display data produced by the signal conversion circuit 14. DATA is the same as display data outputted from the signal controlling circuit 11 in the addressing portion. A /DOFF1 signal is a /DOFF signal produced by the signal conversion circuit 14 and is supplied to the column driver 13, and a /DOFF2 signal is a /DOFF signal produced by the signal conversion circuit 14 and is supplied to the row driver 12.

CL-LCD having a memory mode of operation maintains the state of a display when data are once written in. Accordingly, it is unnecessary to conduct writing for each frame period. However, it is necessary to instruct outside the timing of rewriting of data. A start signal (START) shown in FIG. 12 is a signal used for the timing. The START signal may be a signal produced by a timer to become effective for each predetermined period, or a display rewriting instruction signal from MPU as a source for generating display data or an external switch. FIG. 12 shows as an example, the signal outputted from MPU.

Figure 13:
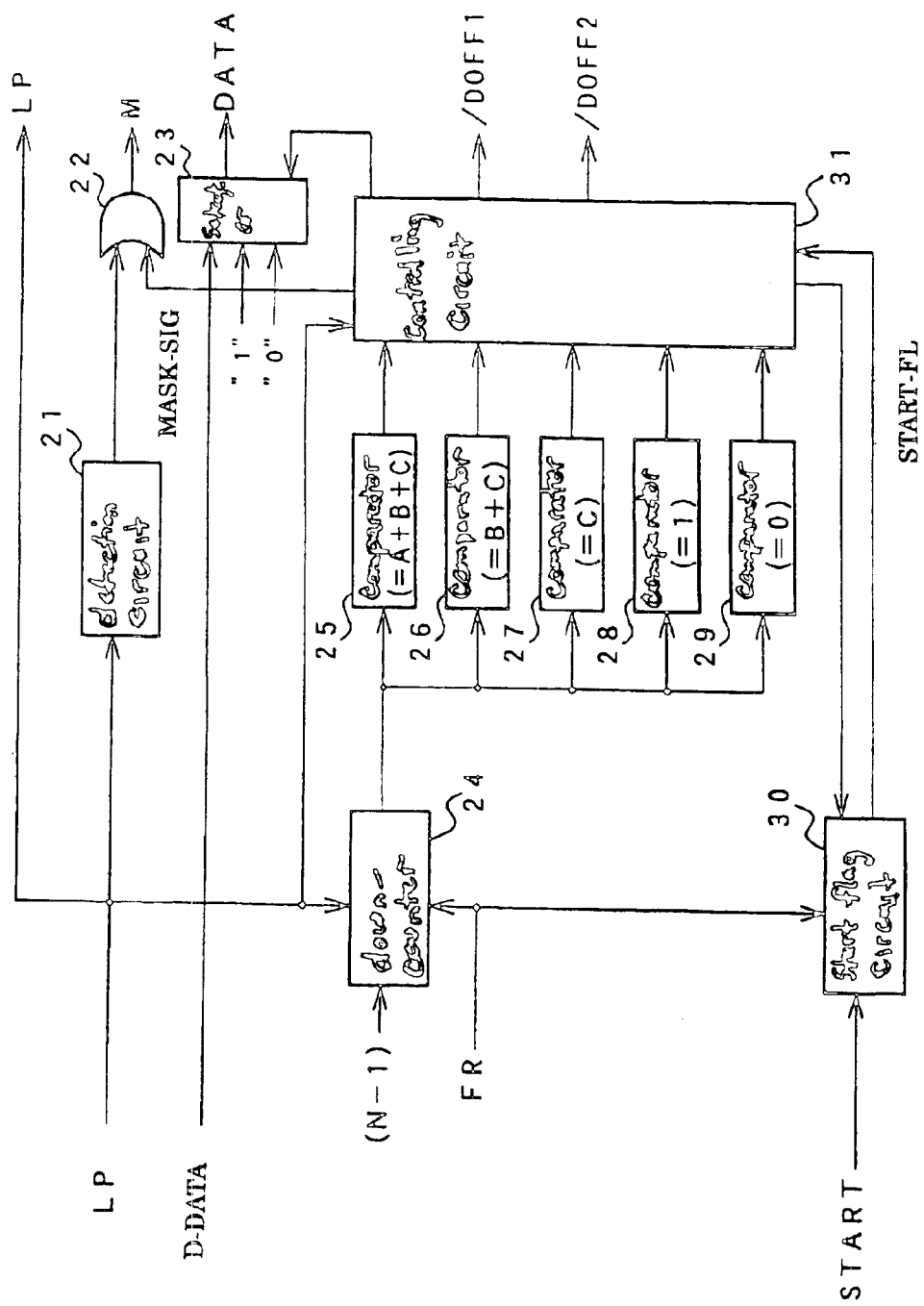
FIG. 13 is a block diagram showing a structural example of a signal conversion circuit in Embodiment A-1.

FIG. 13 is a block diagram showing a structural example of the signal conversion circuit 14 in Embodiment A-1. In the signal conversion circuit 14 shown in FIG. 13, a 0.5-line detection circuit 21 determines the timing of ½ of a selection period using a LP signal as a trigger and outputs to an OR circuit 22 a signal in which a voltage level is reversed by such timing. A down-counter 24 is a counter which presets (n−1) as soon as a FR signal is inputted, and subtracts a counted value by 1 in response to an input of the LP signal. Here, a character N designates the number of rows for display. First to fifth comparators (hereinbelow, referred to as comparators) 25, 26, 27, 28 and 29 compare a counted value by the down-counter 24 with a predetermined value respectively.

The OR circuit 22 is adapted so that when a mask signal from a DOFF controlling circuit 31 is in a low level state, it supplies an output signal of the 0.5-line detection circuit 21 as an M signal to the row driver 12 and the column driver 13, and when the mask signal is in a high level state, it supplies an M signal of high level to the row driver 12 and the column driver 13.

Further, a selector 23 is adapted to output any one of display data, data of high level and data of low level from the signal controlling circuit 11, as a DATA signal depending on a state of a selection signal, to the column driver 13.

A start flag circuit 30 synchronizes the START signal with the FR signal, and sets a start flag. The setting of the start flag is instructed to the DOFF controlling circuit 31. Further, the start flag is reset according to an instruction from the DOFF controlling circuit 31. The DOFF controlling circuit 31 functions in a state that the start flag is set. Further, it supplies the /DOFF1 signal to the column driver 13 and the /DOFF2 signal to the row driver 12 depending on states of output from the comparators 25, 26, 27, 28 and 29. Further, it supplies a mask signal to the OR circuit 22, and supplies a selection signal to the selector 23.

In the following description, operations will be described with reference to the timing chart of FIG. 14. The comparators 25, 26, 27, 28 and 29 are provided so that the time length of the reset portion (the first stage) is set to A, the time length of the non-voltage application portion (the second stage) is set to B, and the time length of the focalconic portion (the third stage) is set to C. Each of the comparators 25–29 receives a counted value from the down-counter 24 which counts down LP signals, compares the counted value with a predetermined value, and outputs an identity signal when these values are coincident.

In this embodiment, a first period determining means for determining the time length A of the reset portion includes the down-counter 24 and the comparators 25 and 26. A second period determining means for determining the time length B of the non-voltage application portion includes the down-counter 24 and the comparators 26 and 27. A third period determining means for determining the time length C of the focalconic portion includes the down-counter 24 and the comparators 27 and 29. A voltage application means for applying a predetermined voltage in the first to third stages includes the OR circuit 22, the selector 23 and the DOFF controlling circuit 31.

The predetermined value for comparison of the comparator 25 is (A+B+C) and the predetermined value for comparison of the comparator 26 is (A+B). The predetermined value for comparison of the comparator 27 is B, and the predetermined value for comparison of the comparator 28 is 1. The predetermined value for comparison of the comparator 29 is 0. Further, A+B+C<N (N is the number of rows for display).

In a state that the start flag is not set, the DOFF controlling circuit 31 sets non-display instruction signals (/DOFF1 signal and the /DOFF2 signal) with respect to the column driver 13 and the row driver 12 to be a low level so that all the column electrodes and the row electrodes are in a state of applying no voltage, i.e., a state of potential $V_0$.

Accordingly, CL-LCD 10 is in a state of applying no voltage irrespective of signals from the signal controlling circuit 11. Further, to fix the M signal and the DATA signal to a high level, it sets the mask signal applicable to the OR circuit 22 to a high level, and sets so that a high level ("1") is selected in the selection signal to the selector 23. When the START signal is inputted to the start flag circuit 30 and then the FR signal is inputted thereto, a start flag is set in the start flag circuit 30. The FR signal is inputted at each frame period.

When the FR signal is inputted, (N−1) is preset in the down-counter 24. Thereafter, the down-counter 24 counts down by using a row switching signal (LP signal) as a trigger. The comparator 25 outputs an identity signal to the DOFF controlling circuit 31 when a counted value by the down-counter 24 is coincident with (A+B+C). The DOFF controlling circuit 31 receives the identity signal from the comparator 25 in a state that the /DOFF1 signal and the /DOFF2 signal are both at a low level, and fixes the /DOFF1 signal to the column driver 13 to a high level when the LP signal is inputted.

As a result, the voltage level of all of the column electrodes becomes $V_5(V_r+V_c)$ according to the relation shown in FIG. 11. Further, since the voltage level of all of the row electrodes is $V_0$, the voltage applied to liquid crystal is $V_r+V_c$ to all of the pixels. For instance, when $V_r=35V$ and $V_c=5V$, the voltage applied to the liquid crystal is 40V.

When the counted value of the down-counter 24 is coincident with (B+C), the comparator 26 outputs an identity signal to the DOFF controlling circuit 31. The DOFF controlling circuit 31 receives the identity signal from the comparator 26 in a state that the /DOFF1 signal is at a high level and the /DOFF2 signal is at a low level. Further, when the LP signal is inputted, the /DOFF1 signal to the column driver 13 is fixed to a low level. As a result, CL-LCD 10 is in a state of applying no voltage according to the relation shown in FIG. 11.

In this case, the DOFF controlling circuit 31 sets so that a low level ("O") is selected in the selection signal to the selector 23.

Figure 14:
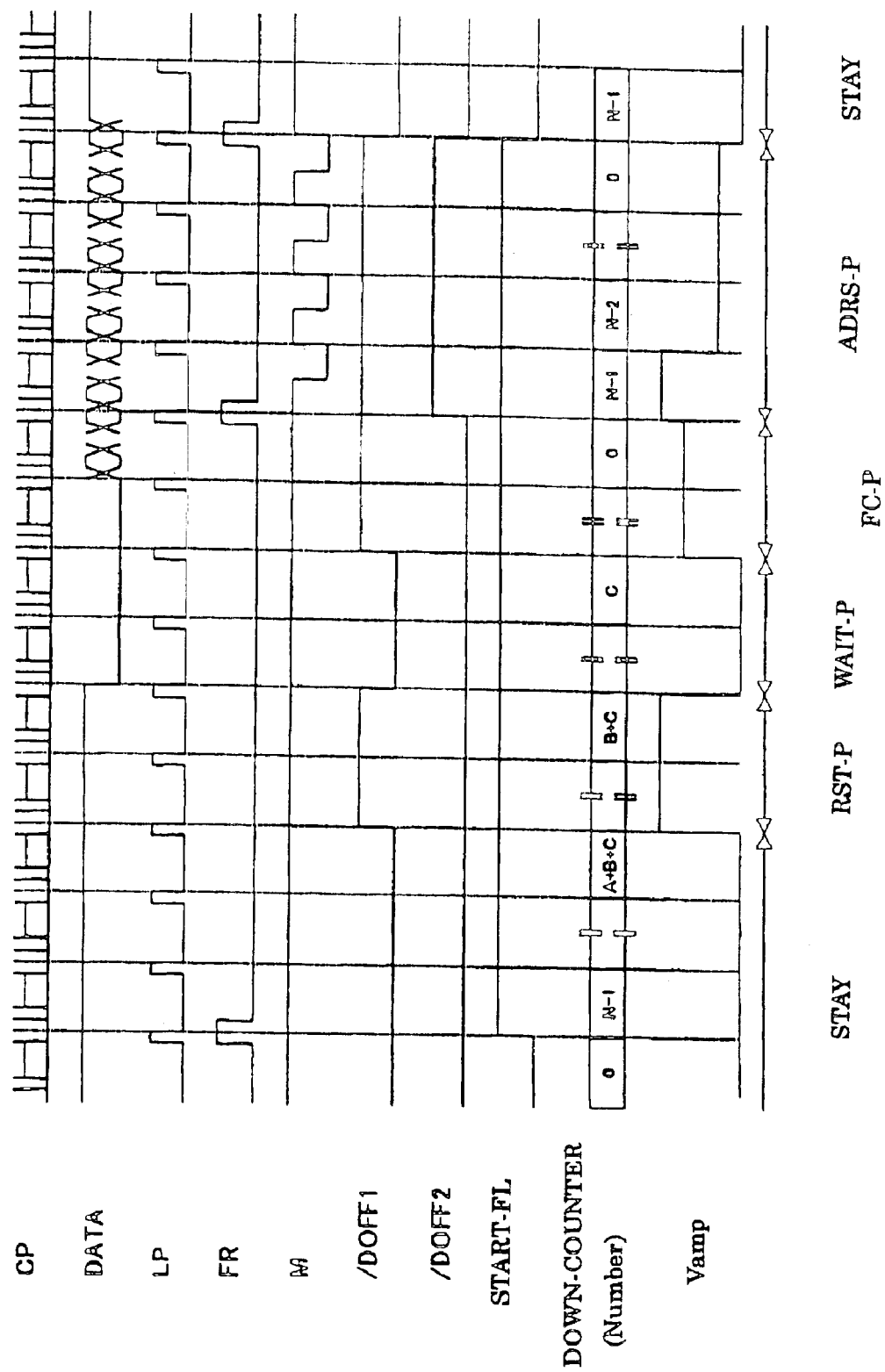
FIG. 14 is a timing chart showing the operation of the signal conversion circuit.

In addition, a period from the time the voltage applied to liquid crystal is changed to $V_r+V_c$ to the time at which no voltage is applied is a period spent until the counted value of the down-counter 24 advances by "A", and this period is the reset portion as shown in FIG. 14.

The comparator 27 outputs an identity signal to the DOFF controlling circuit 31 when the counted value of the down-counter 24 is coincident with C. The DOFF controlling circuit 31 receives the identity signal from the comparator 27 in a state that the /DOFF1 signal and the /DOFF2 signal are both at a low level.

Further, when the LP signal is inputted, the /DOFF1 signal to the column driver 13 is set to a high level. As a result, the voltage level of all of the column electrodes becomes $V_3(V_r-V_c)$ according to the relation shown in FIG. 11. Since the voltage level of all of the row electrodes is $V_0$, the voltage applied to the liquid crystal for all of the pixels becomes $V_r-V_c$. For instance, when $V_r=35V$ and $V_c=5V$, the voltage applied to liquid crystal is 30V.

A period from the time the voltage applied to liquid crystal is changed to a state of applying no voltage to the state of $V_r-V_c$ is a period spent until the counted value of the down-counter 24 advances by "B", and this period is a non-voltage application portion as shown in FIG. 14.

In addition, the comparator 28 outputs an identify signal to the DOFF controlling circuit 31 when the counted value of the down-counter 24 is coincident with 1. The DOFF controlling circuit 31 receives the identify signal from the comparator 28 in a state that the /DOFF1 signal is at a high level and the /DOFF2 signal is at a low level. Further, when it receives the LP signal, it supplies a selection signal to the selector 23 so that display data are selected as the DATA signal.

The comparator 29 also outputs an identity signal to the DOFF controlling circuit 31 when the counted value of the down-counter 24 is coincident with 0. The DOFF controlling circuit 31 receives the identity signal from the comparator 29 in a state that the /DOFF1 signal is at a high level and the /DOFF2 signal is at a low level, and sets the /DOFF1 signal and the /DOFF2 signal to the column driver 13 and the row driver 12 to a high level when the LP signal is received.

Further, it sets the mask signal to the OR circuit 22 to a low level, so that an output from the 0.5-line detection circuit 21 is an M signal. Accordingly, the addressing portion is initiated by the a-line-at-a-time driving whereby a display in response to the DATA signal and the M signal is effected. At this moment, an ON voltage is $V_r+V_c$ and an OFF voltage is $V_r-V_c$.

A period from the time the voltage applied to liquid crystal is changed to $V_r-V_c$ to a time a voltage in response to ON/OFF appears is a period spent until the counted value of the down-counter 24 advances by "C", and this period is the focalconic portion as shown in FIG. 14.

When an identify signal is outputted from the comparator 29 in a state that the /DOFF1 signal and the /DOFF2 signal (which are non-display instruction signals to the column driver 13 and the row driver 12) are both at a high level, the DOFF controlling circuit 31 resets the start flag, and sets the /DOFF1 signal and the /DOFF2 signal to a low level so that the voltage applied to liquid crystal is made 0V in all of the pixels.

Accordingly, CL-LCD is kept in a state of storing written data. Further, the mask signal to the OR circuit 22 is set to a high level, and the selection signal is switched so that the output of the selector 23 is set to a high level. Then, such a state is maintained until the next START signal is inputted.

Thus, in Embodiment A-1, the first stage to the third stage, i.e., the reset portion, the non-voltage application portion (or a waiting portion) and the focalconic portion are produced by utilizing the M signal and the /DOFF signals which can be handled by the conventional driving apparatus. Accordingly, the IAPT driving driver can be applied to the present invention.

Figure 15:
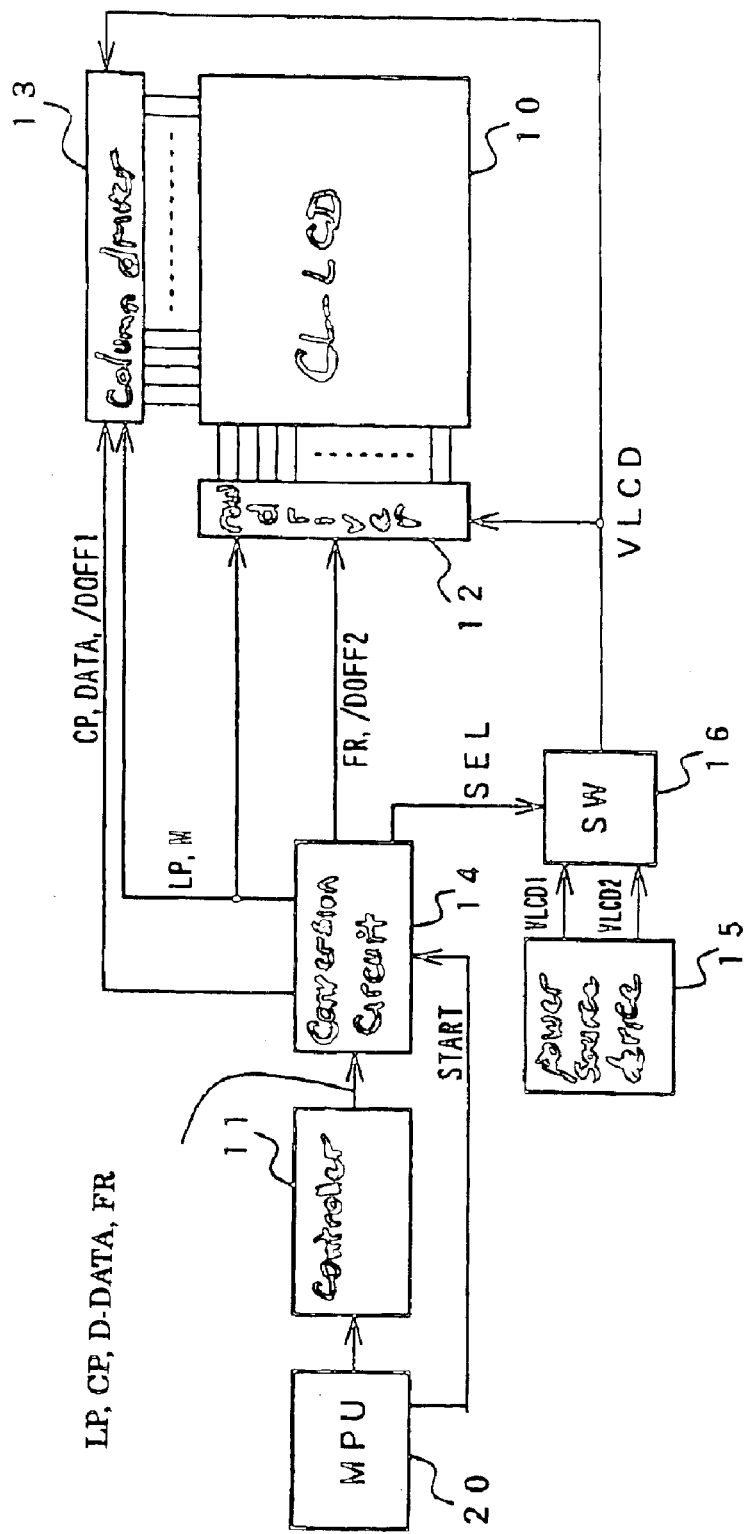
FIG. 15 is a block diagram showing the structure of another driving apparatus (Embodiment A-2).

Next, the structure of Embodiment A-2 is shown in FIG. 15. In Embodiment A-2, a signal conversion circuit 14 also outputs a SEL signal as a voltage switching instruction signal. Further, a power source device 15 and a switch circuit 16 are provided. The power source device 15 is capable of supplying VLCD1 as a voltage generally used for driving a liquid crystal display panel and VLCD2 as a voltage having an optional voltage level. In Embodiment A-2, the power source device 15 and the switch circuit 16 are part of a voltage application means for applying a predetermined voltage in the first to the third stages.

VLCD1 is a voltage corresponding to an ON voltage $V_5(V_r+V_c)$ generally used in writing operations. VLCD2 is also a voltage corresponding to $V_5(V_r+V_c)$ provided that it has a different value from VLCD1. For instance, when VLCD1 is 40V, VLCD2 has a voltage value of 24V. In response to the SEL signal from the signal conversion circuit 14, the switch circuit 16 provides a necessary voltage for the row driver or the column driver by dividing either VLCD01 or VLCD2.

Figure 16:
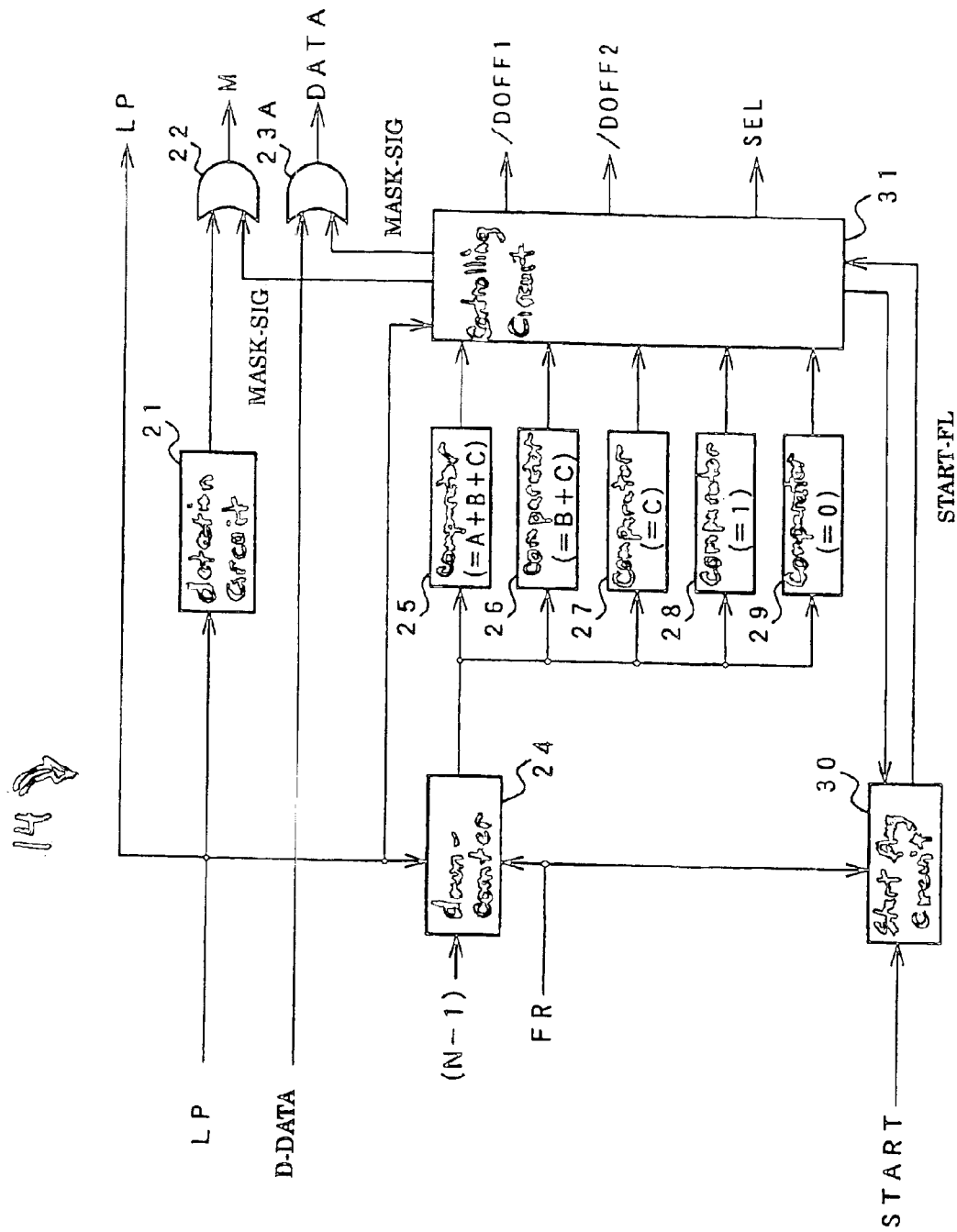
FIG. 16 is a block diagram showing a structural example of a signal conversion circuit in Embodiment A-2.

FIG. 16 is a block diagram showing an example of the structure of the signal conversion circuit 14 in Embodiment A-2. In the signal conversion circuit 14 shown in FIG. 16, a 0.5-line detection circuit 21, an OR circuit 22, a down-counter 24, comparators 25 to 29 and a start flag circuit 30 operate in the same manner as in Embodiment A-1. In a DOFF controlling circuit 31, the function to control the SEL signal which instructs the switching of a power source voltage is added. Further, the selector 23 used in Embodiment A-1 is changed, and an OR circuit 23A is provided.

In the following description, operations will be described with reference to the timing chart of FIG. 17. In a state that a start flag is not set, the DOFF controlling circuit 31 sets non-display instruction signals to the column driver 13 and the row driver 12 (a /DOFF1 signal and a /DOFF2 signal) to a low level so that all of the column electrodes and row electrodes are in a state of applying no voltage, i.e., a state of a potential of $V_0$.

Accordingly, CL-LCD 10 is in a state of applying no voltage irrespective of states of the signal from the signal controlling circuit 11. Further, to set an M signal and a DATA signal to a high level, a mask signal to the OR circuit 22 and a mask signal to the OR circuit 23A are set to a high level. When a START signal is inputted, and then a FR signal is inputted, a start flag is set in the start flag circuit 30. The FR signal is inputted for each frame period.

When the FR signal is inputted, (N−1) is preset in the down-counter 24. Thereafter, the down-counter 24 counts down row switching signals (LP signals). The comparator 25 outputs an identity signal to the DOFF controlling circuit 31 when the counted value of the down-counter 24 is coincident with (A+B+C).

The DOFF controlling circuit 31 receives the identity signal from the comparator 25 in a state that the /DOFF1 signal and the /DOFF2 signal are both at a low level. Further, it sets the /DOFF1 signal to the column driver 13 to a high level when the LP signal is inputted.

As a result, the voltage level of all of the column electrodes becomes $V_S(V_r+V_c)$ according to the relation shown in FIG. 11. Further, since the voltage level of all of the row electrodes is $V_0$, the voltage applied to liquid crystal becomes $V_r+V_c$ to all of the pixels. For instance, when $V_r=35V$ and $V_c=5V$, the voltage applied to liquid crystal is 40V.

The comparator 26 outputs an identity signal to the DOFF controlling circuit 31 when the counted value of the down-counter 24 is coincident with (B+C). The DOFF controlling circuit 31 receives the identity signal from the comparator 26 in a state that the /DOFF1 signal is at a high level and the /DOFF2 is at a low level.

Further, it sets the /DOFF1 signal to the column driver 13 to a low level when the PL signal is inputted. As a result, CL-LCD 10 is in a state of applying non-voltage according to the relation shown in FIG. 11.

Figure 17:
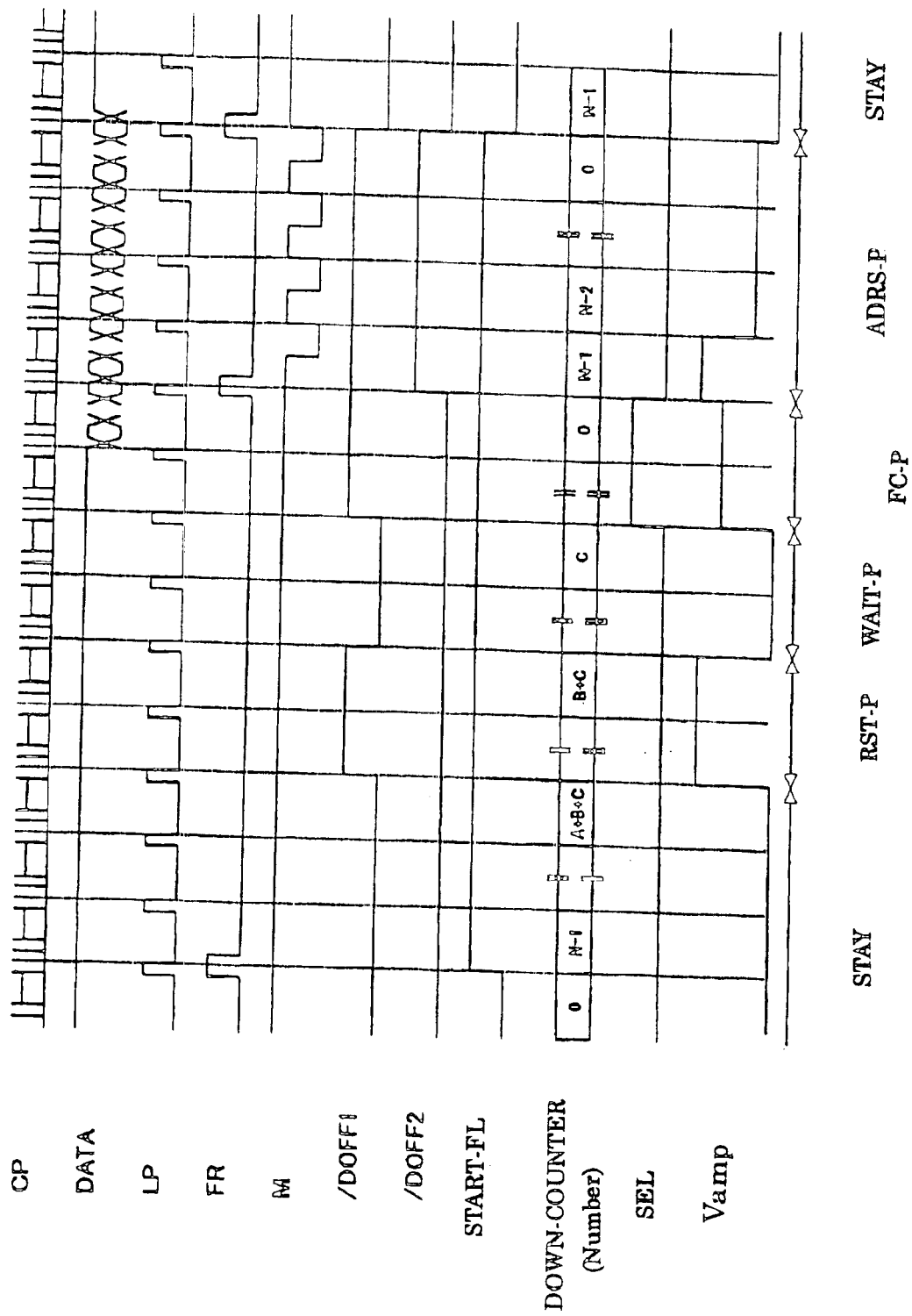
FIG. 17 is a timing chart showing the operation of the signal conversion circuit in Embodiment A-2.
Figure 18B:
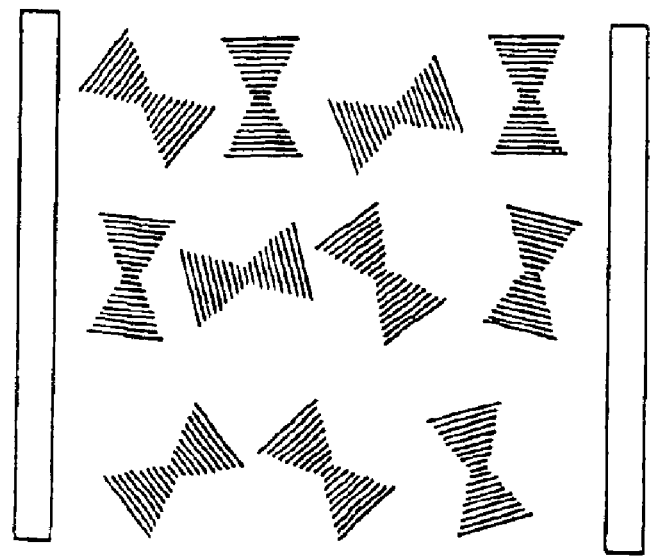
FIG. 18(a) and FIG. 18(b) are explanatory drawings showing states of the alignment of CL-LC.
Figure 18A:
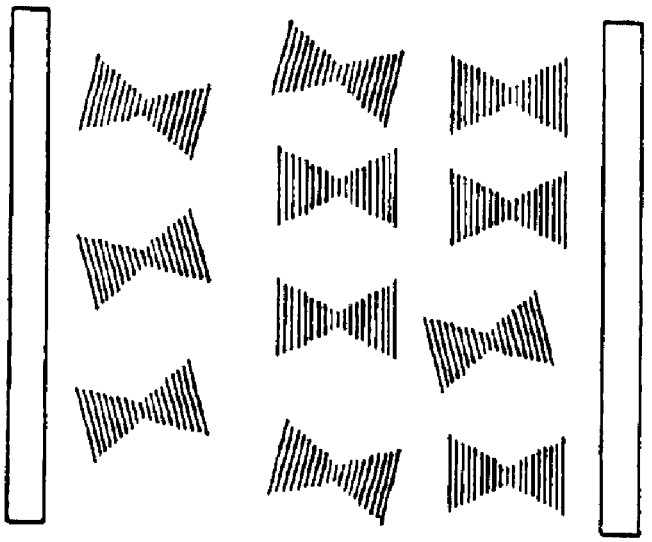

A period from the time the voltage applied to liquid crystal is changed to $V_r+V_C$ to the time no voltage is applied is a period spent until the counted value of the down-counter 24 advances by "A", and this period is the reset portion as shown in FIG. 17.

Further, the comparator 27 outputs an identity signal to the DOFF controlling circuit 31 when the counted value of the down-counter 24 is coincident with C. The DOFF controlling circuit 31 receives the identity signal from the comparator 27 in a state that the /DOFF1 signal and the /DOFF2 signal are both at a low level, and sets the /DOFF1 signal to the column deriver 13 to a high level when the LP signal is inputted.

Further, it sets the SEL signal to a high level. When the SEL signal is at a high level, the switch circuit 16 shown in FIG. 15 is ready for selecting VLCD2 from the power source device 15 and for supplying the selected voltage to the row driver 12 and the column driver 13.

As a result, the voltage level of all of the column electrodes becomes $V_S(V_r+V_C)$. Further, since the voltage level of all row electrodes is $V_0$, the voltage applied to liquid crystal becomes $V_r+V_C$ to all of the pixels. In this stage, however, since the SEL signal is at a high level, the voltage applied to liquid crystal is VLCD2 which is different from $V_r+V_C$ (=VLCD1) usually used for the reset portion and the a-line-at-a-time driving. For instance, $V_r+V_C=24V$.

A period from the time the voltage applied to liquid crystal is changed to a state of applying no voltage to the time the supply of VLCD2 is initiated is a period until the counted value of the down-counter 24 advances by "B", and this period is the non-voltage application portion as shown in FIG. 17.

The comparator 28 outputs an identity signal to the DOFF controlling circuit 31 when the counted value of the down-counter 24 is coincident with 1. The DOFF controlling circuit 31 receives the identity signal from the comparator 28 in a state that the /DOFF1 signal is at a high level and the /DOFF2 signal is at a low level. Further, it sets the mask signal to the OR circuit 23A to a low level in response to an input of the LP signal, whereby display data are outputted as the DATA signal.

The comparator 29 outputs an identity signal to the DOFF controlling circuit 31 when the counted value of the down-counter 24 is coincident with 0. The DOFF controlling circuit 31 receives the identity signal from the comparator 29 in a state that the /DOFF1 signal is at a high level and the /DOFF2 signal is at a low level.

Further, it sets the /DOFF1 signal and the /DOFF2 signal to the column driver 13 and the row driver 12 to a high level when the LP signal is inputted.

Then, the SEL signal is returned to a low level. As a result, the row driver 12 and the column driver 13 are returned to a state that VLCD1 is supplied from the power source device 15. Further, the mask signal to the OR circuit 22 is set to be a low level so that an output from the 0.5-line detection circuit 21 is generated as an M signal. Accordingly, the addressing portion in which a display in response to the DATA signal and the M signal is effected by the a-line-at-a-time driving is initiated. In this case, an ON voltage is $V_r+V_C$ and an OFF voltage is $V_r-V_C$.

A period from the time the voltage applied to liquid crystal is changed to a voltage based on VLCD2 to the time at which a voltage according to usual ON/OFF operations is produced, is a period until the counted value of the down-counter 24 advances by "C", and this period is the focalconic portion as shown in FIG. 17.

Further, when an identify signal is outputted from the comparator 29 in a state that the /DOFF1 signal and the /DOFF2 signal, as non-display instruction signals to the column driver 13 and the row driver 12, are both at a high level, the DOFF controlling circuit 31 resets the start flag, and sets both the /DOFF1 signal and the /DOFF2 signal to a low level so that the voltage applied to liquid crystal is 0V to all of the pixels. Accordingly, CL-LCD is kept in a state of storing written data.

Further, the controlling circuit sets the mask signal to the OR circuit 22 and the mask signal to the OR circuit 23A to a high level, and sets the M signal and the DATA signal to a high level. Then, it maintains such a state until the next START signal is inputted.

As described above, even in Embodiment A-2, the reset portion, the non-voltage application portion and the focalconic portion can be produced by utilizing the M signal and the /DOFF signals which can be handled by the conventional driving apparatus. Accordingly, the IAPT driving driver can be applied to the present invention.

Further, in Embodiment A-2, since the amplitude of a voltage in the focalconic portion can optionally be determined, the optimum voltage value required for the focalconic portion can be used. This embodiment may have such a structure that the amplitude of a voltage in the reset portion can also be determined to have an optical value.

In each of the embodiments described above, the lengths of the first to the third stages are determined based on the LP signal. However, the lengths of the first to the third stages may be determined based on a clock signal other than the LP signal. In this case, by using a clock signal of a higher frequency, the time for the initialization can further be shortened.

In each of the embodiments described above, a positive pulse-like voltage is applied to CL-LC in the first stage (the reset portion) and the third stage (the focalconic portion). However, a positive pulse and a negative pulse, which have an equal voltage amplitude in absolute value, may be applied in the respective stages.

Figure 19:
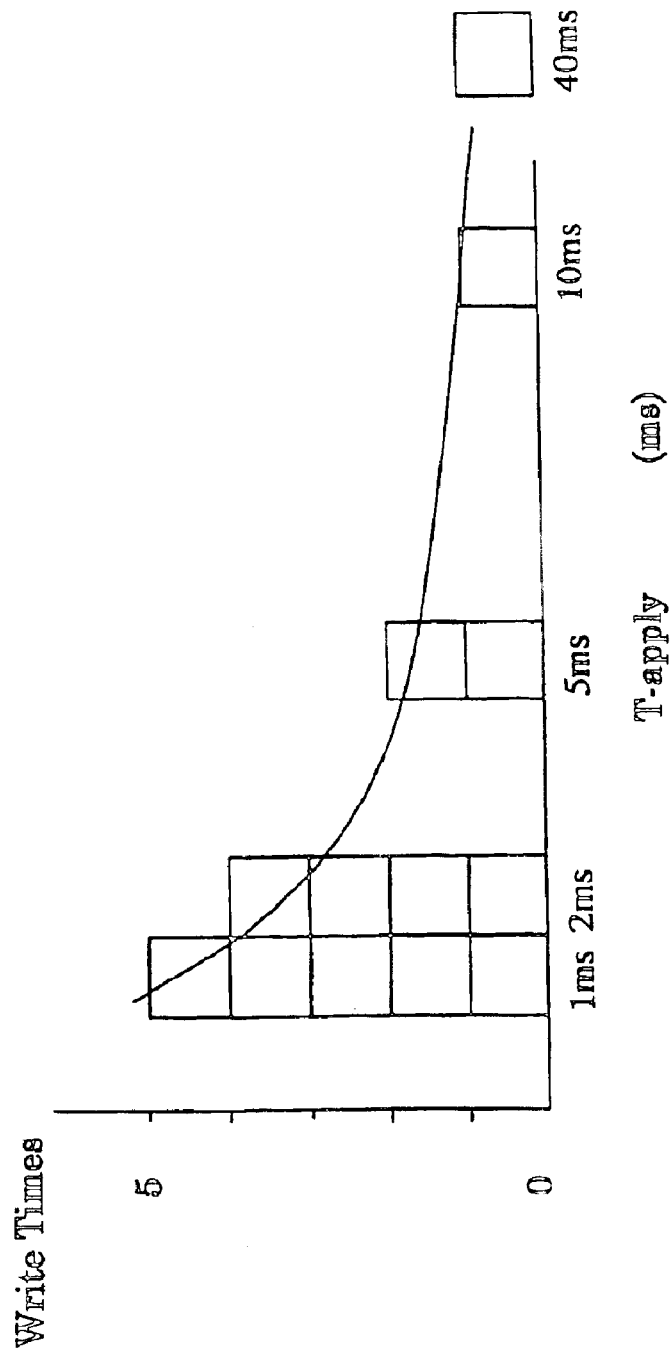
FIG. 19 is an explanatory drawing showing the numbers of times required until a FC state is written by using a pulse width modulation (PWM).

In the following description, Embodiment B using a pulse width modulation system will be described. FIG. 19 is an explanatory drawing showing an experimental result. For a voltage application time of 1 ms, CL-LC can be changed to a substantially complete FC state by around 5 times of voltage application. On the other hand, to obtain the same state by only one voltage application, a voltage application time of 10 ms is needed. Thus, by applying a voltage several times in a shorter application time, the total time of obtaining a FC state can be reduced, in comparison with a case of obtaining a FC state by one voltage application.

Namely, in a preparation period for writing display data, a voltage for rendering the state to be a HO state is applied to CL-LC so that the previous state of display is reset, and then a state of applying no voltage, i.e., a period of a potential of 0V is provided. Further, a voltage pulse which makes the state a FC/PL mixed state is applied discontinuously to CL-LC in a shorter application time. By this method, the state of CL-LC is changed to a FC state in which there is substantially no selective reflection remaining or a FC/PL mixed state, and voltages corresponding to display data should be written in such a state.

According to the above-mentioned driving method, the time required for the sequence for renewing a series of picture images can further be shortened. Further, since CL-LC is changed to a HG state or a HG/PL mixed state in a period of a potential of 0V, the time of resetting can effectively be shortened.

Further, since the initial stage is set to a FC state or a FC/PL-mixed state, all of the pixels become simultaneously a reflective display state in a PL state, and accordingly, an occurrence of flickering at a resetting time can be suppressed.

Further, as shown in FIG. 5 to FIG. 7, the optimum voltage for writing a FC state increases as the voltage application time is shortened. Accordingly, when $V_1$ is an applicable voltage for providing a homeotropic alignment, $\tau_1$ is a time for applying the voltage, $V_3$ is an applicable voltage per 1 time for writing a FC state or a FC/PL-mixed state, and $\tau_3$ is a time for applying the voltage, if $V_3$ and $\tau_3$ are selected properly, $V_1$ and $V_3$ can be made common under the condition of $\tau_1 > \tau_3$. Therefore, the circuit structure of the driving driver can be simplified.

Figure 20:
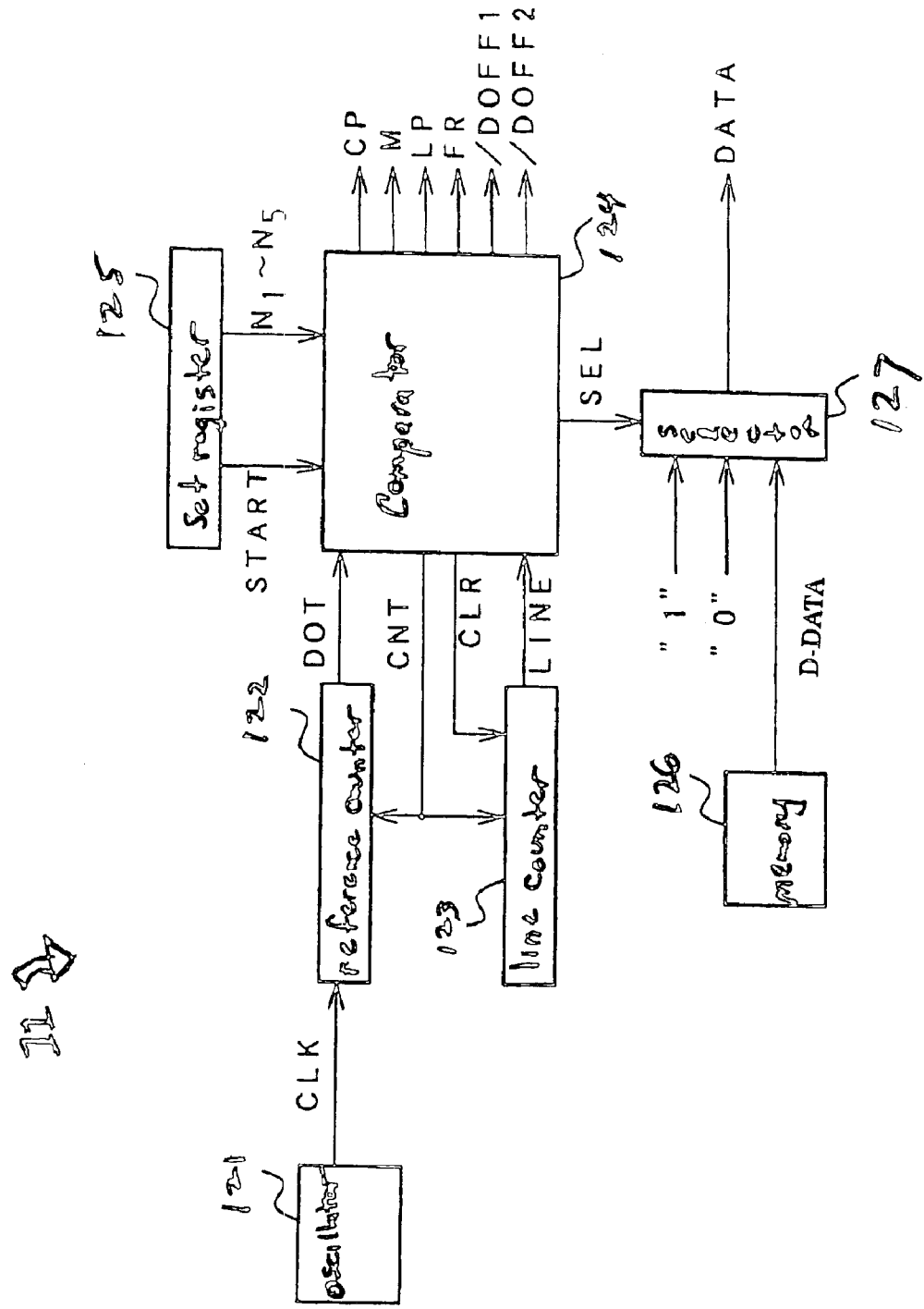
FIG. 20 is a block diagram showing a structural example of a controller according to the PWM method.

FIG. 20 is a block diagram showing a structural example of a controller 11. An oscillator 121 generates a clock signal (CLK) having a predetermined frequency. A reference counter 122 receives CLK to count. Values counted by the reference counter 122 are inputted to a line-counter 123. When a counted value reaches a predetermined value, the line-counter adds +1. A comparator 124 receives a counted value (DOT) of the reference counter 122, a counted value (LINE) of the line-counter 123 and set values ($N_1$–$N_5$) of a set register 125, and produces a CP signal, an M signal, an LP signal, a /DOFF1 signal, a /DOFF2 signal and a SEL signal. The SEL signal is outputted to a selector 127.

A memory 126 stores display data from the MPU 20. The selector 127 selects any of data stored in the memory 126, a "1" fixing signal and a "0" fixing signal, and outputs the selected data as a DATA signal to CL-LCD.

A set value for setting a voltage application time, which is provided from the MPU 20, is written in the set register 125. Each time is a value based on the number of clocks outputted from the oscillator 121. In the present invention, a high voltage application time for providing a homeotropic alignment (a period of the first stage) is represented by $N_1$, a time of the non-voltage application portion (a period of the second stage) is represented by $N_2$, a voltage application time for changing to a FC state (a period of the third stage) is represented by $N_3$, the number of times of repeating $N_2$ and $N_3$ is represented by $N_4$, and a selection time in a a-line-at-a-time driving is represented by $N_5$.

Further, CL-LCD maintains the state of a display when data are written. Accordingly, it is unnecessary to write data for each frame period. However, it is necessary to instruct from the outside the timing required for rewriting data. Accordingly, an instruction of rewriting the display is produced from the MPU to the set register 125. When an instruction of rewriting the display is set in the set register 125, the START signal is outputted to the comparator 124.

In this Embodiment B, a first period determining means for determining a high voltage application period for providing a homeotropic alignment, a second period determining means for determining a time of the non-voltage application portion and a third period determining means for determining a voltage application time for changing to a FC state, can be realized by the reference counter 122, the line-counter 123, the set register 125 and the comparator 124 respectively. A voltage application means for applying a predetermined voltage in the first to the third stages can be realized by the memory 126, the selector 127 and the comparator 124. Further, a frequency controlling means for repeating the second stage and the third stage can be realized by the set register 125 and the comparator 124.

Figure 21:
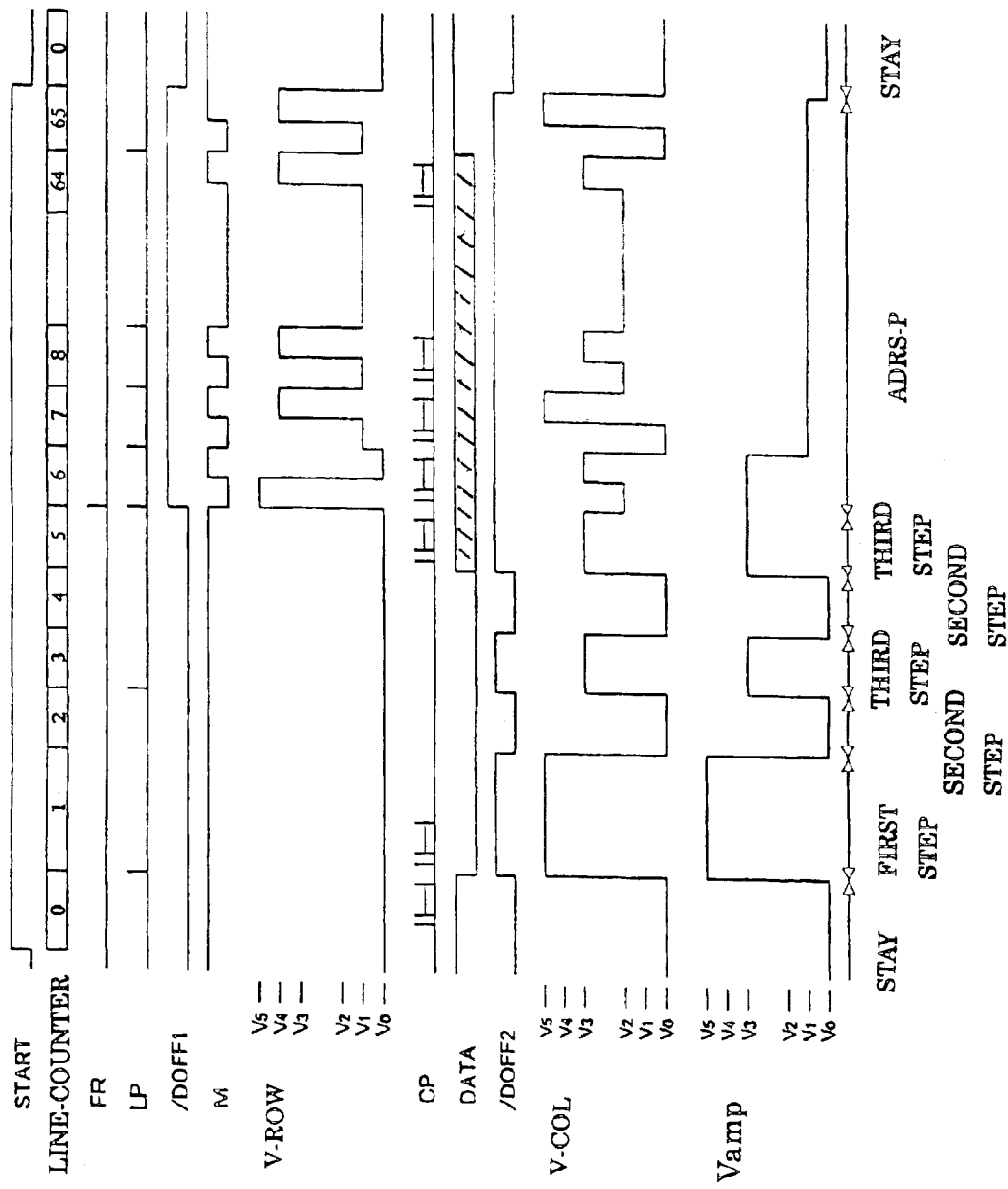
FIG. 21 is a timing chart showing the operation of the controller according to the PWM method.

Next, operations will be described with reference to the timing chart of FIG. 21. Here, $N_4=2$; an ON voltage in the a-line-at-a-time driving is $V_r+V_C$ and an OFF voltage is $V_r-V_C$.

Assuming the controller 11 is in an initial state until the starting of a display is instructed from the MPU 20. Namely, signal levels are controlled so that the CP signal is at a low level, the LP signal is at a low level, the M signal is at a high level, DATA is at a high level, and the /DOFF 1 signal and /DOFF2 signal are at a low level. Since the /DOFF1 signal and the /DOFF2 signal are both at a low level, all of the row electrodes and column electrodes are in a state of applying no voltage, i.e., in a state of a potential $V_0$. Further, both the reference counter 122 and the line-counter 123 maintain "0".

When starting of a display is instructed from the MPU 20, a START flag is set in the set register 125 whereby a START signal becomes a high level. When the START signal is changed to a high level, the comparator 124 puts the reference counter 122 in an operating state. The reference counter 122 increases the counted value by 1 in response to the clock (CLK) from the oscillator 121. When a value in the line-counter 123 is 0, the reference counter 122 counts up until the counted value is coincident with $N_5$.

Further, the comparator 124 produces a CP signal of a high level when the counted value of the reference counter 122 is an even number, and produces a low level when it is an odd number so that CP signals are outputted for the number of pulses corresponding to the number of dots of the display element. During the operations, DATA is at a high level, and accordingly, the values of inner registers of the column driver 13 are all at a high level.

When the counted value of the reference counter 122 is coincident with $N_5$, the comparator 124 makes the CNT signal a high level in one clock period. In response to the CNT signal, the reference counter 122 turns the value to 0, and the line-counter 123 adds +1 to the value. At this moment, the comparator makes the LP signal a high level in one clock period. Therefore, the values of inner registers of the column driver 13 are reflected to the outputs of the column driver 13.

When the value of the line-counter 123 becomes 1, the comparator 124 makes the /DOFF2 signal a high level. From the relation shown in FIG. 11, voltage levels on all column electrodes become $V_5(V_r+V_C)$. Further, since voltage levels on all row electrodes are $V_0$, the voltage applied to the liquid crystal becomes $V_r+V_C$ to all of the pixels. Namely, a voltage necessary for providing a homeotropic alignment of liquid crystal can be applied to the entire surface of a display area.

The comparator 124 outputs a SEL signal so as to set DATA to a low level. The selector 127 selects "0" in response to the SEL signal. The comparator 124 outputs successively CP signals to make all of the values of inner registers of the column driver 13 to be at a low level. The reference counter 122 counts up until the counted value is coincident with $N_1$. When the counted value is coincident with $N_1$, the counted value is returned to 0. At this moment, +1 is added to the value of the line-counter 123 to be 2.

When the value of the line-counter 123 becomes $2n(1 \leq n \leq N_4)$, the comparator 124 makes the /DOFF2 signal a low level so that output potentials of the column driver 13 are all $V_0$. Therefore, the voltage applied to the liquid crystal becomes 0V The reference counter 122 counts up until the counted value is coincident with $N_2$. When the counted value is coincident with $N_2$, the counted value of the reference counter 122 is returned to 0, and +1 is added to the value of the line-counter 123. When the value of the line-counter 123 is changed from 2 to 3, the comparator 124 makes the LP signal a high level in one clock period. As a result, the values of inner registers of the column driver 13 are reflected to the outputs of the column driver 13.

When the value of the line-counter 123 is 2n+1 ($1 \leq n \leq N_4$), the comparator 124 makes the /DOFF2 signal a high level. In this case, since the M signal is at a high level, and DATA latched by the column driver 13 is at a low level, the applied voltage to all of the column electrodes is $V_3$ according to the relation shown in FIG. 11, and the voltage applied to the liquid crystal becomes $V_3(V_r-V_C)$ to all of the pixels. Accordingly, a voltage required for providing a FC state is applied to the entire display. The reference counter 122 counts up until the counted value is coincident with $N_3$. When the counted value is coincident with $N_3$, the counted value of the reference counter 122 is returned to 0, and +1 is added to the value of the line-counter 123.

When the value of the line-counter 123 is 2n+1, and when this value is $(2 \circ N_4+1)$, the comparator 124 outputs the SEL signal so that display data from the memory 126 are selected as DATA. In response to the SEL signal, the selector 127 is in a state of selecting the display data from the memory 126. Then, the comparator 124 outputs successively the CP signals so that the display data are inputted to inner registers of the column driver 13.

The reference counter 122 counts up until the counted value is coincident with $N_3$. When the counted value is coincident with $N_3$, the counted value of the reference counter 122 is returned to 0, and +1 is added to the value of the line-counter 123. In this example, the value of the line-counter 123 is 6. The comparator 124 makes the LP signal a high level for one clock period so that the values of inner registers of the column driver 13 are reflected to the outputs of the column driver 13. Further, it makes the FR signal a high level for a predetermined period so as to include pulses of the LP signal, and instructs to the row driver 12 to scan from the first row.

When the value of the line-counter exceeds $(2 \circ N_4+1)$, the comparator 124 sets the /DOFF1 signal and the /DOFF2 signal to a high level. Accordingly, voltages necessary for effecting the a-line-at-a-time driving are outputted as outputs of the column driver 12 and the row driver 13. In FIG. 21, such a period is shown as the addressing portion.

When the counted value of the reference counter 122 is smaller than $(N_5/2)$ in the addressing portion, the comparator 124 makes the M signal a low level, and when it is $(N_5/2)$ or more, the comparator makes the M signal a high level, whereby the voltage to be applied to liquid crystal in the a-line-at-a-time driving is rendered to be alternated. Further, display data of the memory 126 are outputted as DATA for the next row to be selected. DATA are received by inner registers of the column driver 13 according to the CP signal.

The reference counter 122 counts up until the counted value is coincident with $N_5$. When the counted value is coincident with $N_5$, the counted value of the reference counter 122 is returned to 0, and +1 is added to the value of the line-counter 123. The comparator 124 outputs in a pulse-like form the LP signal each time when +1 is added to the value of the line-counter 123, and it instructs to the row driver 12 to scan the next row, and at the same time, it instructs to the column driver 13 to output the next display data.

When the value of the line-counter 123 becomes $(2 \circ N_4+1+$the number of rows for display), the comparator 124 makes the CP signal and the LP signal a low level; instructs to the selector 126 to output data of "1" according to the SEL signal, and fixes the M signal to a high level. Then, when the counted value of the reference counter 122 is coincident with $N_5$, it makes the CLR signal to be a high level for one clock period and makes the values of the reference counter 122 and the line-counter 123 to be 0. Further, it makes the /DOFF1 signal and the /DOFF2 signal a low level whereby the voltage to be applied to the liquid crystal becomes 0V, and negates the START flag to return to the initial stage.

As described above, in Example B-1, the first stage to the third stage, i.e., the reset portion, the non-voltage application portion and the focalconic accelerating portion (a state of accelerating a change to a FC state) are produced by utilizing the M signal and the /DOFF signals. Accordingly, the IAPT driving driver can be applied to the present invention.

Then, the non-voltage application portion and the focal-conic accelerating portion are repeated plural times ($N_4$ times). Accordingly, CL-LCD 10 can be initialized in a sufficient FC state in a shorter time in comparison with a case that a FC state is realized by one pulse. In this example, $N_4=2$ is used. However, the initialization can be performed with an optical value of $N_4$ in the structure shown in FIG. 20.

Figure 22:
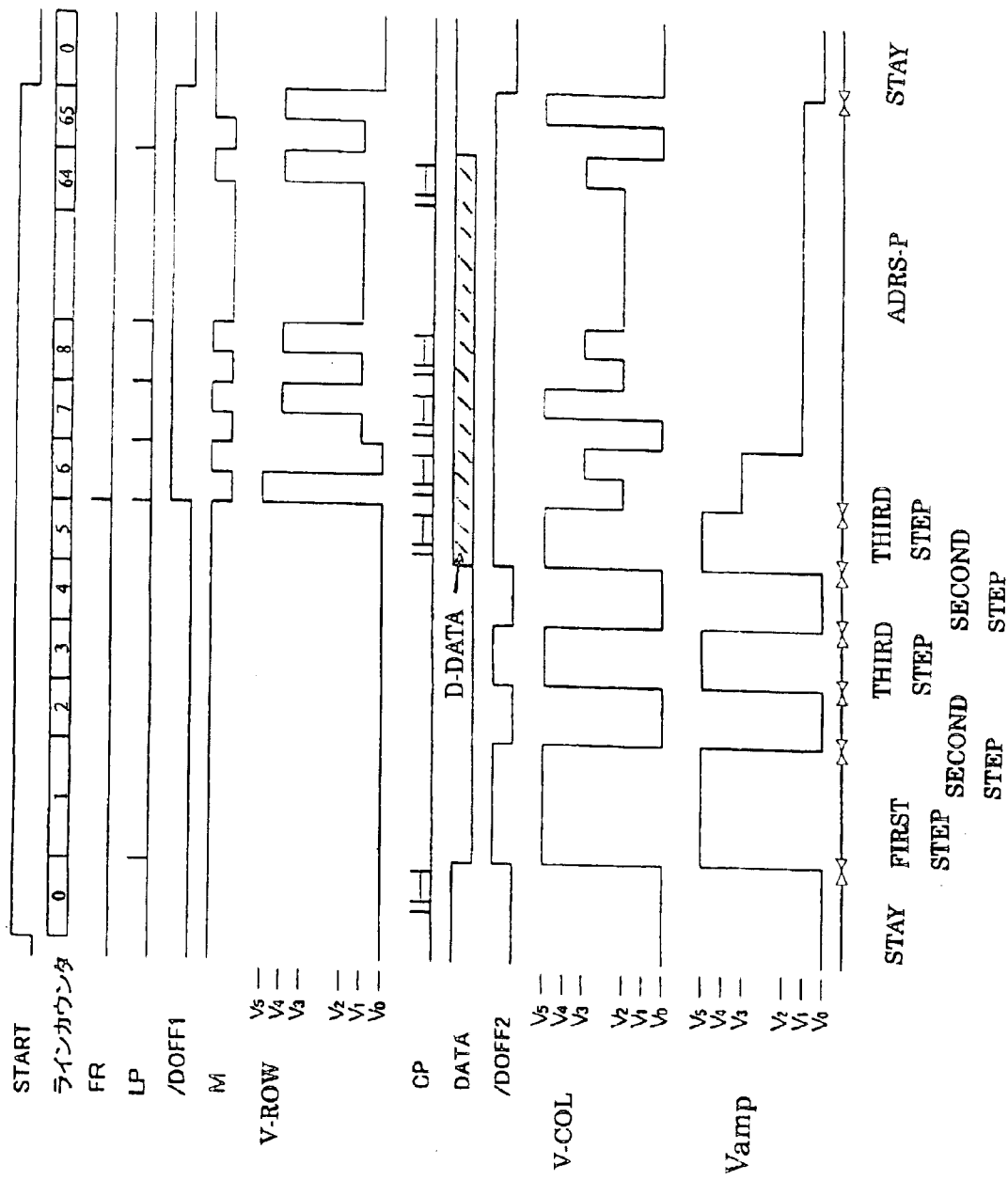
FIG. 22 is a timing chart showing the operation of the controller according to the PWM method.

In the following description, Embodiment B-2 of the present invention will be described with reference to the timing chart of FIG. 22. The structure of a controller 11 may be the same as that shown in FIG. 20.

In Embodiment B-2, when the value of the line-counter 123 becomes 1, the comparator 124 makes the /DOFF2 signal a high level. The comparator 124 outputs the SEL signal so as to set DATA to a low level. However, the comparator 124 does not output the CP signal. Accordingly, values of inner registers of the column driver 13 remain at a high level. The reference counter 122 counts up until the counted value is coincident with $N_1$. When the counted value is coincident with $N_1$, the counted value is returned to 0. At this moment, +1 is added to the value of the line-counter 123 whereby the value becomes 2.

In Example B-2, the comparator 124 makes the /DOFF2 signal a high level when the value of the line-counter 123 is $2n+1 (1 \leq n \leq N_4)$. In this case, since the M signal is at a high level, and DATA latched by the column driver 13 are all at a high level, potentials outputted from the column driver 13 are all $V_5$ according to the relation shown in FIG. 11, and the voltage applied to liquid crystal is $V_5(V_r+V_C)$.

The operations in the other stages are the same as those of Embodiment A. In Example B-2, the same voltage is applied to CL-LCD 10 in the first stage and the third stage. Namely, a voltage value applied to orient CL-LC in a HO state and a voltage value applied to obtain a FC state could be used in common.

EXAMPLE B-1

A liquid crystal panel was prepared in the same manners in Example A-1. Then, a row electrode and a column electrode in the liquid crystal panel were selected, and a voltage of 40V was applied for 20 ms to the crossing point of these electrodes. When the crossing point was observed from a side of the substrate on which the black coating was not formed, after the application of the voltage, a portion of the crossing point indicated a green reflection color. Then, a voltage of 20V was applied for 20 ms. After the application of the voltage, the portion of the crossing point was observed from a side of the substrate on which the black coating was not formed. As a result, that portion indicated substantially a black color.

To initialize the entire display surface of the liquid crystal panel, a voltage of 45V was applied to the entire display surface for 5 ms. Subsequently, a non-voltage application portion of 0.3 ms in which a voltage of 0V was applied to the liquid crystal panel was provided. Then, a voltage of 33V as a voltage for obtaining a FC state was applied for 1 ms. The non-voltage application portion and the voltage application period for obtaining a FC state were repeated 5 times in total, and then a-line-at-a-time driving was carried out.

Periods for selecting row electrodes are determined to be 0.1 ms respectively. In the non-voltage application portion of 0.3 ms, the state of CL-LC is changed to a HG state or a HG/PL-mixed state. Accordingly, the resetting time can effectively be reduced.

By conducting a series of voltage treatments before display data were written, a FC state could sufficiently be written, and a display having a high contrast ratio could be obtained. Namely, when a test pattern was displayed, a display of high contrast ratio could be obtained without resulting in a residual image. A time for a series of display writing operations was 17.5 ms.

COMPARATIVE EXAMPLE B-1

To initialize the entire display surface, a voltage of 45V was applied to initialize the entirety of the panel for 5 ms in the same manner as in Example B-1. Subsequently, a non-voltage application portion of 0.3 ms in which a voltage of 0V was applied to the liquid crystal panel was provided. Then, a voltage of 23V for obtaining a FC state was applied for 10 ms. Next, a-line-at-a-time driving was conducted. Periods for selecting row electrodes were determined to be 0.1 ms respectively.

When a test pattern was displayed, a display having a high contrast ratio could be obtained without resulting in a residual image. However, a time required for a series of display writing operations was 21.3 ms, which was longer than the case of Example B-1.

EXAMPLE B-2

To initialize the entire display surface, a voltage of 45V was applied to the entirety of the panel for 5 ms in the same manner as the case of Example B-1. Subsequently, a non-voltage application portion of 0.3 ms in which a voltage of 0V was applied to the liquid crystal panel was provided. Then, a voltage of 45V as a voltage for obtaining a FC state was applied for 0.3 ms. The non-voltage application portion and the voltage application period for obtaining a FC state were repeated 8 times in total, and then a-line-at-a-time driving was performed. Periods for selecting row electrodes were determined to be 0.1 ms respectively.

When a test pattern was displayed, a display having a high contrast ratio could be obtained without resulting in a residual image. A time required for a series of display writing operations was 15.8 ms by which a required time could further be improved. Further, in the steps for initializing the entire display surface, voltage conditions for obtaining a homeotropic alignment, i.e. 45V and 5 ms could be used in common.

This means that the number of voltage levels of a power source circuit can be reduced, and therefore, it is advantageous in using the driving circuit practically. Further, it is preferable that the number of times of repeating the non-voltage application portion and the voltage application period for obtaining a FC state is about 10 times or less.

COMPARATIVE EXAMPLE B-2

To initialize the entire display surface, a voltage of 45V was applied to the entirety of the panel for 5 ms in the same manner as the case of Example B-2. Subsequently, a non-voltage application portion of 0.3 ms in which a voltage of 0V was applied to the liquid crystal panel was provided. Then, a voltage of 45V as a voltage for obtaining a FC state was applied for 10 ms. Next, a-line-at-a-time driving was conducted.

Periods for selecting the row electrodes were determined to be 0.1 ms respectively. When a test pattern was displayed, a display having a high contrast ratio could be obtained without resulting in a residual image. However, a time required for a series of display writing operations was 21.3 ms which was longer than the case of Example B-2.

EXAMPLE B-3

In the driving conditions in Example B-1, when image data are written according to a-line-at-a-time driving, a time of applying voltages to the column electrodes in a selection period is divided uniformly into 10 portions, and voltages corresponding to ON and OFF corresponding to gradation data are applied to the column electrodes in each divided period. When a test pattern was displayed by such a voltage application method, a uniform gradation display corresponding to the display data could be obtained.

COMPARATIVE EXAMPLE B-3

In the driving conditions of Example B-1, the voltages applied to the column electrodes are determined as $V_C$ in ON and $-V_C$ in OFF, and voltage values of $n \circ V_C (-1 < n < 1)$ were applied to the column electrodes according to gradation data. A display of 10 gradations was performed by changing the voltage values. Various test patterns were displayed. As a result, displays having irregularity in parallel to the column electrodes were produced, i.e., there were ununiform gradation displays.

Further, in performing a gray scale display, a good gradation display can be obtained by using a pulse width modulation method. However, it is impossible to obtain a good gradation display when an amplitude modulation method is used.

Figure 23:
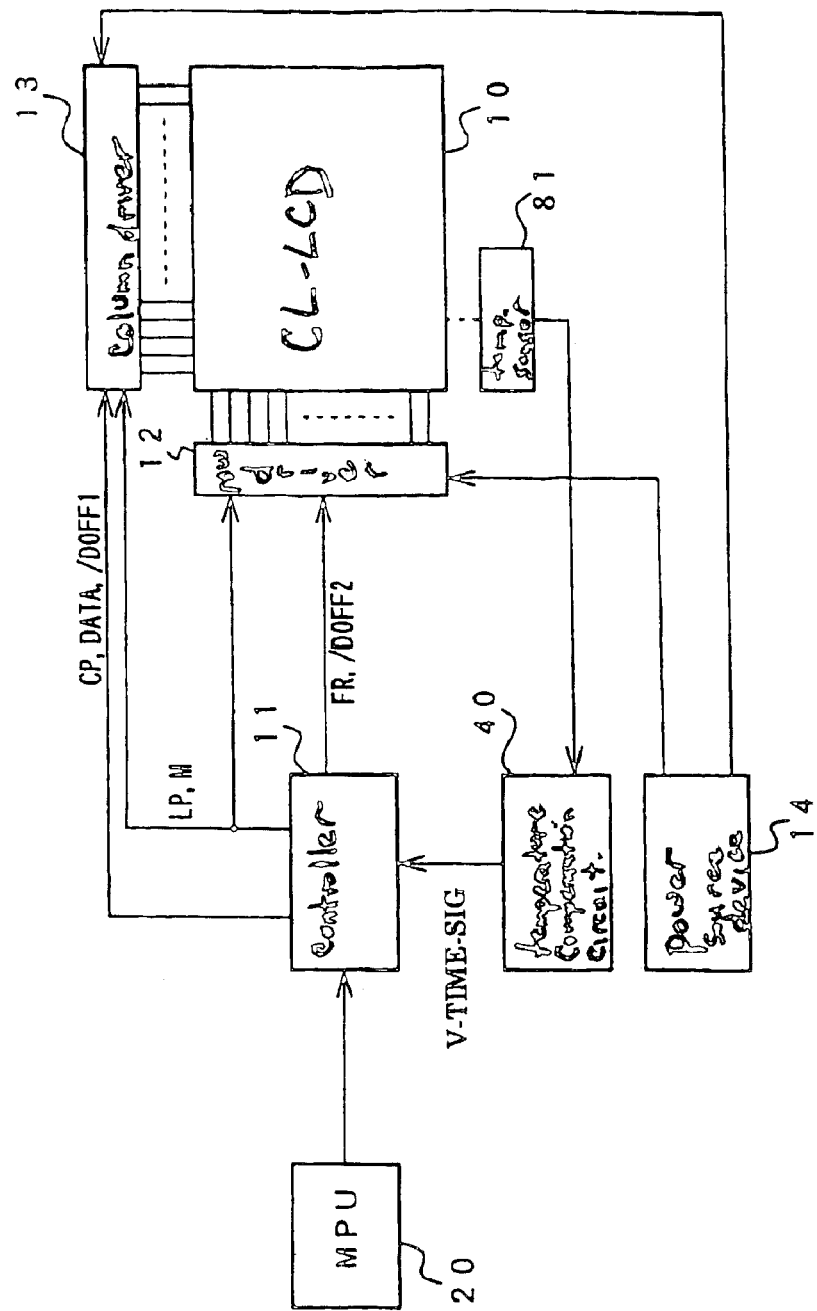
FIG. 23 is a block diagram showing a structural example of a temperature compensation type driving apparatus.

In the following description, an explanation will be given as to Embodiment C of the present invention which allows driving in a broader temperature range. FIG. 23 is a block diagram showing an embodiment of the driving apparatus. An FR signal, an LP signal, an M signal and a /DOFF signal are inputted to the row driver 12 as controlling signals from the controller 11. The controller 11 supplies an LP signal, a CP signal, an M signal, a /DOFF2 signal and display data (DATA) to a column driver 13. The /DOFF1 signal is a /DOFF signal produced by the controller 11 and supplied to the column driver 13, and the /DOFF2 is a /DOFF signal produced by the controller 11 and supplied to the row driver 12. The row driver 12 and the column driver 13 receive necessary voltages from a power source device 14.

When the FR signal becomes a high level, the row driver 12 selects a first row. The LP signal is a signal to shift a selected row by one, and the M signal is a signal for being alternated. The CP signal is used as a clock signal to transfer display data from the controller 11 to the column driver 13. When the /DOFF signal is at a low level, the row driver 12 and the column driver 13 make voltage levels to be applied to the liquid crystal panel 10 to be predetermined levels (level $V_0$ at an erasing time) respectively. When the /DOFF signal is at a high level, a writing state is generally provided.

A START signal is to instruct the timing of rewriting data. The START signal may be a signal which becomes effective for each predetermined period by a timer or a display rewriting instruction signal given by a MPU as a image data generating source or an external switch. FIG. 23 shows an example in which the signal is outputted from MPU 20.

Further, a temperature sensor 81 is disposed in the vicinity of the liquid crystal panel 10, and an output detected by the temperature sensor 81 is inputted to a temperature compensation circuit 40. The temperature compensation circuit 40 supplies the controller 11 with an application time instruction signal according to an output detected by the temperature sensor.

Figure 24:
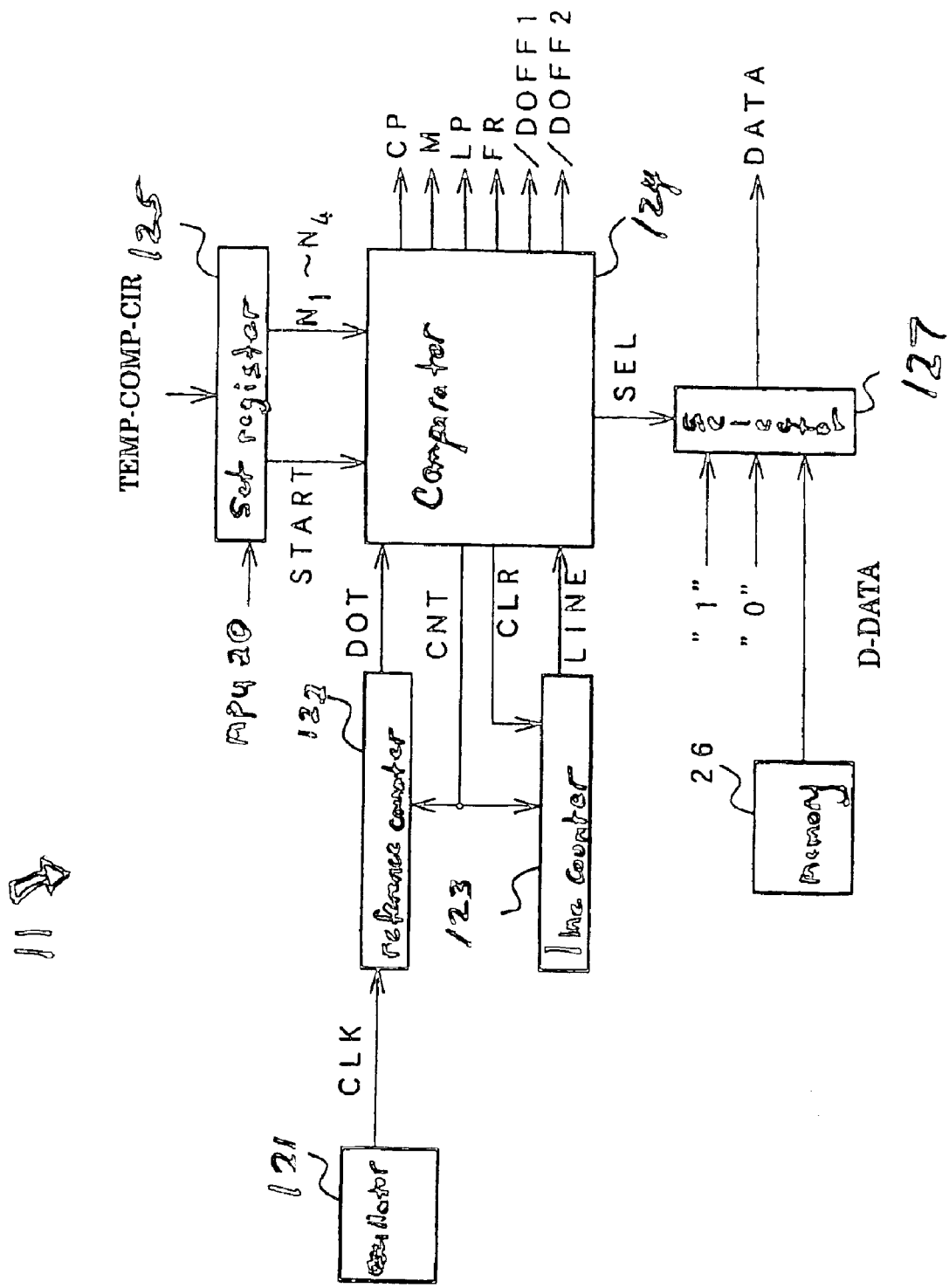
FIG. 24 is a block diagram showing a controller in the temperature compensation type driving apparatus.

FIG. 24 is a block diagram showing a structural example of the controller 11. An oscillator 121 generates a clock signal (CLK) having a predetermined frequency. A reference counter 122 receives CLK to count. When the counted value of the reference counter 122 reaches a predetermined value, a line-counter 123 adds +1 to its value. A comparator 124 receives a counted value (DOT) of the reference counter 122, a counted value (LINE) of the line-counter 123 and a set value ($N_1$–$N_4$) of a set register 125 to produce the CP signal, the M signal, the LP signal, the /DOFF1 signal, the /DOFF2 signal and the SEL signal. The SEL signal is outputted to a selector 127.

A memory 126 stores display data from the MPU 20. The selector 127 selects any one of data in the memory 126, a "1" fixing signal and a "0" fixing signal in response to the SEL signal, and outputs to CL-LCD 10 the selected data as a DATA signal.

An application time instruction signal (a set value) for determining a voltage application time is supplied from the temperature compensation circuit 40 to the set register 125. In this embodiment, the set value is a value converted by a clock number produced from the oscillator 121. Here, a high voltage application time (a period of the first stage) for obtaining a homeotropic alignment is represented by $N_1$, a time of the non-voltage application portion (a period of the seconds state) is represented by $N_2$, a voltage application time (a period of the third stage) for changing the state to a FC state is represented by $N_3$, and one selection time in the a-line-at-a-time driving is represented by $N_4$.

When rewriting of data is required, an instruction for rewriting the display is generated from the MPU to the set register 125. When the instruction for rewriting the display is set in the set register 125, a START signal is outputted to the comparator 124.

Figure 25:
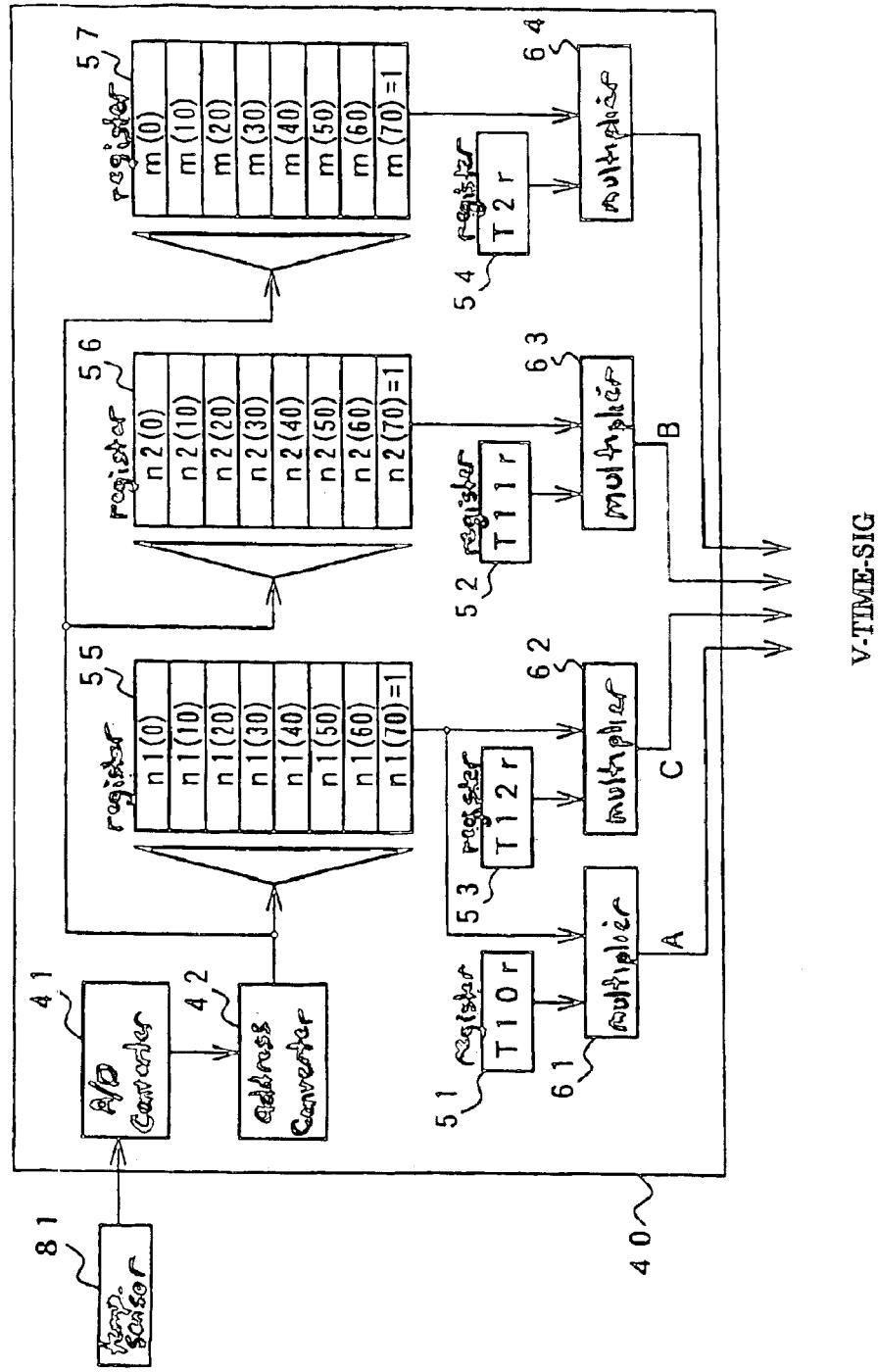
FIG. 25 is a timing chart showing a structural example of a temperature compensation circuit.

Turning now to FIG. 25, which is a block diagram showing a structural example of the temperature compensation circuit 40. An output detected by the temperature sensor 81 is converted into a digital signal in an A/D converter 41, and the converted signal is supplied to an address converter 42. A register 55 stores temperature coefficients relating to a period of the first stage and a period of the third stage corresponding to each temperature. Further, a register 56 stores temperature coefficients relating to a period of the second stage corresponding to each temperature. Also, a register 57 stores temperature coefficients relating to a period of the addressing portion corresponding to each temperature. A region which stores each temperature coefficient has an address corresponding to a detected temperature.

For example, when a temperature detected is 75° C. which exceeds 65° C., the address converter 42 outputs addresses in which temperature coefficients $n_1$, $n_2$ and m corresponding to 70° C. in the registers 55, 56 and 57 are stored. In FIG. 25, the temperature coefficients $n_1$, $n_2$ and m corresponding to 70° C. are indicated as $n_1(70)$, $n_2(70)$ and $m(70)$.

Here, $n_2 \geq n_1$ and $n_2 \geq m$. In each of the registers 55, 56 and 57, lower temperatures have larger values. In this embodiment, the temperature coefficient corresponds to the highest temperature is "1", and accordingly, each value stored in the registers 55, 56 and 57 has a value exceeding 1.

A register 51 stores data (T10r) indicating the length of the first stage at a predetermined temperature (70° C. in this Example). A register 52 stores data (T11r) indicating the length of the second stage at a predetermined temperature (70° C. in this Example), and a register 53 stores data (T12r) indicating the length of the third stage at a predetermined temperature (70° C. in this Example). Further, a register 54 stores data (T2r) indicating the length of the addressing portion at a predetermined temperature (70° C. in this Example). The data indicating the length of the addressing portion may be data indicating the length of one display sequence or data indicating one selection period.

A multiplier 61 produces an application time instruction signal by the multiplication of an output of the register 55 and an output of the register 51. Namely, an application time instruction signal is produced by operating $n_1 \circ T10r$. This application time instruction signal corresponds to $N_1$ (the first stage: the length of the reset portion) used by the comparator 24 shown in FIG. 24. A multiplier 62 produces an application time instruction signal by the multiplication of an output of the register 55 and an output of the register 53.

Namely, an application time instruction signal is produced by operating $n_1 \circ T11r$. This application time instruction signal corresponds to $N_3$ (the third stage: the length of the focalconic portion) used by the comparator 24 shown in FIG. 24.

Further, a multiplier 63 produces an application time instruction signal by the multiplication of an output of the register 56 and an output of the register 52. Namely, an application time instruction signal is produced by operating $n_1 \circ T11r$. This application time instruction signal corresponds to $N_2$ (the second stage: the length of the non-voltage application portion) used by the comparator 24 shown in FIG. 24.

Further, a multiplier 64 produces an application time instruction signal by the multiplication of an output of the register 57 and an output of the register 54. Namely, an application time instruction signal is produced by operating $m \circ T2r$. This application time instruction signal corresponds to $N_4$ as the length of a period of the addressing portion. In to this Example, $N_4$ is a value indicating one selection period.

Figure 26:
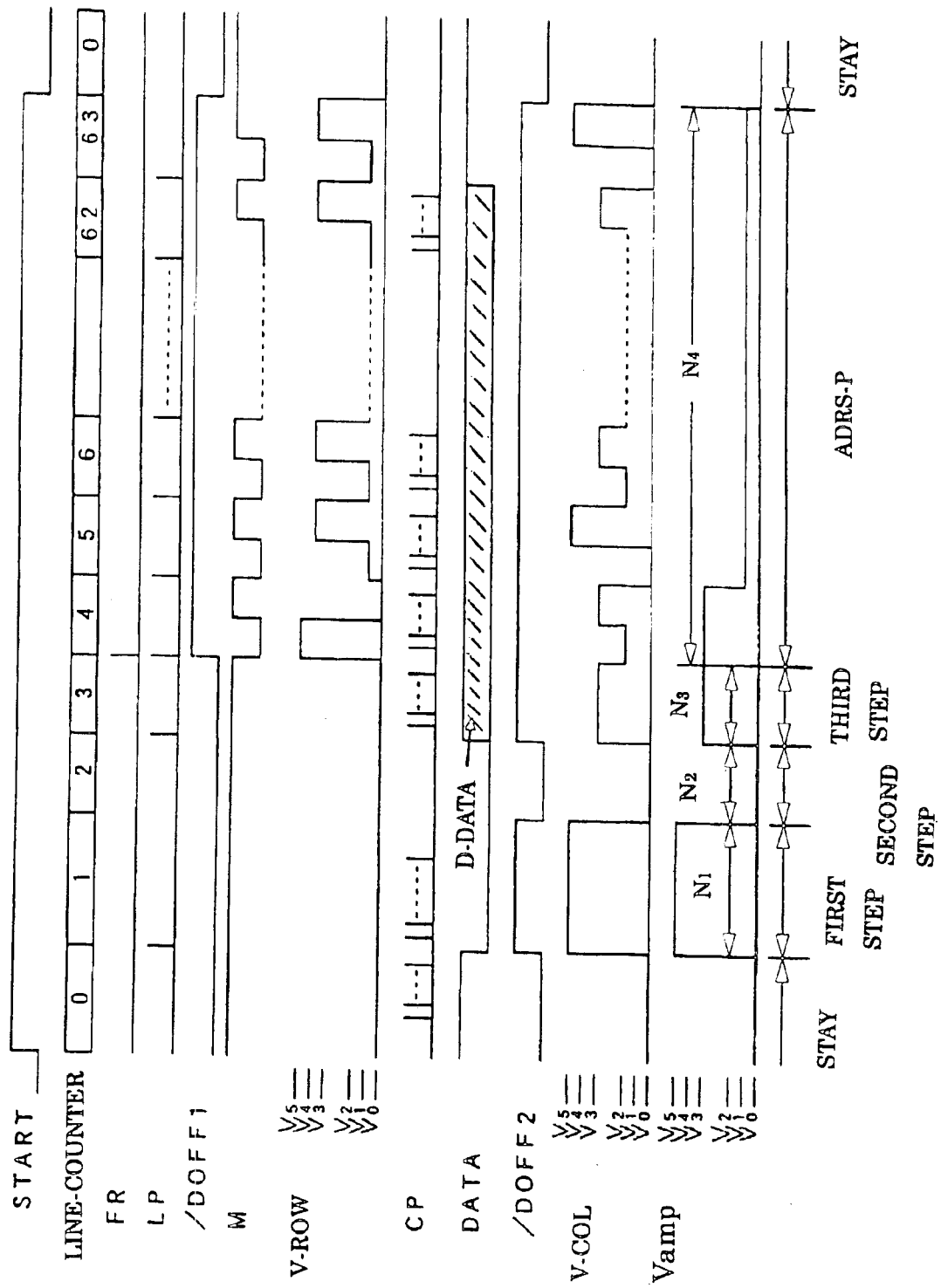
FIG. 26 is a timing chart showing the operation of a display sequence controlling circuit.

In the following description, operations will be described with reference to the timing chart of FIG. 26. Here, a voltage applied to the liquid crystal which is required to obtain a homeotropic alignment in CL-LC and an ON voltage in a-line-at-a-time driving are $V_r+V_C$, and a voltage applied to the liquid crystal which is required to change CL-LC into a FC/PL-mixed state and an OFF voltage in the a-line-at-a-time driving are $V_r-V_C$, respectively.

The controller 11 maintains the liquid crystal display device to an initial state until the MPU 20 instructs to initiate a display. Namely, the controller maintains that the CP signal is at a low level, the LP signal is at a low level, the M signal is at a high level, DATA is at a high level, and the /DOFF 1 signal and /DOFF2 signal are at a low level. Since both of the /DOFF1 signal and the /DOFF2 signal are at a low level, all of the row electrodes and column electrodes are in a non-voltage application state, i.e., a state of potential $V_0$. Further, the reference counter 122 and the line-counter 123 maintain 0.

When an instruction of starting a display is generated from the MPU 20, a START flag is set in the set register 125, and a START signal becomes a high level. When the START signal becomes a high level, the comparator 124 makes the reference counter 122 active. The reference counter 122 increases the counted value by 1 in response to the clock signal (CLK) from the oscillator 121.

When the value of the line-counter 123 is 0, the reference counter 122 counts up until the value is coincident with $N_4$. The comparator 124 makes the CP signal a high level when the counted value of the reference counter 122 is an even number, and makes it a low level in a case of an odd number, so that CP signals according to the number of pulses which meets the number of dots of the display element are generated. In these operations, DATA is at a high level, and accordingly, the values of inner registers of the column driver 13 are all at a high level.

When the counted value of the reference counter 122 is coincident with $N_4$, the comparator 124 makes the CNT signal a high level for 1 clock period. In response to the CNT signal, the reference counter 122 returns the value to 0, and the line-counter 123 adds +1 to its value. Further, at this moment, the LP signal is made to be a high level for 1 clock period. Accordingly, the values of inner registers of the column driver 13 are reflected as outputs of the column driver 13.

When the value of the line-counter 123 becomes 1, the comparator 124 makes the /DOFF2 signal a high level. All voltage levels of the column electrodes become $V_5(V_r+V_C)$ according to the relation shown in FIG. 11 in the same manner as Embodiment A. Further, since all voltage levels of the row electrodes are $V_0$, the voltage applied to the liquid crystal becomes $(V_r+V_C)$ to all pixels. Namely, a voltage required for a homeotropic alignment of the liquid crystal is applied to the entire display surface.

Further, the comparator 124 outputs the SEL signal so as to set DATA to a low level. The selector 127 selects "0" in response to the SEL signal. Then, the comparator 124 outputs sequentially the CP signal so that all of the values of inner registers of the column driver 13 are at a low level. The reference counter 122 counts up until the counted value is coincident with $N_1$. When the counted value is coincident with $N_1$, the counted value is returned to 0. At this moment, +1 is added to the value of the line-counter 123 so that the value becomes "2".

When the value of the line-counter 123 becomes "2", the comparator 124 makes the /DOFF2 signal a low level so that outputted potentials of the column driver 13 are all made $V_0$. Therefore, the voltage applied to the liquid crystal becomes 0V. Then, the reference counter 122 counts up until the counted value is coincident with $N_2$.

When the counted value is coincident with $N_2$, it returns the counted value of the reference counter 122 to 0, and +1 is added to the value of the line-counter 123. When the value of the line-counter 123 is changed from 2 to 3, the comparator 124 makes the LP signal a high level for 1 clock period. As a result, the values of inner registers of the column driver 13 are reflected as outputs of the column driver 13.

When the value of the line-counter 123 is "3", the comparator 124 makes the /DOFF2 signal a high level. At this moment, since the M signal is at a high level, and DATA latched by the column driver 13 is at a low level, the voltage applied to all of the column electrodes becomes $V_3$ according to the relation shown in FIG. 11, and the voltage applied to the liquid crystal becomes $V_3(V_r-V_C)$ to all of the pixels. Accordingly, the voltage applied to the liquid crystal required for obtaining a FC state is applied to the entire display. Then, the reference counter 122 counts up until the counted value is coincident with $N_3$. When the counted value is coincident with $N_3$, the counted value of the reference counter 122 is returned to 0, and +1 is added to the value of the line-counter 123.

When the value of the line-counter 123 is "3", the comparator 124 outputs the SEL signal so as to select display data from the memory 126 as DATA. The selector 127 is in a state of selecting display data from the memory 126 in response to such a SEL signal. Then, the comparator 124 outputs sequentially the CP signal to put display data into inner registers of the column driver 13.

When the value of the line-counter 123 becomes 4, the comparator 124 makes the LP signal a high level for 1 clock period so that the values of inner register of the column driver 13 are reflected as outputs of the column driver 13. Further, it makes the FR signal a high level for a predetermined period so as to include the pulse of the LP signal, and instructs the row driver 12 to effect scanning from a first row.

Further, the comparator 124 sets the /DOFF1 signal to a high level. Accordingly, a voltage required for the a-line-at-a-time driving is outputted as outputs of the column driver 13 and the row driver 12. In FIG. 26, this period is shown as the addressing portion.

The comparator 124 makes the M signal a low level when the counted value of the reference counter 122 is smaller than $(N_4/2)$ in the addressing portion, and makes the M signal a high level when the counted value is $(N_4/2)$ or more, whereby the voltage applied to liquid crystal in the a-lineat-a-time driving is rendered to be alternated. Further, it outputs display data of the memory 126 as DATA for the next row to be selected. DATA is received by the inner registers of the column driver 13 according to the CP signal. The reference counter 122 counts up until the counted value is coincident with $N_4$. When the counted value is coincident with $N_4$, the counted value of the reference counter 122 is returned to 0, and +1 is added to the value of the line-counter 123. The comparator 124 generates the LP signal as a pulse-like output for each time when +1 is added to the value of the line-counter 123, whereby the scanning of the next row is instructed to the row driver 12 and the output of the next display data is instructed to the column driver 13.

When the value of the line-counter 123 becomes (3+the number of rows to be displayed), the comparator 124 makes the CP signal and the LP signal a low level, instructs the selector 26 through the SEL signal to output DATA of "1", and fixes the M signal to a high level. Then, when the counted value of the reference counter 122 is coincident with $N_4$, it makes the CLR signal a high level for 1 clock period, and makes the reference counter 122 and the line-counter 123 clear to be 0. Further, the /DOFF1 signal and the /DOFF2 signal are changed to a low level to make the voltage applied to the liquid crystal to be 0V, and the START flag is negated to return the initial state. In Embodiment C, the number of rows to be displayed is 60.

As described above, in Embodiment C, the first stage to the third stage, i.e., the reset portion, the non-voltage application portion and the focalconic portion are produced by utilizing the M signal and the /DOFF signals which can be handled by the conventional liquid crystal driving apparatus. Accordingly, the IAPT driving driver can be applied to the present invention.

Further, since the temperature compensation circuit 40 determines a voltage application time depending on a temperature detected by the temperature sensor 81, and the resetting of the liquid crystal panel 10 and the writing of image data are performed according to the determined voltage application time, an excellent quality of display can be maintained even at a low temperature.

Further, it is necessary that the second stage (the non-voltage application portion) has a larger rate of increasing the voltage application time depending on a reduction of temperature in comparison with the first or the third stage. However, the lengths of the first stage to the third stage can be controlled to an appropriate length depending on temperature by providing separately the register 55 relating to the first stage and the third stage and the register 56 relating to the second stage as shown in FIG. 25.

EXAMPLE C-1

To initialize the entire display surface of the liquid crystal panel 10 at a room temperature of 25° C., a voltage of 40V was applied to the entirety of the panel for 13.2 ms at the time of starting a display sequence. Subsequently, a non-voltage application time of 1 ms in which the voltage to be applied to the liquid crystal panel 10 was 0V was provided. Then, a voltage of 23V was applied to all pixels for 3.3 ms as conditions of voltage to obtain a FC state. Then, a a-line-at-a-time driving was carried out. The driving waveform as shown in FIG. 9(B) was used.

In a series of voltage treatments before the writing of display data, it was confirmed that the liquid crystal panel 10 became a FC state in which a slight residual reflection remained. Subsequently, the a-line-at-a-time driving was performed to write a display, and a test pattern was displayed under the above-mentioned conditions. As a result, a display having a high contrast ratio could be obtained without resulting in a residual image.

Further, the room temperature was set to 0° C., and the voltage application times were respectively increased to 4 times. When a test pattern was displayed in such case, a display having a high contrast ratio could be obtained without resulting in a residual image.

COMPARATIVE EXAMPLE C-1

The liquid crystal panel 10 was driven at a room temperature of 0° C. under the same voltage application conditions (40V, 13.2 ms, 0V, 1 ms, 23V and 3.3 ms) as in Example C-1. In displaying a test pattern, residual images were generated. Namely, there were many residual images and a good display could not be obtained at 0° C. under the same driving conditions as in Example C-1. Further, when each of the applicable voltage values was increased under conditions that each of the voltage application times was the same as in the case of Example 1, a desired display could be obtained although the contrast ratio was low.

EXAMPLE C-2

Some of the voltage application conditions (40V, 13.2 ms, 0V, 1 ms, 23V and 3.3 ms) in Example C-1 were changed, and the room temperature was 25° C. Namely, the voltage application time was made double in the first stage, the third stage and the period of a-line-at-a-time driving, the voltage application time in the second stage was made 4 times, and the voltage values in the respective periods were made higher than the case of Example C-1. In displaying a test pattern, there was no residual image, and a display of high contrast ratio could be obtained. Further, the time of writing display data could be shortened in comparison with the voltage application conditions in the case of 0° C. in Example C-1.

COMPARATIVE EXAMPLE C-2

Some of the voltage application conditions (40V, 13.2 ms, 0V, 1 ms, 23V and 3.3 ms) in Example C-1 were changed at a room temperature of 0° C. Namely, each of the voltage application times was made double. In displaying a test pattern, a display having a low contrast was produced although there was no residual image.

As described above, in the first stage, the state of the CL-LC alignment is changed to a HO state to erase the previously written display. Further, in the second stage, the state of the CL-LC alignment is changed from the HO state to a HG state or a HG/PL-mixed state. Also, in the third stage, the change is made from the HG state or the HG/PL-mixed state to a FC state or a FC/PL-mixed state. Then, in a period of a-line-at-a-time driving, a desired display state is written in the FC state or the FC/PL-mixed state.

In Example C-1, when the temperature of CL-LC decreases, the voltage application time in each step should be extended. For example, when the temperature decreases from 25° C. to 0° C., the voltage application times should be several times, whereby a good quality of display can be maintained.

However, the voltage application times required to cause a change of the state of the alignment differ among the stages. As is clear from Example C-2 and Comparative Example C-2 that in the second stage in which the state of CL-LC is changed from the HO state to the HG state or the HG/PL-mixed state, the rate of increasing the voltage application time in response to a reduction of temperature should be increased in comparison with that of the other stages.

If the HO state in the second stage can not sufficiently be changed to the HG state or the HG/PL-mixed state, it is impossible to obtain a desired FC state or FC/PL-mixed state in the third stage, with the result that the reflectance in an OFF time which should be in a FC state increases in the a-line-at-a-time driving, and the contrast ratio is reduced.

EXAMPLE C-3

The liquid crystal panel 10 was driven at a room temperature of 50° C. by using the voltage application conditions (40V, 13.2 ms, 0V, 1 ms, 23V and 3.3 ms) in Example C-1 provided that applicable voltages in the respective periods were set to be slightly lower. When a test pattern was displayed, there was no residual image, and a display of high contrast ratio could be obtained.

EXAMPLE C-4

The liquid crystal panel 10 was driven at a room temperature of 50° C. by using the voltage application conditions (40V, 13.2 ms, 0V, 1 ms, 23V and 3.3 ms) in Example C-1 provided that the respective voltage application periods were set to ½. Further, the applicable voltages in the respective periods were set to be slightly lower than the case of Example C-1. When a test pattern was displayed, a display having a contrast ratio free from residual images could be obtained.

From the above-mentioned description, it is clear that when voltage application conditions at 25° C. are taken as reference values, the voltage application times should be double at 0° C., and the voltage application times should be ½ at 50° C., whereby a good display can be obtained even when the temperature is higher or lower than 25° C.

The magnification of increasing or decreasing the periods depending on a temperature change in the period of the first stage and the period of the third stage in a series of voltage treatments (the resetting of display) before writing display data is the same as the magnification of increasing or decreasing the period of writing display data. However, with respect to the second period, it is preferable that the magnification of the voltage application period (the voltage application period of 0V) is larger than the magnification of these periods when temperature is lower.

In a specific way of determining the temperature, when the magnification $n(t_p)$ ($t_p$=temperature) and $K_A$ which is a constant in a range of 5 to 50 were determined so as to satisfy the following formula 5 in all the periods excluding the period of the second stage in the resetting of a display (the periods of the resetting a display and the writing of a display), a display having a high contrast ratio could be obtained. In the following formula 5, the right side of "^" indicates an index:

$$n(t_p)=n(25)\times 2^{\wedge}((25-t_p)/K_A) \quad (5)$$

Further, when the predetermined temperature is 25° C., and the length of a period in which a voltage is applied to each pixel at an optional temperature $t_p$, under conditions of voltage corresponding to display data (the addressing period) is represented by $T_2(t_p)$, it is preferable that the length satisfies the relation of the following formula 6:

$$T_2(t_p)=T_2(25)\times 2^{\wedge}((25-t_p)/K_B) \quad (6)$$

where $K_B$ is a constant determined according to CL-LC used, which is preferably determined in a range of from 5 to 50. $K_A$ and $K_B$ preferably have a value of about 25.

Further, the second stage is in a state of an applicable voltage of 0V. Accordingly, when the period of the second stage is previously determined to be a longer period at a predetermined temperature, the periods of all of the stages can be determined uniformly based on temperatures. Further, a high-speed display could be obtained at each temperature without adjusting the amplitude of the voltage.

Figure 27:
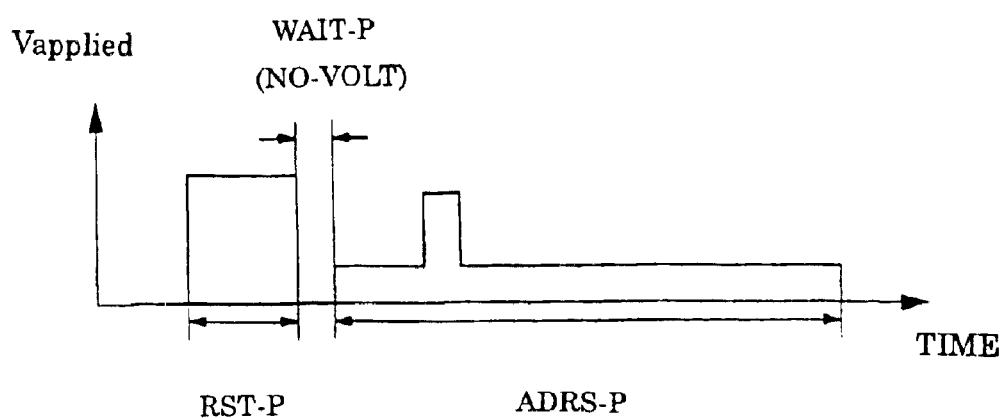
FIG. 27 is a waveform diagram showing a driving waveform for conducting a resetting operation in a PL state.
Figure 28:
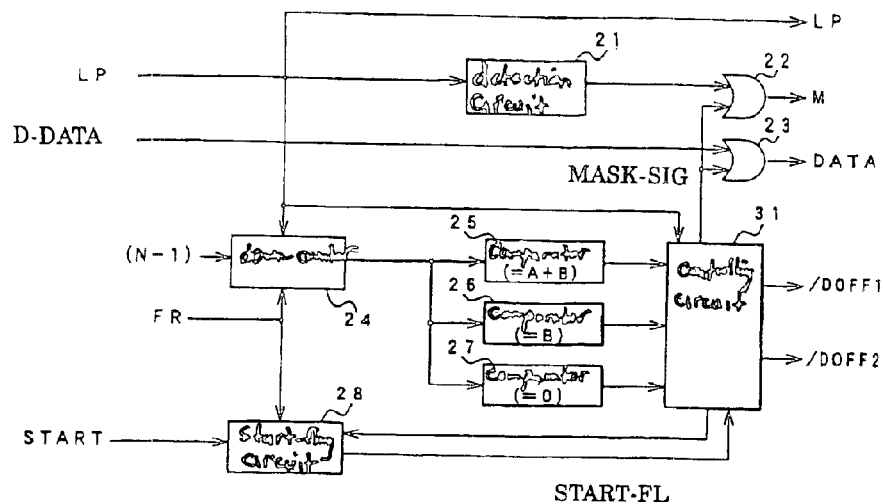
FIG. 28 is a block diagram showing a driving circuit for conducting a resetting operation in a PL state.
Figure 29:
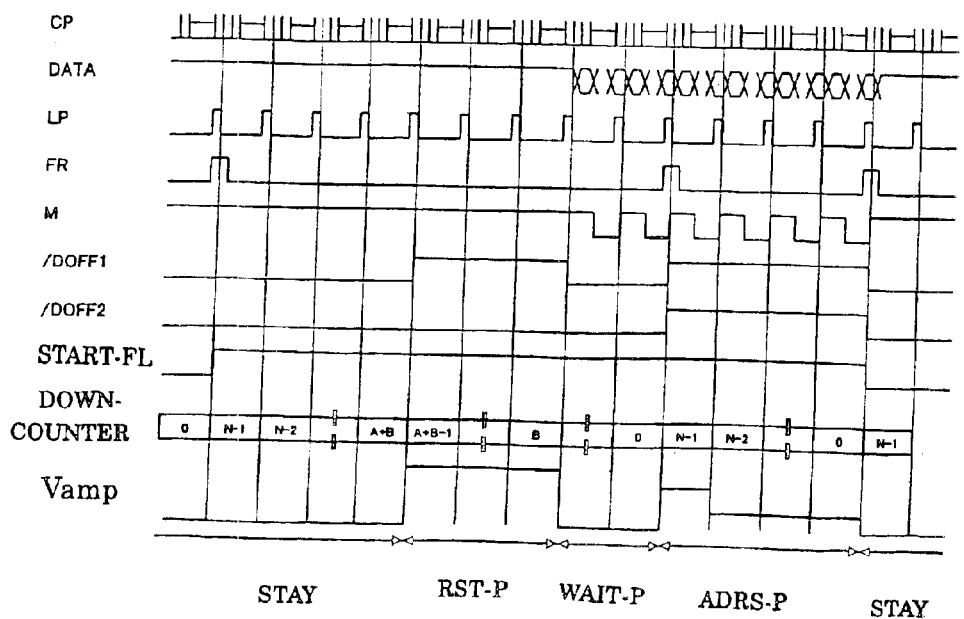
FIG. 29 is a timing chart for the resetting operation in a PL state.

Embodiment D of the present invention in which CL-LCD is reset in a HG state or a PL state will now be described. FIG. 27 shows a timing chart of a driving waveform, FIG. 28 shows a block diagram of a signal conversion circuit in the driving circuit, and FIG. 29 shows a timing chart in the operation of the signal conversion circuit. The structure of the circuit and the operation are common in many points to Embodiments A, B and C of the present invention. Voltage pulses required in this embodiment can be obtained by modifying the structure of the circuit shown in FIG. 16 and the operational timing in FIG. 17.

EXAMPLE D-1

A display was carried out in the liquid crystal panel of Example A-1 by using the driving waveform shown in FIG. 27. A voltage of 40V was applied to the entirety of the liquid crystal panel for 13.3 ms. Subsequently, a non-voltage application time of 1 ms was provided. Then, a-line-at-a-time driving was performed. In an ON display (a PL state) in a selection time, a voltage of $V_r+V_C$ was applied, and in an OFF display (a FC state) in a selection time, a voltage of $V_r-V_C$ was applied wherein $V_r$=35V and $V_C$=5V The selection time to row electrodes was 3.3 ms. A test pattern was displayed. As a result, a display having a high contrast ratio free from residual image could be obtained.

EXAMPLE E

By using the above-mentioned Embodiments A, B and C of the present invention, liquid crystal panels usable for an electronic book, a pager or a mobile type display device as a kind of portable display device, were prepared.

Figure 30:
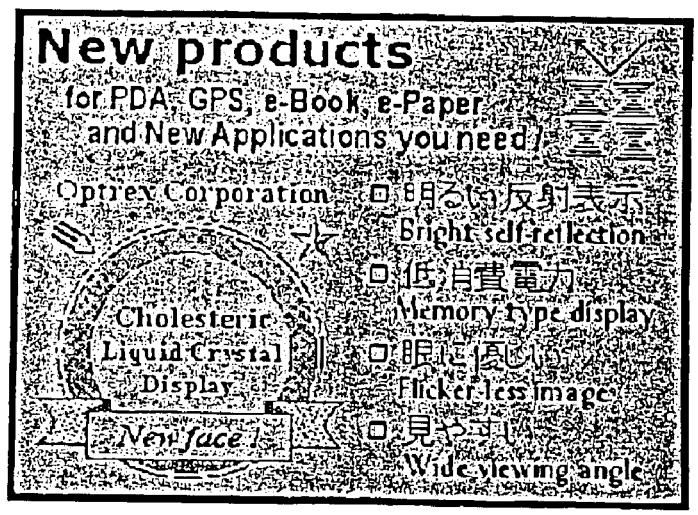
FIG. 30 shows a display state in an example of the liquid crystal display device of the present invention.

A clear display of highly precise full-dot matrix with row electrodes and column electrodes could be carried out. FIG. 30 shows an example of the display. Characters could sufficiently be read even though they are thin. Further, the viewing angle was wide, the rewriting of a display on the display surface could be performed without giving a strange feeling, and a display of quality being easy to look could be achieved.

The liquid crystal panels were applicable to a public information display apparatus and an electrophotographic display apparatus using a relatively large display surface.

According to Embodiment A of the present invention, there are such effects that a cholesteric liquid crystal can certainly be aligned in a FC state or a semi-FC state before writing display data, the production of a residual image or reduction in the contrast ratio of display can be prevented even when high-speed writing is conducted, and the quality of a display can be increased even in a case that a highly precise display is carried out.

Further, since the time for aligning the cholesteric liquid crystal in a FC state can be shortened, the time required for a sequence of renewing a series of picture images can further be shortened.

Further, according to Embodiment B of the present invention, CL-LC can certainly be aligned in a FC state or a semi-FC state before performing the writing of display data, the production of a residual image or reduction in the contrast ratio can be prevented even when high-speed writing is carried out, and the quality of a display can be increased even in a case that a highly precise display is effected. Further, the time for aligning CL-LC in a FC state can further be shortened, and the time required for a sequence for renewing a series of picture images can further be shortened.

Further, in Embodiment C of the present invention, a good quality of display can be maintained even in circumstances of use at a low temperature, and the time of voltage treatments in changing a display can be shortened in comparison with the conventional technique.

Further, in Embodiment D of the present invention, the production of a residual image or reduction in the contrast ratio can be prevented even when high-speed writing is carried out.

What is claimed is:

1. A driving method for driving a liquid crystal display device with a cholesteric liquid crystal having a memory mode of operation, comprising:
    a first stage of applying a voltage so that an alignment of the cholesteric liquid crystal is substantially in parallel to a voltage application direction;
    a second stage of applying a voltage to change a state of the cholesteric liquid crystal to a homogeneous state or a homogeneous/planar-mixed state; and
    a third stage of applying a voltage to change the state of the cholesteric liquid crystal from the homogeneous state or the homogeneous/planar-mixed state to a focalconic state; wherein
    a period of the second stage is determined based on $\tau_H$, which is a time spent until the cholesteric liquid crystal, in a homeotropic state by application of a voltage, indicates the lowest dielectric constant after the application of the voltage is stopped.

2. A driving method for driving a liquid crystal display device with a cholesteric liquid crystal having a memory mode of operation, comprising:
    a first stage of applying a voltage so that an alignment of the cholesteric liquid crystal is substantially in parallel to a voltage application direction;
    a second stage of applying a voltage to change a state of the cholesteric liquid crystal to a homogeneous state or a homogeneous/planar-mixed state; and
    a third stage of applying a voltage to change the state of the cholesteric liquid crystal from the homogeneous state or the homogeneous/planar-mixed state to a focalconic/planar-mixed state, wherein a period of the second stare is determined based on $\tau_H$, which is a time spent until the cholesteric liquid crystal, in a homeotropic state by application of a voltage, indicates the lowest dielectric constant after the application of the voltage is stopped.

3. The driving method according to claim 1, wherein $0.8 \times \tau_H \leq \tau_2 \leq 8 \times \tau_H$ is satisfied, wherein $\tau_2$ is the period of the second stage.

4. The driving method according to claim 3, wherein $\tau_H \leq \tau_2 \leq 5 \times \tau_H$ is satisfied.

5. The driving method according to claim 1, wherein the voltage value applied in the second stage is 0 V.

6. The driving method according to claim 1, wherein a voltage waveform applied in the first stage comprises a pulse-like voltage having a voltage amplitude of $V_1$,
    wherein a voltage waveform applied in the third stage comprises a pulse-like voltage having a voltage amplitude of $V_3$, and
    wherein $V_1$ is larger than $V_3$ and $\tau_3$ is smaller than $\tau_1$ where $\tau_1$ and $\tau_3$ are respectively voltage application times in the first and third stages.

7. The driving method according to claim 1, wherein when a a-line-at-a-time operation is carried out to apply a voltage waveform based on display data of each display pixel after the first stage to the third stage, and conditions of applying voltages are determined so as to write a planar state in an ON display and to write a focalconic state in an OFF state, a pulse width modulation system is used for a display having a gray scale.

8. A driving apparatus for driving a liquid crystal display device with a cholesteric liquid crystal having a memory mode of operation, comprising:
    a first period determining means for determining a period of a first stage;
    a second period determining means for determining a second period in succession to the first stage;
    a third period determining means for determining a third period in succession to the second stage; and
    a voltage application means,
    wherein a voltage is applied to the cholesteric liquid crystal so that an alignment of the cholesteric liquid crystal is substantially in parallel to a voltage application direction in the first period produced by the first period determining means,
    wherein a voltage is applied to the cholesteric liquid crystal to change a state of the liquid crystal to a homogeneous state or a homogenous/planar-mixed state in the second period produced by the second period determining means,
    wherein a voltage is applied to the cholesteric liquid crystal to change the state from the homogeneous state or the homogenous/planar-mixed state to a focalconic state or a planar/focalconic-mixed state in the third period produced by the third period determining means, and
    wherein the second period is determined based on $\tau_H$, which is a time spent until the cholesteric liquid crystal, in a homeotropic state by application of a voltage, indicates the lowest dielectric constant after the application of the voltage is stopped.

9. A driving method for driving a liquid crystal display device with a cholesteric liquid crystal having a memory mode of operation, comprising:
    a first stage of applying a voltage so that an alignment of the cholesteric liquid crystal is substantially in parallel to a voltage application direction before a voltage is applied to each pixel based on conditions of voltage corresponding to display data;
    a second stage of applying a voltage to change a state of the cholesteric liquid crystal to a homogeneous state or a homogeneous/planar-mixed state; and
    a third stage of applying a voltage to accelerate the change of the cholesteric liquid crystal from the homogeneous state or the homogeneous/planar-mixed state to a focalconic state or a focalconic/planar-mixed state,
    wherein the second stage and the third stage are repeated after the first stage, and
    a period of the second stare is determined based on $\tau_H$, which is a time spent until the cholesteric liquid crystal, in a homeotropic state by application of a voltage, indicates the lowest dielectric constant after the application of the voltage is stopped.

10. The driving method according to claim 9, wherein the voltage value applied in the second stage is 0 V.

11. The driving method according to claim 10, wherein the number of times of repeating the second stage and the third stage is 2 to 10.

12. The driving method according to claim 9, wherein a voltage waveform applied in the first stage comprises a pulse-like voltage having a voltage amplitude of $V_1$,
wherein a voltage waveform applied in the third stage comprises a pulse-like voltage having a voltage amplitude of $V_3$, and
wherein $V_1$ is larger than $V_3$ and $\tau_3$ is smaller than $\tau_1$ where $\tau_1$ and $\tau_3$ are respectively voltage application times in the first and third stages.

13. The driving method according to claim 1, wherein a voltage waveform applied in the first stage comprises a pulse-like voltage having a voltage amplitude of $V_1$,
wherein a voltage waveform applied in the third stage comprises a pulse-like voltage having a voltage amplitude of $V_3$, and
wherein $V_1$ is equal to $V_3$ and $\tau_3$ is smaller than $\tau_1$ where $\tau_1$ and $\tau_3$ are respectively voltage application times in the first and third stages.

14. The driving method according to claim 9, wherein when a a-line-at-a-time operation is carried out to apply a voltage waveform based on display data of each display pixel after the completion of the first stage to the third stage, and conditions of applying voltages are determined so as to write a planar state in an ON display and to write a focalconic state in an OFF state, a pulse width modulation system is used for a display having a gray scale.

15. A driving apparatus for driving a liquid crystal display device with a cholesteric liquid crystal having a memory mode of operation, comprising:
a first period determining means for determining a period of a first stage;
a second period determining means for determining a second period in succession to the first stage;
a third period determining means for determining a third period in succession to the second stage;
a voltage application means; and
a frequency controlling means for operating repeatedly the second period determining means and the third period determining means after the operation of the first period determining means,
wherein a voltage is applied to the cholesteric liquid crystal so that an alignment of the cholesteric liquid crystal is substantially in parallel to a voltage application direction in the first period produced by the first period determining means,
wherein a voltage is applied to the cholesteric liquid crystal to change a state of the liquid crystal to a homogeneous state or a homogenous/planar-mixed state in the second period produced by the second period determining means,
wherein a voltage is applied to the cholesteric liquid crystal to accelerate a change of the state from the homogeneous state or the homogenous/planar-mixed state to a focalconic state or an intermediate state between planar and focalconic states in the third period produced by the third period determining means, and
wherein the second period is determined based on $\tau_H$, which is a time spent until the cholesteric liquid crystal, in a homeotropic state by application of a voltage, indicates the lowest dielectric constant after the application of the voltage is stopped.

16. A driving method for driving a liquid crystal display device with a cholesteric liquid crystal having a memory mode of operation, comprising:
initializing a display state by applying a predetermined voltage to each pixel; and
applying a voltage to each pixel based on conditions of voltage corresponding to display data,
wherein when a temperature of the cholesteric liquid crystal is lower than a predetermined temperature, a voltage application time is extended from a voltage application time corresponding to the predetermined temperature, and when the temperature of the cholesteric liquid crystal is higher than the predetermined temperature, a voltage application time is shortened from the voltage application time corresponding to the predetermined temperature, and
in driving according to a passive addressing system, when a period for initializing is represented by $T_1$ and a period for applying a voltage to each pixel based on conditions of voltage corresponding to display data is represented by $T_2$, lengths of $T_1$ and $T_2$ a extended from lengths of T1 and T2 determined with respect to the predetermined temperature, when the temperature of the cholesteric liquid crystal is lower than the predetermined temperature.

17. The driving method according to claim 16, wherein the period $T_1$ for initializing includes a first stage of applying a voltage so that the alignment of the cholesteric liquid crystal is substantially in parallel to a voltage application direction, a second stage of applying a voltage to change the state of the cholesteric liquid crystal to a homogeneous state or a homogeneous/planar-mixed state, and a third stage of applying a voltage to change the state of the cholesteric liquid crystal from the homogeneous state or the homogeneous/planar-mixed state to a focalconic state or a focalconic/planar-mixed state, and
wherein when periods of the first stage, the second stage and the third stage are respectively represented by $T_{10}$, $T_{11}$ and $T_{12}$, and when the temperature of the cholesteric liquid crystal is lower than a predetermined temperature, the lengths of $T_{10}$, $T_{11}$ and $T_{12}$ are extended from the lengths of $T_{10}$, $T_{11}$ and $T_{12}$ determined with respect to the predetermined temperature.

18. The driving method according to claim 17, wherein when $T_{10}$, $T_{11}$, $T_{12}$ and $T_2$ at a predetermined temperature are represented by $T_{10r}$, $T_{11r}$, $T_{12r}$ and $T_{2r}$, and when the temperature of CL-LC is lower than the predetermined temperature, $T_{10}$, $T_{11}$, $T_{12}$ and $T_2$ are made respectively to be $n_1 \times T_{10}$, $n_2 \times T_{11r}$, $n_2 \times T_{12r}$ and $m \times T_{2r}$ where $n_2 \geq n_1$ and $n_2 \geq m$.

19. The driving method according to claim 16, wherein when the predetermined temperature is 25° C., a period for applying a voltage to each pixel based on conditions of voltage corresponding to display data at a temperature $t_p$ is $T_2(t_p)$ and $K_A$ is a constant relying on 5 to 50 liquid crystal materials, the following formula is satisfied:

$$T_2(t_p)=T_2(25)\times 2\hat{}((25-t_p)/K_A).$$

20. The driving method according to claim 16, wherein when the predetermined temperature is 25° C., and $K_B$ is a constant relying on 5 to 50 liquid crystal materials, the magnification $n(t_p)$ relating to $T_{10}$, $T_{11}$, $T_{12}$ and $T_2$ at an optional temperature $t_p$ satisfies the relation of the following formula (^ indicates an index):

$$n(t_p)=n(25)\times 2\hat{}((25-t_p)/K_B).$$

21. A driving method for driving a liquid crystal display device with a cholesteric liquid crystal having a memory mode of operation, comprising:

a first stage of applying a voltage so that the alignment of the cholesteric liquid crystal is substantially in parallel to a voltage application direction; and a second stage of applying a voltage to change the state of the cholesteric liquid crystal to a homogenous state or a planar state, wherein a period of the second stage is determined based on $\tau_H$, which is a time spent until the cholesteric liquid crystal, in a homeotropic state by application of a voltage, indicates the lowest dielectric constant after the application of the voltage is stopped.

22. The driving method according to claim 21, wherein the voltage value applied in the second stage is 0 V.

23. The driving method according to claim 22, wherein the period of the second stage is 0.3–100 ms.

24. A driving apparatus for driving a liquid crystal display device with a cholesteric liquid crystal having a memory mode of operation, comprising:

a first period determining circuit for determining a period of a first stage;

a second period determining circuit for determining a second period in succession to the first stage; and a voltage application circuit for applying a voltage to the cholesteric liquid crystal so that its alignment is substantially in parallel to a voltage application direction in the first period produced by the first period determining circuit, and applying a voltage to the cholesteric liquid crystal to change the state of the liquid crystal to a homogeneous state or a planar state in the second period produced by the second period determining circuit wherein the second period is determined based on $\tau_H$, which is a time spent until the cholesteric liquid crystal, in a homeotropic state by application of a voltage, indicates the lowest dielectric constant after the application of the voltage is stopped.

25. The driving apparatus according to claim 24, wherein:

the liquid crystal display device is provided with row electrodes and column electrodes;

a passive addressing type driving is conducted;

the voltage application circuit comprises a row driver for driving the row electrodes and a column driver for driving the column electrodes; and a controlling circuit is provided for instructing the row driver to apply a voltage of a non-display state to all the row electrodes and for instructing the column driver to apply a voltage of an ON display to all the column electrodes in the first period.

26. A driving method for driving a liquid crystal display device with a cholesteric liquid crystal having a memory mode of operation, wherein when a time spent until the cholesteric liquid crystal in a homeotropic state by the application of a voltage indicates the lowest dielectric constant after the application of the voltage is stopped, is represented by $\tau_H$, a voltage is applied to the cholesteric liquid crystal so that the alignment of the liquid crystal is substantially in parallel to a voltage application direction, the state of the cholesteric liquid crystal is changed by applying a voltage pulse for a period of time based on $\tau_H$, and a voltage pulse is applied to effect a display.

* * * * *